(12) United States Patent
Kato et al.

(10) Patent No.: US 7,224,395 B2
(45) Date of Patent: May 29, 2007

(54) CAMERA HAVING A SHUTTER TO CUT REVERSE-INCIDENT LIGHT FROM THE EYEPIECE LENS

(75) Inventors: Koji Kato, Tama (JP); Ryuji Hirata, Hachioji (JP); Takayuki Kijima, Akiruno (JP); Keiichi Mori, Hachioji (JP); Hideaki Yoshida, Hachioji (JP); Junzo Sakurai, Kokubunji (JP); Toshiyuki Noguchi, Tachikawa (JP); Keiji Kunishige, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 853 days.

(21) Appl. No.: 10/084,585

(22) Filed: Feb. 26, 2002

(65) Prior Publication Data
US 2002/0167603 A1    Nov. 14, 2002

(30) Foreign Application Priority Data

| Mar. 1, 2001 | (JP) | ............... 2001-057233 |
| Mar. 1, 2001 | (JP) | ............... 2001-057234 |
| Mar. 1, 2001 | (JP) | ............... 2001-057235 |
| Mar. 1, 2001 | (JP) | ............... 2001-057236 |
| Mar. 16, 2001 | (JP) | ............... 2001-075901 |
| Mar. 16, 2001 | (JP) | ............... 2001-075903 |
| Mar. 29, 2001 | (JP) | ............... 2001-095710 |
| Mar. 29, 2001 | (JP) | ............... 2001-096285 |
| Apr. 17, 2001 | (JP) | ............... 2001-118637 |
| Apr. 17, 2001 | (JP) | ............... 2001-118638 |
| May 11, 2001 | (JP) | ............... 2001-141946 |
| May 14, 2001 | (JP) | ............... 2001-143424 |
| Sep. 6, 2001 | (JP) | ............... 2001-270665 |

(51) Int. Cl.
 *H04N 5/225* (2006.01)
 *G03B 3/00* (2006.01)
(52) U.S. Cl. .................. 348/341; 348/344; 396/90
(58) Field of Classification Search ............... 348/341, 348/344; 396/354, 373, 384, 90
See application file for complete search history.

(56) References Cited

U.S. PATENT DOCUMENTS

| 4,134,661 A * | 1/1979 | Ishizaka et al. ............. 396/296 |
| 4,206,988 A * | 6/1980 | Miyamoto et al. .......... 396/384 |
| 4,431,284 A * | 2/1984 | Fujibayashi ................ 396/273 |
| 4,853,731 A * | 8/1989 | Tsujimura et al. ............ 396/90 |
| 4,992,809 A * | 2/1991 | Nozaki et al. ................ 396/84 |

FOREIGN PATENT DOCUMENTS

| JP | 54-049136 A | | 4/1979 |
| JP | 1-265689 A | | 10/1989 |
| JP | 3-184028 A | | 8/1991 |
| JP | 03184028 A | * | 8/1991 |
| JP | 6-038113 A | | 2/1994 |
| JP | 10-020365 A | | 1/1998 |
| JP | 11-326985 A | | 11/1999 |

* cited by examiner

*Primary Examiner*—Lin Ye
(74) *Attorney, Agent, or Firm*—Frishauf, Holtz, Goodman & Chick, P.C.

(57) ABSTRACT

A camera comprises a beam splitter configured to divide an incident light from a subject through a photographing lens, an eyepiece lens configured to observe the incident light divided by the beam splitter with a viewfinder, a relay lens provided between the beam splitter and the eyepiece lens, and a shutter provided in a vicinity of the relay lens and configured to cut a reverse-incident light from the eyepiece lens.

5 Claims, 40 Drawing Sheets

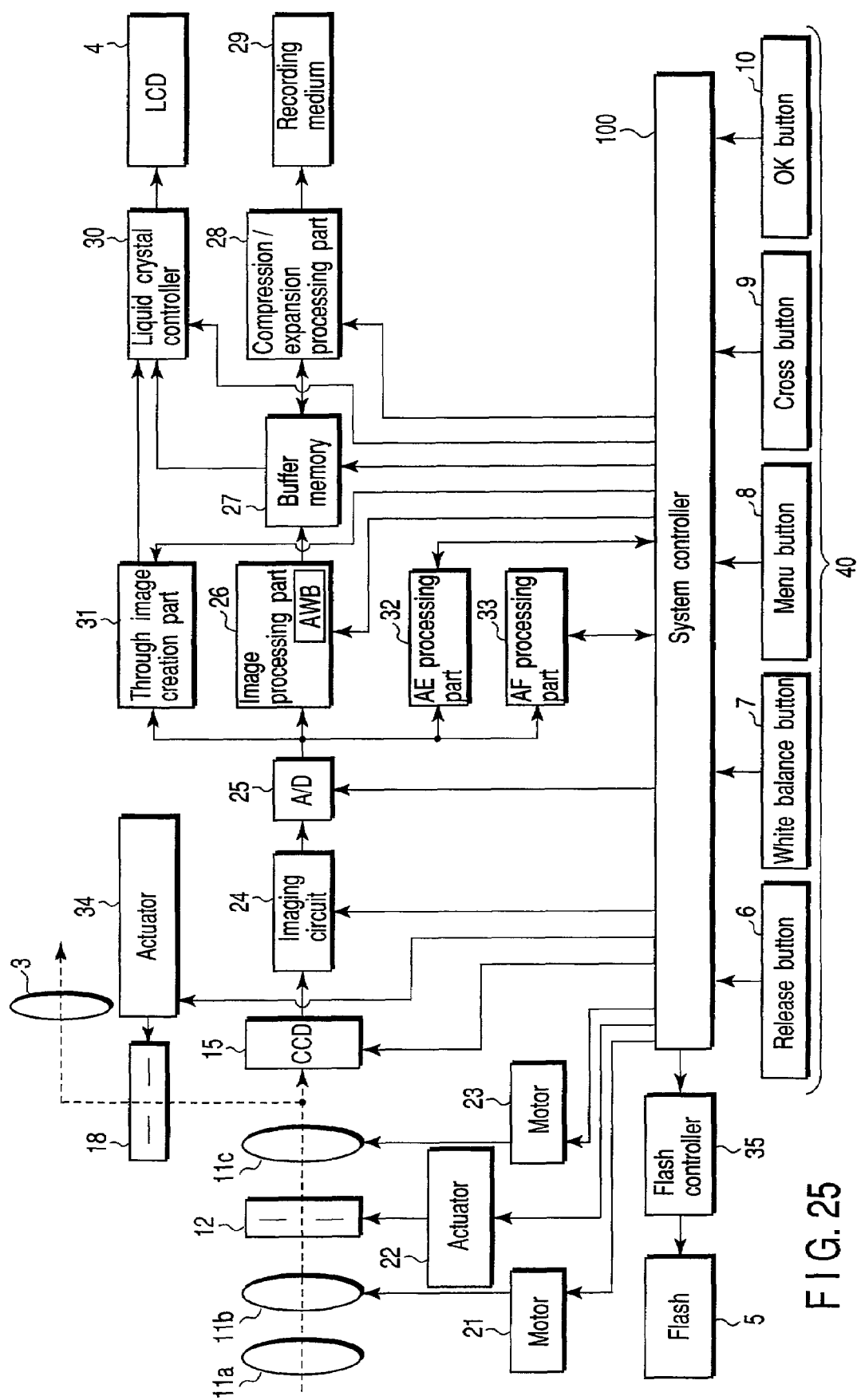
F I G. 25

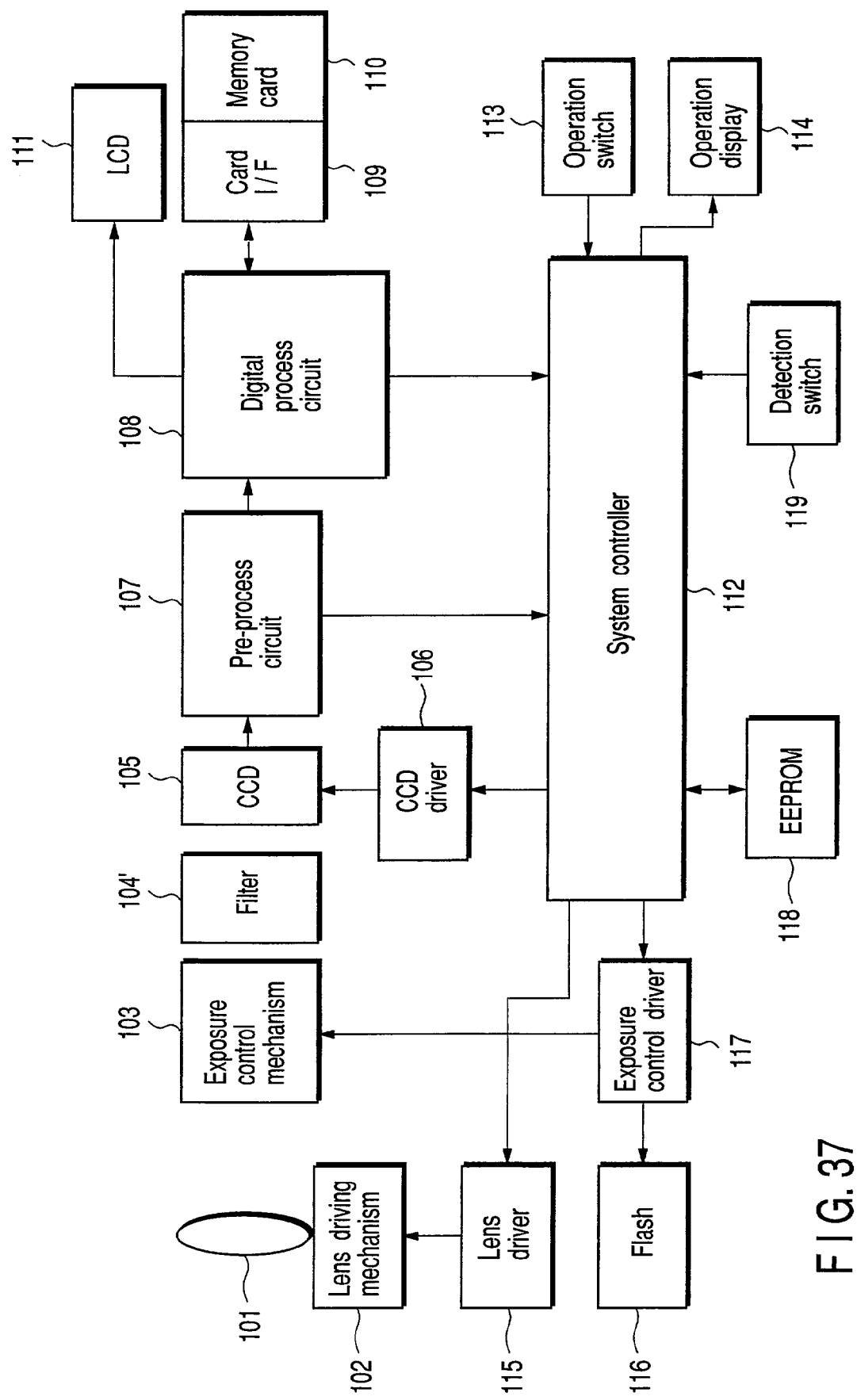
F I G. 37

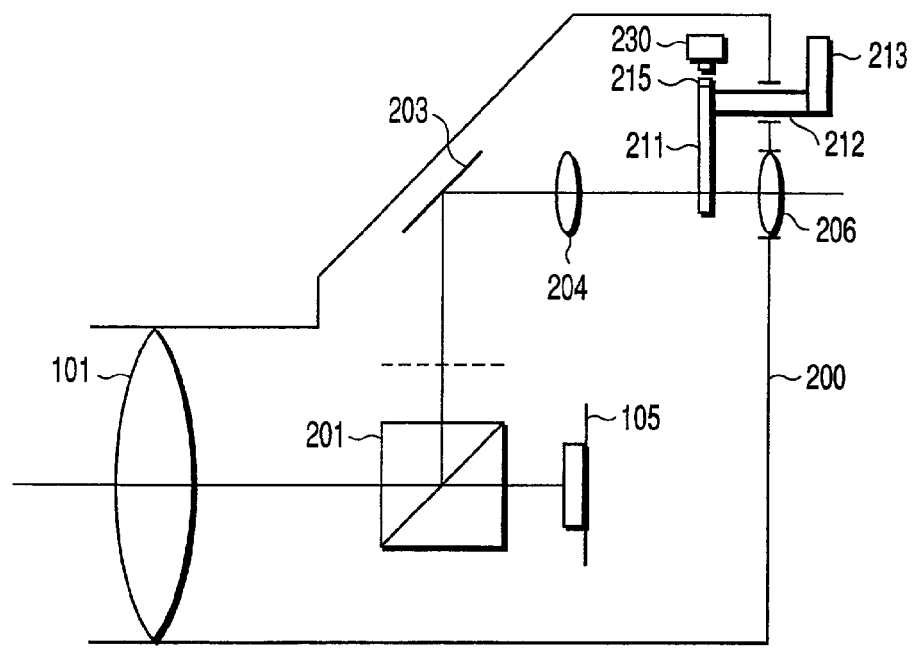
F I G. 38
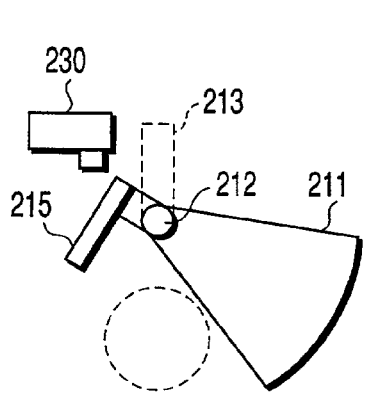
F I G. 39A
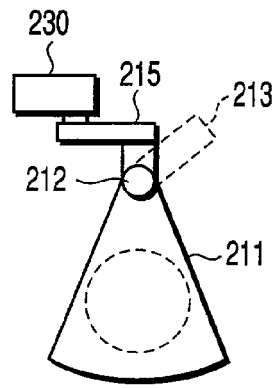
F I G. 39B
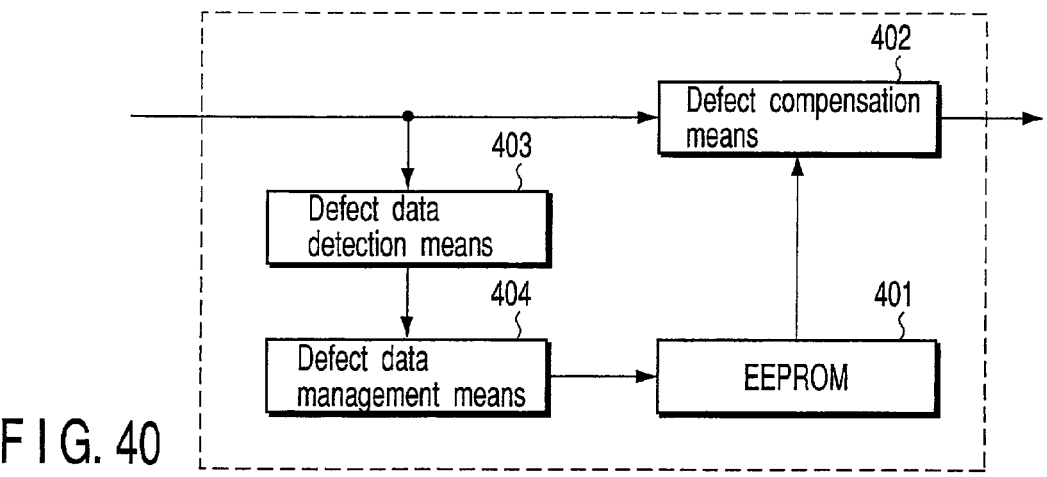
F I G. 40

CAMERA HAVING A SHUTTER TO CUT REVERSE-INCIDENT LIGHT FROM THE EYEPIECE LENS

CROSS-REFERENCE TO RELATED APPLICATIONS

This application is based upon and claims the benefit of priority from the prior Japanese Patent Application No. 2001-57233, filed Mar. 1, 2001, Japanese Patent Application No. 2001-57234, filed Mar. 1, 2001, Japanese Patent Application No. 2001-57235, filed Mar. 1, 2001, Japanese Patent Application No. 2001-57236, filed Mar. 1, 2001, Japanese Patent Application No. 2001-75901, filed Mar. 16, 2001, Japanese Patent Application No. 2001-75903, filed Mar. 16, 2001, Japanese Patent Application No. 2001-95710, filed Mar. 29, 2001, Japanese Patent Application No. 2001-96285, filed Mar. 29, 2001, Japanese Patent Application No. 2001-118637, filed Apr. 17, 2001, Japanese Patent Application No. 2001-118638, filed Apr. 17, 2001, Japanese Patent Application No. 2001-141946, filed May 11, 2001, Japanese Patent Application No. 2001-143424, filed May 14, 2001, and Japanese Patent Application No. 2001-270665, filed Sep. 6, 2001, the entire contents of which are incorporated herein by reference.

BACKGROUND OF THE INVENTION

1. Field of the Invention

The present invention relates to a camera comprising a shutter to cut a reverse-incident light from an eyepiece lens.

2. Description of the Related Art

In recent years, a camera, a so-called electronic camera, which images a subject image on the solid state imaging device (for instance, CCD two-dimensional image sensor) by an imaging optical system to convert it to an electric signal, and then records the obtained image data of the still image on the record medium such as the semiconductor memory and the magnetic disk is spreading widely.

In the electronic camera, a tendency, of which a high function is put in a more compact body, that is, a tendency to so-called miniaturization is strong. And, the result of the miniaturization becomes a large factor to decide the commodity value of the camera.

It is known that an eyepiece shutter is provided to prevent the reverse-incident light from the viewfinder.

However, when the eyepiece shutter is provided near the objective lens, since the diameter of the light flux is large, the large eyepiece shutter is required (see Japanese Patent Application KOKAI Publication No. 3-184028).

The mechanical eyepiece shutter generates dust by the wear etc. at driving. Therefore, the eyepiece shutter is provided at near the focus board in the main body, the dust might adhere to the focus board. Since the dust, which adheres to the focus board is magnified and observed in a view from the viewfinder, unpleasant feeling is given to the user. It is extremely difficult to remove the dust since there is no method to remove the dust except that the camera is decomposed.

In addition, recently, the eyepiece shutter is configured by the liquid crystal element and penetration/non-penetration on the liquid crystal surface is controlled with CPU, which controls the entire camera.

Therefore, the camera enabling the eyepiece shutter to be opened and closed automatically according to appropriate timing is proposed (For instance, see Japanese Patent Application KOKAI Publication No. 11-326985).

However, it is necessary to provide an LED etc. to perform the display in the view of the viewfinder in addition to the liquid crystal element to configure the eyepiece shutter in the viewfinder optical system. Therefore, not only causing the cost up but also miniaturization of the camera is remarkably impaired.

The camera, which prevents the reverse-incident light from the viewfinder by closing the light-shielding board in the viewfinder system, that is, the eyepiece shutter while the shutter in front of each imaging device is opening, is proposed (see Japanese Patent Application KOKAI Publication No. 1-265689). More specifically, after the turning on signal of the release is generated, the eyepiece shutter is closed at once in the camera. Thereafter, the exposure on the imaging device is started by starting run the start curtain of each shutter delaying only during the predetermined time. Then, after the running end of end curtain of each shutter is confirmed, the eyepiece shutter is opened. However, the composition of Japanese Patent Application KOKAI Publication No. 1-265689 is a focal plane shutter of indispensability which has the start curtain and the end curtain. The structure of the focal plane shutter which has the start curtain and the end curtain is complex and downsizing is more difficult than so-called the lens shutters. As a result, it is improper to the miniaturization of the entire camera. Additionally, the focal plane shutter disposed in front of the imaging device usually is closed. Therefore, it is not possible to apply originally to an electronic camera with a type in which the subject image imaged by the imaging device is displayed on the LCD as a through image.

Most of the electronic cameras have the function to execute taking a picture continuously while release button is being pushed, so-called the rapid sequence function.

The following technique is proposed (see Japanese Patent Application KOKAI Publication No. 3-184028). The mechanical switch, which forcibly puts the eyepiece shutter mechanism into an open state, is provided. If the rapid sequence switch is in on state, the eyepiece shutter is kept open with the mechanical switch, and if the rapid sequence switch is in off state, the eyepiece shutter is closed at the time of taking a picture.

Moreover, a technique to control so that the eyepiece shutter is automatically opened in synchronous with the film rolling up operation which is always performed after taking a picture is proposed (see Japanese Patent Application KOKAI Publication No. 54-49136), too.

However, even when the power switch is turned off in a state that the eyepiece shutter is open, it may be happened that the eyepiece shutter changes into a state of close by a shock applied to the camera main body etc. When the eyepiece shutter enters the close state, the photographing operation cannot start immediately when looking in the viewfinder, and a valuable shutter chance is missed even if tries to take a picture and the power supply switch is turned on again.

Moreover, a technique in which the eyepiece shutter of the camera is automatically opened and closed in synchronous with the shutter release, in a word, the photographing operation, which is a main operation of the camera, is also proposed (see Japanese Patent Application KOKAI Publication No. 10-20365).

However, the eyepiece shutter is opened and closed only in synchronous with the shutter release, in a word, the photographing operation which is a main operation of the camera. Therefore, it is not considered in any way in case of the other case such as setup operations of the white balance adjustment function and the exposure adjustment function.

When a control of which the eyepiece shutter is always closed as mentioned above at the release operation is adopted, operativeness lowers because the photographer cannot observe the subject image meanwhile. In addition, the open and close of the eyepiece shutter repeated every time is annoyed on eyes.

Moreover, since a dark output by a so-called dark current etc. exists in the imaging device, the picture quality is degraded because the dark output is superimposed on the image signal.

An electronic camera, which improves the point that it is insufficient to evaluate the defect pixel only before shipping it in the factory, is proposed, since the pixel defect is influenced by the temperature dependence and a change with the lapse of time (see Japanese Patent Application KOKAI Publication No. 6-38113). A light receiving surface of the electronic camera is shielded by closing an iris immediately after turning on the power. The defect pixel is detected by evaluating the CCD dark output before the use of the camera. And, the defect is compensated based on the information of the detected defect pixel.

However, the defect pixel is occasionally mis-detected by the reverse-incident light from a single lens reflex optical viewfinder. When the reverse-incident light is incident on the imaging device, the reverse-incident light is superimposed on an original photographing signal, and this causes the mis-detection. The dark current is detected in a light-shielded state at the defect detection. Therefore, the influence of light from no-shielded part is large. Moreover, the influence is larger and larger, since it is considered that it is always defect after that when the defect is detected once.

Moreover, even when the technology for acquiring the defect pixel information by using the imaging device output under shielding by closing the iris is used, the extra light is input to the CCD caused by the reverse-incident light from the optical viewfinder and mis-detects the defect in an electronic camera with single lens reflex optical viewfinder occasionally.

Especially, the level of the reverse-incident light from an optical viewfinder is different according to the environment in the camera surroundings. Therefore, since a wrong detection result different from the actual defect level is acquired in every defect detection in the electronic camera which automatically detects the defect pixels, and the detected defect is accumulated.

As the method of reducing the influence of incident light as mentioned above, it is considered that the eyepiece shutter which cuts the reverse-incident light from the viewfinder is provided, but the problem cannot be solved by merely providing the eyepiece shutter. That is, it is necessary to establish a method of preventing, for instance, photographer's operation forgetting including the eyepiece shutter and the operation timing mistake, etc., and a cooperating method of the pixel defect check operation and the eyepiece shutter operation to achieve the certain and good operative defect check operation.

BRIEF SUMMARY OF THE INVENTION

An object of the present invention is to provide an improved camera.

The camera according to the first aspect of the present invention is characterized by comprising: an eyepiece lens configured to observe the incident light divided by the beam splitter with a viewfinder; a relay lens provided between the beam splitter and the eyepiece lens; and a shutter provided in a vicinity of the relay lens and configured to cut a reverse-incident light from the eyepiece lens.

The camera according to the second aspect of the present invention is characterized by comprising: a beam splitter configured to divide an incident light from a subject through a photographing lens; an eyepiece lens configured to observe the incident light divided by the beam splitter with a viewfinder; a relay lens provided between the beam splitter and the eyepiece lens and having a plurality of lenses; and a shutter provided between the plurality of lenses of the relay lens and configured to cut a reverse-incident light from the eyepiece lens.

The camera according to the third aspect of the present invention is characterized by comprising: a beam splitter configured to divide an incident light from a subject through a photographing lens; an eyepiece lens configured to observe the incident light divided by the beam splitter with a viewfinder; a relay lens provided between the beam splitter and the eyepiece lens; a focusing board provided between the beam splitter and the relay lens and configured to form an image of a subject image for focusing; a shutter provided between the beam splitter and the relay lens and configured to cut a reverse-incident light from the eyepiece lens; and an optical member provided between the focusing board and the shutter and configured to prevent a dust from the shutter from adhering to the focusing board.

The camera according to the fourth aspect of the present invention is characterized by comprising: a beam splitter configured to divide an incident light from a subject through a photographing lens; an eyepiece lens configured to observe the incident light divided by the beam splitter with a viewfinder; and a liquid crystal device provided between the beam splitter and the eyepiece lens, and the liquid crystal device has a function as a focusing board to form an image of a subject image for focusing, a function as a shutter to cut a reverse-incident light from the eyepiece lens, and a function as a display part on which display segments in a viewfinder are displayed.

The camera according to the fifth aspect of the present invention is characterized by comprising: a beam splitter configured to divide an incident light from a subject through a photographing lens; an eyepiece lens configured to observe the incident light divided by the beam splitter with a viewfinder; a focusing board provided between the beam splitter and the relay lens and configured to form an image of a subject image for focusing; a liquid crystal device provided in a vicinity of the focusing board, and the liquid crystal device has a function as a shutter to cut a reverse-incident light from the eyepiece lens, and a function as a display part on which display segments in a viewfinder are displayed.

The camera according to the sixth aspect of the present invention is characterized by comprising: a beam splitter configured to divide an incident light from a subject through a photographing lens; an eyepiece lens configured to observe the incident light divided by the beam splitter with a viewfinder; a relay lens provided between the beam splitter and the eyepiece lens; and a liquid crystal device provided between the relay lens and the eyepiece lens, and the liquid crystal device has a function as a focusing board to form an image of a subject image for focusing, a function as a shutter to cut a reverse-incident light from the eyepiece lens, and a function as a display part on which display segments in a viewfinder are displayed.

The camera according to the seventh aspect of the present invention is characterized by comprising: a beam splitter configured to divide an incident light from a subject through a photographing lens; an eyepiece lens configured to observe a first incident light divided by the beam splitter with a viewfinder; a first shutter provided between the beam splitter and the eyepiece lens and configured to cut a reverse-incident light from the eyepiece lens; imaging means for receiving a second incident light divided by the beam splitter and imaging a subject image; a second shutter configured to control a light amount of the second incident light to the imaging means; and a controller configured to start an exposure processing by the imaging means after closing the first shutter at photographing based on a predetermined operation, terminating the exposure processing by closing the second shutter, and open the first and second shutters after a read processing of a image data after the exposure processing.

The camera according to the eighth aspect of the present invention is characterized by comprising: a beam splitter configured to divide an incident light from a subject through a photographing lens; an eyepiece lens configured to observe a first incident light divided by the beam splitter with a viewfinder; a first shutter provided between the beam splitter and the eyepiece lens and configured to cut a reverse-incident light from the eyepiece lens; imaging means for receiving a second incident light divided by the beam splitter and imaging a subject image; a second shutter configured to control a light amount of the second incident light to the imaging means; light amount measurement means for controlling an exposure; and a controller configured to perform a light amount measurement by the light amount measurement means and to start an exposure processing by the imaging means after closing the first shutter at photographing based on a predetermined operation, terminate an exposure processing by closing the second shutter, and open the first and second shutters after a read processing of the image data after the exposure processing.

The camera, which has a rapid sequence function to take two or more images continuously, according to the ninth aspect of the present invention is characterized by comprising: a beam splitter configured to divide an incident light from a subject through a photographing lens; an eyepiece lens configured to observe the incident light divided by the beam splitter with a viewfinder; a shutter provided between the beam splitter and the eyepiece lens, and configured to cut a reverse-incident light from the eyepiece lens; a rapid sequence speed setting means for setting a rapid sequence speed of the rapid sequence function; and a controller configured to fix the shutter to open during the rapid sequence operation if the rapid sequence speed set by the rapid sequence speed setting means is faster than a predetermined boundary rapid sequence speed, and open and close the shutter for each photographing if the rapid sequence speed set by the rapid sequence speed setting means is equal to or slower than a predetermined boundary rapid sequence speed, at an execution of the photographing using the rapid sequence function.

The camera, which has a rapid sequence function to take two or more images continuously, according to the tenth aspect of the present invention is characterized by comprising: a beam splitter configured to divide an incident light from a subject through a photographing lens; an eyepiece lens configured to observe the incident light divided by the beam splitter with a viewfinder; a shutter provided between the beam splitter and the eyepiece lens, and configured to cut a reverse-incident light from the eyepiece lens; a rapid sequence speed setting means for setting a rapid sequence speed of the rapid sequence function; and a controller configured to fix the shutter to close during the rapid sequence operation if the rapid sequence speed set by the rapid sequence speed setting means is faster than a predetermined boundary rapid sequence speed, and open and close the shutter for each photographing if the rapid sequence speed set by the rapid sequence speed setting means is equal to or slower than a predetermined boundary rapid sequence speed, at an execution of the photographing using the rapid sequence function.

The camera according to the eleventh aspect of the present invention is characterized by comprising: a beam splitter configured to divide an incident light from a subject through a photographing lens; an eyepiece lens configured to observe the incident light divided by the beam splitter with a viewfinder; a shutter provided between the beam splitter and the eyepiece lens, and configured to cut a reverse-incident light from the eyepiece lens; an actuator configured to open the shutter; and a controller configured to drive the actuator to open the shutter when a main power supply is turned on.

The camera according to the twelfth aspect of the present invention is characterized by comprising: a beam splitter configured to divide an incident light from a subject through a photographing lens; an eyepiece lens configured to observe the incident light divided by the beam splitter with a viewfinder; a shutter provided between the beam splitter and the eyepiece lens, and configured to cut a reverse-incident light from the eyepiece lens; an actuator configured to open and close the shutter; and a controller configured to drive the actuator to open the shutter when a main power supply is turned on.

The camera according to the thirteenth aspect of the present invention is characterized by comprising: a beam splitter configured to divide an incident light from a subject through a photographing lens; an eyepiece lens configured to observe the incident light divided by the beam splitter with a viewfinder; a shutter provided between the beam splitter and the eyepiece lens, and configured to cut a reverse-incident light from the eyepiece lens; an actuator configured to close the shutter; and a controller configured to drive the actuator to close the shutter when a main power supply is cut off.

The camera according to the fourteenth aspect of the present invention is characterized by comprising: a beam splitter configured to divide an incident light from a subject through a photographing lens; an eyepiece lens configured to observe the incident light divided by the beam splitter with a viewfinder; a shutter provided between the beam splitter and the eyepiece lens, and configured to cut a reverse-incident light from the eyepiece lens; an actuator configured to open and close the shutter; and a controller configured to drive the actuator to close the shutter when a main power supply is cut off.

The camera according to the fifteenth aspect of the present invention is characterized by comprising: a beam splitter configured to divide an incident light from a subject through a photographing lens; an eyepiece lens configured to observe the incident light divided by the beam splitter with a viewfinder; a shutter provided between the beam splitter and the eyepiece lens, and configured to cut a reverse-incident light from the eyepiece lens; an actuator configured to open and close the shutter; and a controller configured to drive the actuator to close the shutter when a main power supply is cut off and to open the shutter when the main power supply is turned on.

The camera according to the sixteenth aspect of the present invention is characterized by comprising: a beam splitter configured to divide an incident light from a subject through a photographing lens; an eyepiece lens configured to observe a first incident light divided by the beam splitter with a viewfinder; a shutter provided between the beam splitter and the eyepiece lens and configured to cut a reverse-incident light from the eyepiece lens; shutter driving means for driving the shutter; imaging means for receiving a second incident light divided by the beam splitter and creating an image data of a subject image; white balance adjustment means for adjusting a color temperature of a picture data obtained by the imaging means; switch means for directing the acquisition of an adjustment data generated from the picture data obtained by the imaging means, and the adjustment data being a reference of the color temperature adjustment by the white balance adjustment means; and a controller configured to operate the shutter driving means to cut the reverse-incident light by driving the shutter drive the shutter before the adjustment data is acquired and open the shutter after the adjustment data is acquired when the direction of the acquisition of the adjustment data is directed by the switch means.

The camera according to the seventeenth aspect of the present invention is characterized by comprising: a beam splitter configured to divide an incident light from a subject through a photographing lens; an eyepiece lens configured to observe a first incident light divided by the beam splitter with a viewfinder; a shutter provided between the beam splitter and the eyepiece lens and configured to cut a reverse-incident light from the eyepiece lens; shutter driving means for driving the shutter; imaging means for receiving a second incident light divided by the beam splitter and creating an image data of a subject image; light amount measurement means for measuring a light amount of the incident light from the incident light from the subject by the photographing lens; switch means for directing an acquisition of a light amount measurement data obtained by the light amount measurement means; and a controller configured to operate the shutter driving means to cut the reverse-incident light by driving the shutter before the adjustment data is acquired and open the shutter after the adjustment data is acquired when the direction of the acquisition of the adjustment data is directed by the switch means.

The camera according to the eighteenth aspect of the present invention is characterized by comprising: an imaging lens for forming an image of a subject image; light receiving means for receiving the subject image formed by the imaging lens; an iris provided on an optical path of the imaging lens and having a variable aperture; an iris controller configured to control a size of an aperture of the iris based on a brightness of the subject; a viewfinder configured to observe the subject image; an optical member provided between the iris and the light receiving means and configured to lead the subject image input through the imaging lens to the viewfinder; an eyepiece shutter configured to be movable at a shielding position and a non-shielding position for an eyepiece window of the viewfinder; and an eyepiece shutter controller configured to set the eyepiece shutter at the shielding position or the non-shielding position based on the aperture of the iris.

The camera according to the nineteenth aspect of the present invention is characterized by comprising: an imaging lens for forming an image of a subject image; a light receiving means for receiving the subject image formed by the imaging lens; a mechanical shutter provided on an optical path of the imaging lens and configured to be movable between a shielding position and a non-shielding position; means for controlling an amount of an exposure determined with the mechanical shutter based on a brightness of subject; a viewfinder configured to observe the subject image; an optical member provided between the mechanical shutter and the light receiving means and configured to lead the subject image input through the imaging lens to the viewfinder; an eyepiece shutter configured to be movable at the shielding position and the non-shielding position for an eyepiece window of the viewfinder; and an eyepiece shutter controller configured to set the eyepiece shutter at the shielding position or the non-shielding position based on the exposure determined by the mechanical shutter.

The camera according to the twentieth aspect of the present invention is characterized by comprising: an imaging device for forming an image of a subject image; an imaging optical system configured to input the subject image to the imaging device; imaging shielding means for cutting an incident light from the imaging optical system to the imaging device; optical viewfinder means for confirming the subject image by separating a part of the incident light to the imaging device; reverse-incident light shielding means for shielding the incident light from the optical viewfinder means to the imaging device; set state detection means for detecting a set state of the reverse-incident light shielding means; defect data detection means for detecting a pixel defect address of the imaging device by analyzing an output of the imaging device obtained in a state that the incident light to the imaging device by the imaging optical system is cut by the imaging shielding means; defect compensation means for performing a compensation processing by a vicinity pixel data to an output from the imaging device based on the defect data detected by the defect data detection means; and a controller configured to prohibit a detection of the defect address by the defect data detection means when the set state of the reverse-incident light shielding means detected by the set state detection means is not in a light-shielded state.

The camera according to the twenty-first aspect of the present invention is characterized by comprising: an imaging device; an imaging optical system configured to input the subject image by the imaging device; optical viewfinder means for observing the subject image input by the imaging optical system; reverse-incident light shielding means for shielding the incident light from the optical viewfinder means to the imaging device; defect data detection means for executing the detection of the pixel defect data of the imaging device by analyzing an output of the imaging device; defect correction means for performing correction of an output of the imaging device based on the pixel defect data detected by the defect data detection means; and a controller configured to execute the detection of the defect data after cutting the reverse-incident light shielding means by driving it when the reverse-incident light shielding means is open at the defect data detection by the defect data detection means.

The camera according to the twenty-second aspect of the present invention is characterized by comprising: an imaging optical system; an viewfinder optical system comprising a viewfinder to observe subject based on a part of a incident light to the imaging optical system; pixel defect check means for checking a pixel defect of the imaging device arranged on an image formation surface of the imaging optical system; display means for displaying information relating to the pixel defect check; shielding means which can open or close an optical path in the viewfinder optical system by manual to prevent a reverse-incident light from the viewfinder; and display output means for outputting an alarm pushed to close an optical path by the shielding means to the display means before start of checking the pixel defect.

The camera according to the twenty-third aspect of the present invention is characterized by comprising: an imaging optical system; an viewfinder optical system comprising viewfinder to observe a subject image based on a part of an incident light to the imaging optical system; pixel defect check means for checking the pixel defect of the imaging device arranged on an image formation surface of the imaging optical system; display means for displaying information relating to the pixel defect check; shielding means which can open or close an optical path in the viewfinder optical system by manual to prevent the reverse-incident light from the viewfinder; judgment means for judging the open or close state of the shielding means before start of checking the pixel defect; and display output means for outputting an alarm pushed to close the optical path by the shielding means before start of checking the pixel defect to the display means, when it is judged that it is in the open state by the judgment means.

The camera which comprises: an imaging optical system; an viewfinder optical system comprising a viewfinder to observe a subject image based on a part of an incident light to the imaging optical system; pixel defect check means for checking a pixel defect of the imaging device arranged on an image formation surface of the imaging optical system; and display means for displaying an information relating to a pixel defect check, according to the twenty-fourth aspect of the present invention is characterized by comprising: shielding means which can open or close an optical path in the viewfinder optical system manually, for preventing a reverse-incident light from the viewfinder; judgment means for judging a presence of the reverse-incident light from an image data of the imaging device before start of checking the pixel defect; and display output means for outputting an alarm pushed to close the optical path by the shielding means to the display means before start of checking the pixel defect when it is judged that there is the reverse-incident light by the judgment means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 25 is a function block of an electronic camera according to the fifteenth embodiment;

FIG. 37 is a function block of an electronic camera according to the seventeenth embodiment of the present invention;

FIG. 38 is a figure showing an imaging part and the configuration of the viewfinder according to the seventeenth embodiment;

FIG. 39 is a figure showing the open and close state of the viewfinder aperture by rotation of the lever;

FIG. 40 is a block functionally showing the defect detection part and the configuration of the compensation part according to the seventeenth embodiment;

DETAILED DESCRIPTION OF THE INVENTION

Figure 1:
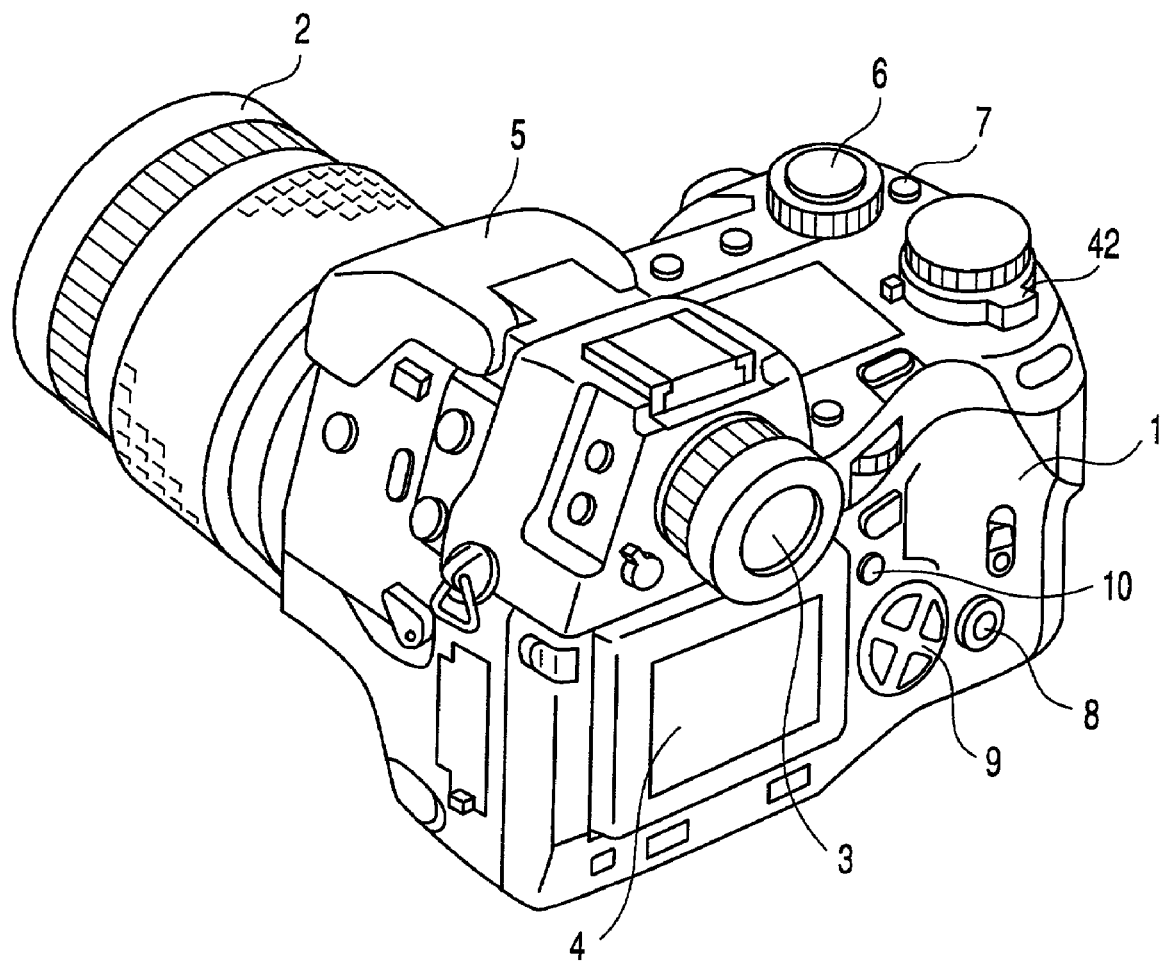
FIG. 1 is an external view of an electronic camera according to the embodiments of the present invention.

Hereafter, the embodiment of the present invention will be explained referring to the drawings.

First Embodiment

The first embodiment of the present invention will be explained referring to FIG. 1 to FIG. 4B. FIG. 1 is an external view of an electronic camera according to the first embodiment. In the following each embodiment, since the external view of an electronic camera is almost similar to FIG. 1, drawings and explanation will be omitted, even when it is not clearly described especially.

An electronic camera has a camera main body 1 and a lens tube 2 roughly classified as shown in FIG. 1. The camera main body 1 comprises an eyepiece lens 3 of an optical viewfinder, an LCD 4 used for a display part (color liquid crystal display), and a popup-type flash 5 to illuminate a subject. In addition, the camera main body 1 has each button of a release button 6, a white balance button 7, a menu button 8, a cross button 9, an OK button 10, and a power supply button 42 as an operation part.

Figure 2:
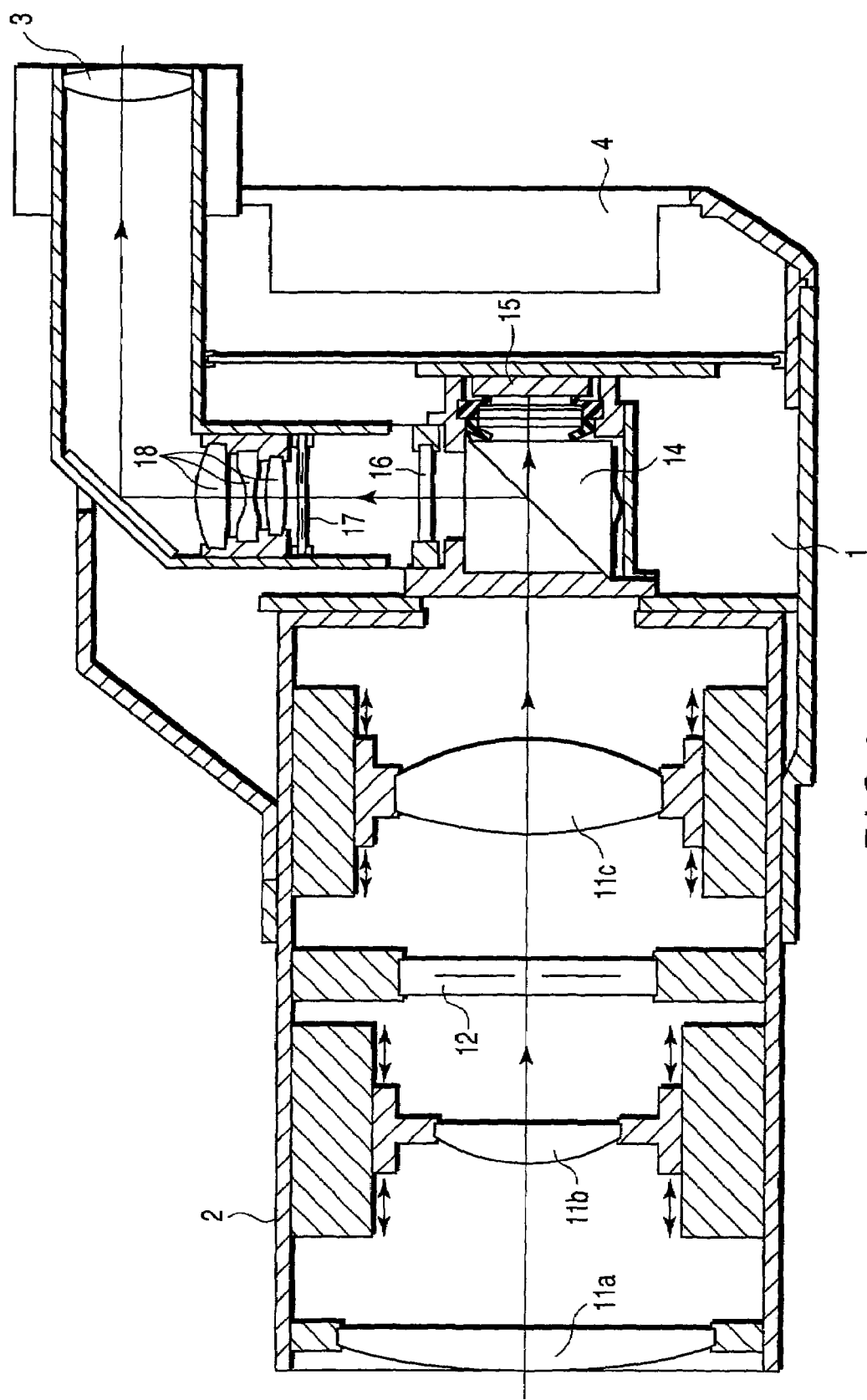
FIG. 2 is a cross sectional view showing an internal structure of an electronic camera according to the first embodiment.

FIG. 2 is a cross sectional view showing an internal structure of an electronic camera according to the first embodiment.

In FIG. 2, the light from the subject passes the first lens group 11a and the second lens group 11b which are the zoom lens provided in the lens tube 2. A light amount from the subject is controlled by the iris/shutter 12 (Hereinafter, called as also a "Imaging shutter"). The light from the subject, which has passed the first lens group 11a, the second lens group 11b, and the iris/shutter 12, further passes the third lens group 11c which is the focus lens. And, the light from the subject introduced into the camera main body 1 is divided into two optical paths by a beam splitter 14. The light from the subject on one optical path is incident on a CCD 2-dimensional color image sensor 15 which is a color solid state imaging device (hereinafter, merely called as a "CCD"). As a result, the subject image is formed on the imaging surface of the CCD 15.

The light from the subject on another optical path divided into two paths by the beam splitter 14 reaches the eyepiece lens 3 by passing a focusing board 16, a shutter 17, and a relay lens 18. As a result, the light from the subject on another optical path is provided to the user as a subject image for observation. The focusing board 16 is used to focus. The shutter 17 is a shutter (that is, a shutter to cut the reverse-incident light from the eyepiece lens 3: hereinafter merely called as an "eyepiece shutter") corresponding to a conventional eyepiece shutter. The relay lens 18 is used to reverse the subject image.

An electronic camera according to the first embodiment is characterized in that the eyepiece shutter 17 is disposed in a vicinity of the relay lens 18 as shown in FIG. 2. This point will be explained in detail as follows.

Figure 3A:
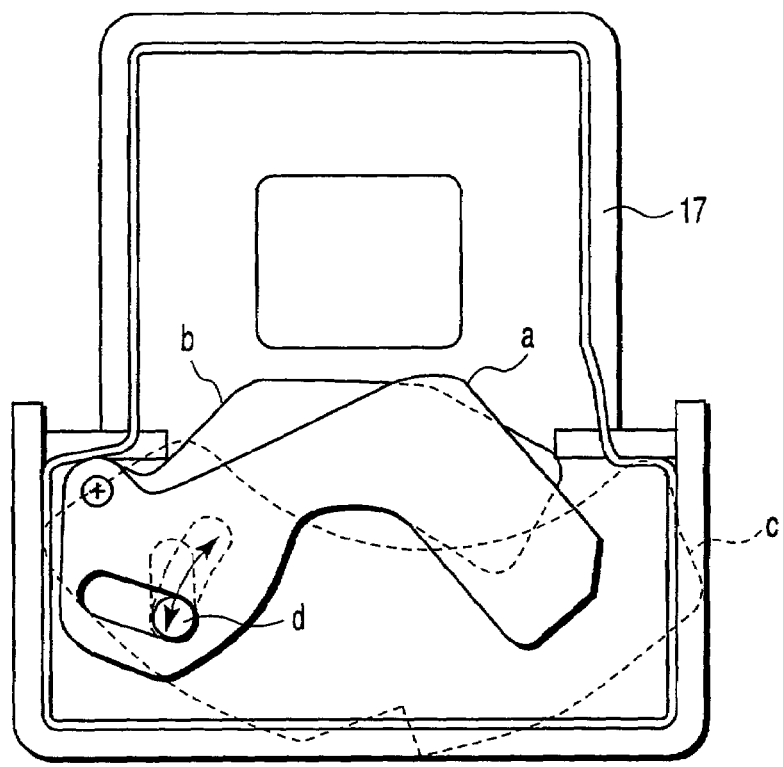
FIG. 3A and FIG. 3B are outline views to explain a configuration and an operation of the eyepiece shutter.
Figure 3B:
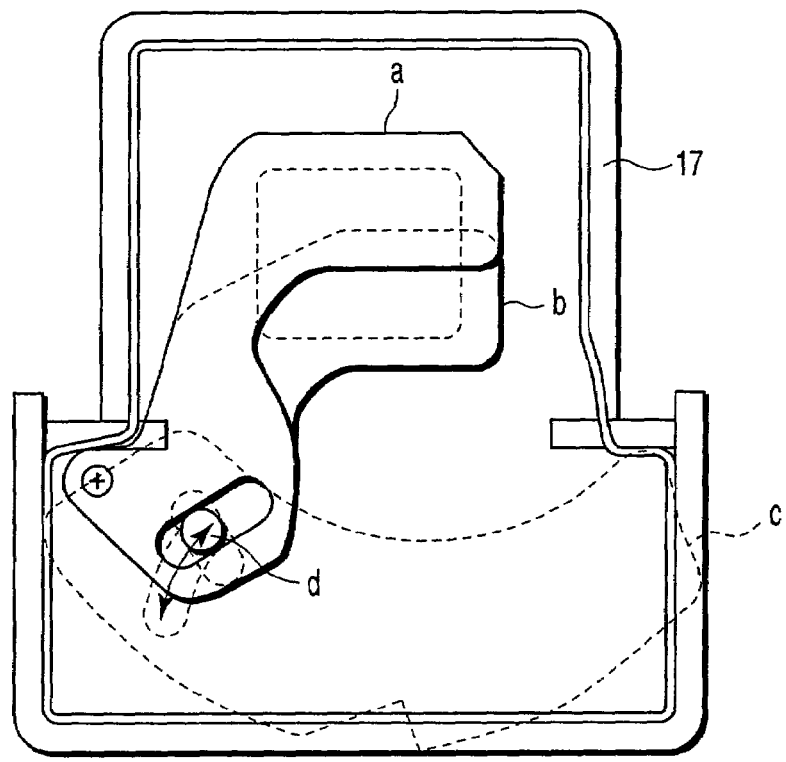

FIG. 3A and FIG. 3B are the outline views to explain the configuration and the operation of the eyepiece shutter 17. FIG. 3A is a figure showing the state that the shutter is opened. FIG. 3B is a figure showing the state that the shutter is closed.

As shown in FIG. 3A and FIG. 3B, two blades of the upper blade a and the lower blade b move by the actuator c. As a result, the eyepiece shutter 17 opens or closes the optical path from the beam splitter 14 to the eyepiece lens 3.

More concretely, an operation thereof is as follows.

The pin d is maintained at lower side before the release button 6 is pushed. That is, when the pin d is moved downward along the guide member, the pin d pushes the upper blade a and the lower blade b to downward. As a result, an optical path from the beam splitter 14 to the eyepiece lens 3 is opened. When the release button 6 is pushed, the actuator c moves the pin d upward along the guide member. As a result, the upper blade a and the lower blade b are pushed up. Then, an optical path from the beam splitter 14 to the eyepiece lens 3 is closed. And, when the actuator c moves the pin d downward again along the guide member after completing the exposure, the upper blade a and the lower blade b are pushed to the downward. As a result, an optical path from the beam splitter 14 to the eyepiece lens 3 returns to the open state. The pin d is configured so that the open state or the close state of the optical path is maintained, for instance, with a permanent magnet.

Figure 4A:
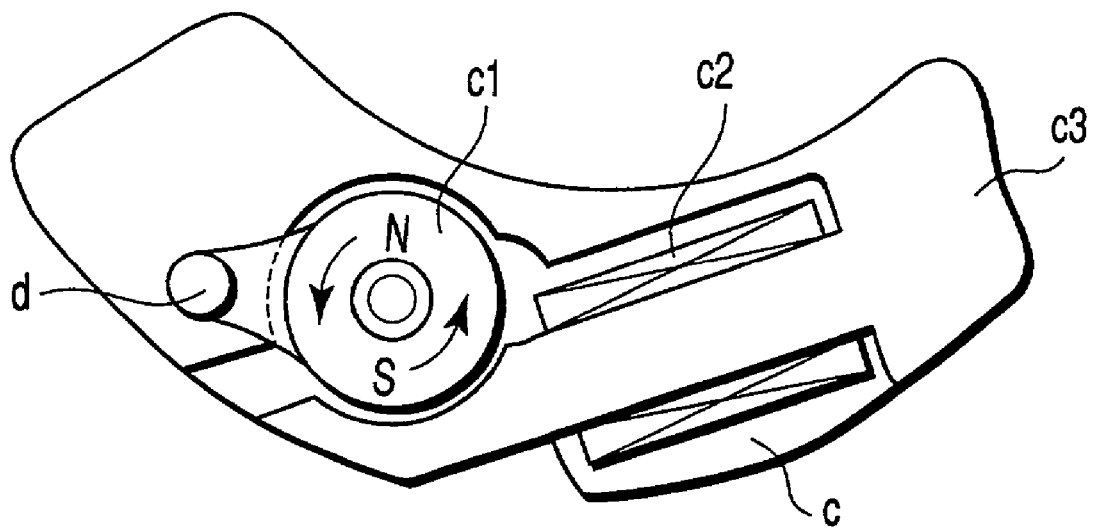
FIG. 4A and FIG. 4B are figures showing an example of an open and close mechanism of the eyepiece shutter by the actuator.
Figure 4B:
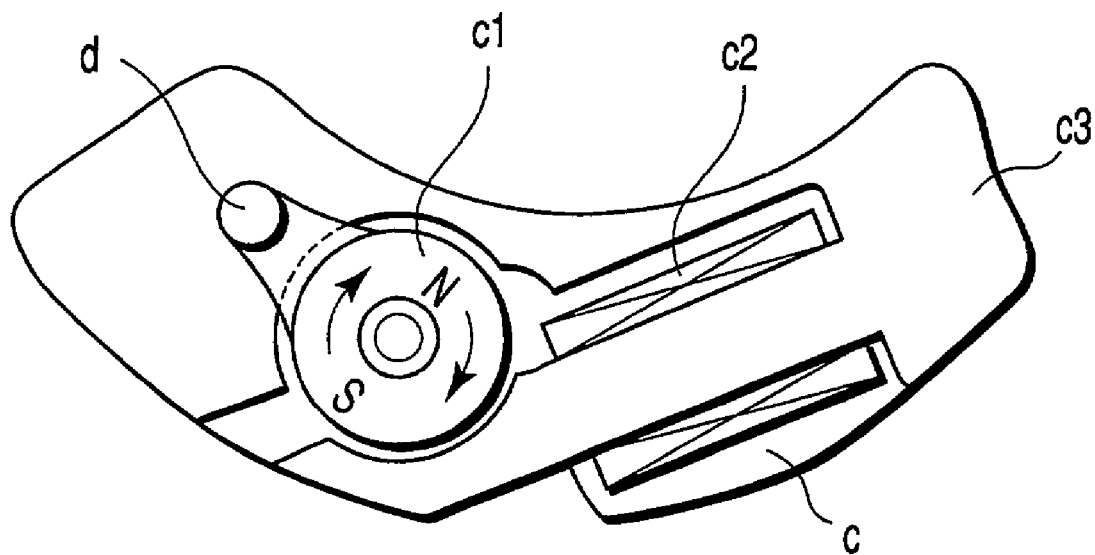

FIG. 4A and FIG. 4B are figures showing an example of an open and close mechanism of the eyepiece shutter 17 by the actuator c. As shown in FIG. 4A and FIG. 4B, the actuator c has a permanent magnet c1, a coil c2, and a boundary magnetic core c3. And, the pin d is integrally configured with the permanent magnet c1 and moves by the rotation of the permanent magnet c1. The permanent magnet c1 rotates in a first direction when a predetermined energizing is performed to the coil c2 by the magnetic field generated in the boundary magnetic core c3. The permanent magnet c1 maintains the state after rotation by the magnetic field formed by itself after the energizing is ended. Moreover, the permanent magnet c1 rotates in the second direction opposite to the first direction when an opposite energizing is performed to the coil c2. And, the state after rotation has been also maintained by the magnetic field generated by itself after the energizing is ended.

As mentioned above, no electric power is needed for the eyepiece shutter 17 according to the embodiment except for moving the pin d by the actuator c.

It is preferable that the eyepiece shutter 17 having the above-mentioned configuration reduces the range to be opened and closed along with the tendency to the miniaturization of a recent electronic camera as much as possible. The smaller the range to be opened and closed is, the more the eyepiece shutter 17 can be miniaturized. As a result, it is possible to contribute to the miniaturization of the entire camera.

On the other hand, the subject image on the focusing board 16 is re-formed and reversed by the relay lens 18. Therefore, the light flux of the viewfinder becomes narrowest in the vicinity of the relay lens 18 on the optical path from the beam splitter 14 to the eyepiece lens 3.

Therefore, the range to be opened and closed for the eyepiece shutter 17 can be made smaller by providing the eyepiece shutter 17 in the vicinity of the relay lens 18.

As a result, it is possible to contribute to the miniaturization of the eyepiece shutter 17, in a word, the miniaturization of the entire camera, and the miniaturization is not obstructed.

As described above, in the electronic camera according to the first embodiment, the eyepiece shutter 17 provided in the vicinity of the eyepiece lens 3 in the conventional art is arranged adjacent to the vicinity of the relay lens 18 that the light flux becomes narrowest on the optical path of the incident light along the direction of an optical axis of the incident light. As a result, the miniaturization of the eyepiece shutter 17 can be achieved and the obstruction of the miniaturization of the main body of the camera can be prevented.

In the first embodiment, the eyepiece shutter 17 is arranged on the beam splitter 14 side of the relay lens 18. The eyepiece shutter 17 may be arranged in the vicinity of the eyepiece lens 3 side of the relay lens 18.

Second Embodiment

Figure 5:
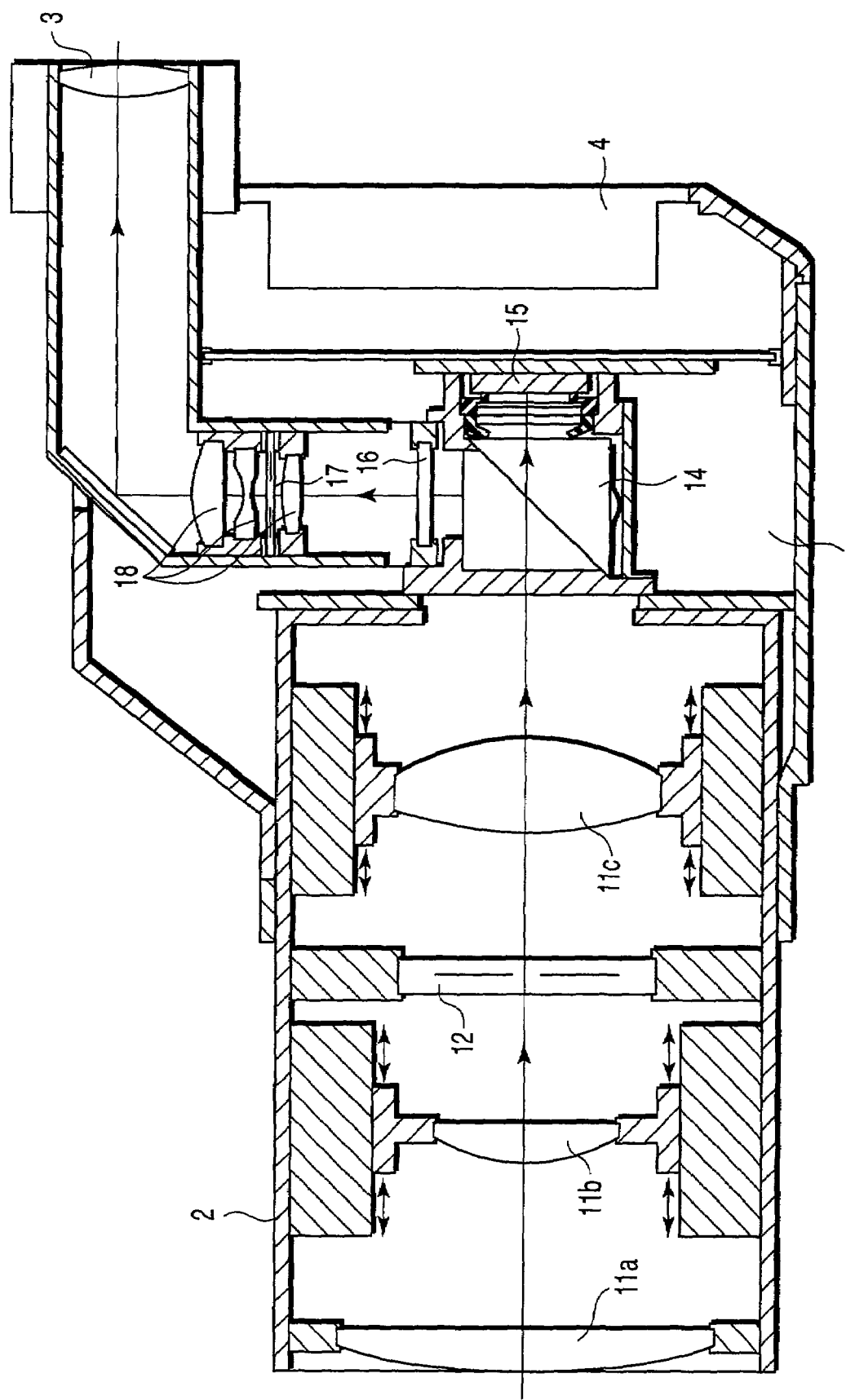
FIG. 5 is a cross sectional view showing an internal structure of an electronic camera according to the second embodiment.

The second embodiment of the present invention will be explained referring to FIG. 5. FIG. 5 is a cross sectional view showing an internal structure of an electronic camera according to the second embodiment.

An electronic camera according to the second embodiment has the eyepiece shutter 17 between two or more lens groups constituting the relay lens 18 as shown in FIG. 5.

The iris is often arranged between two or more lens groups when the relay lens 18 has two or more lens groups. In this case, the light flux is narrowest at the position of the iris. Therefore, the eyepiece shutter 17 is arranged between two or more lens groups constituting the relay lens 18 as in the second embodiment shown in FIG. 5. As a result, it becomes possible to further miniaturize the electronic camera according to the second embodiment compared with the electronic camera according to the first embodiment which comprises the eyepiece shutter 17 in the vicinity of the relay lens 18. Therefore, it is possible to contribute further miniaturization of the entire camera.

Moreover, the eyepiece shutter 17 and the relay lens 18 are arranged on the same unit in an electronic camera according to the second embodiment. As a result, an accuracy in the assembly of the eyepiece shutter and the relay lens can be improved. In addition, the assembly of an electronic camera can be improved by decreasing the number of total units.

In the first embodiment, in FIG. 2, though an electronic camera in which the eyepiece shutter 17 and the relay lens 18 is arranged as another member is shown, the present invention is not limited to this. It is effective to arrange them on the same unit in consideration of the improvement of the assembly of the electronic camera even if the eyepiece shutter 17 is provided in the vicinity of the relay lens 18 as in the first embodiment.

According to the first embodiment and the second embodiment, the shutter corresponding to the conventional eyepiece shutter is provided in the vicinity of the relay lens where the light flux becomes narrowest on an optical path of the incident light (or, between two or more lens groups constituting the relay lens). As a result, it becomes possible to arrange the shutter to cut the reverse-incident light from the eyepiece without obstructing the miniaturization of the main body of the camera.

It is achieved to improve the assembly of the camera by building in the shutter and the relay lens in the same member.

Third Embodiment

Figure 6:
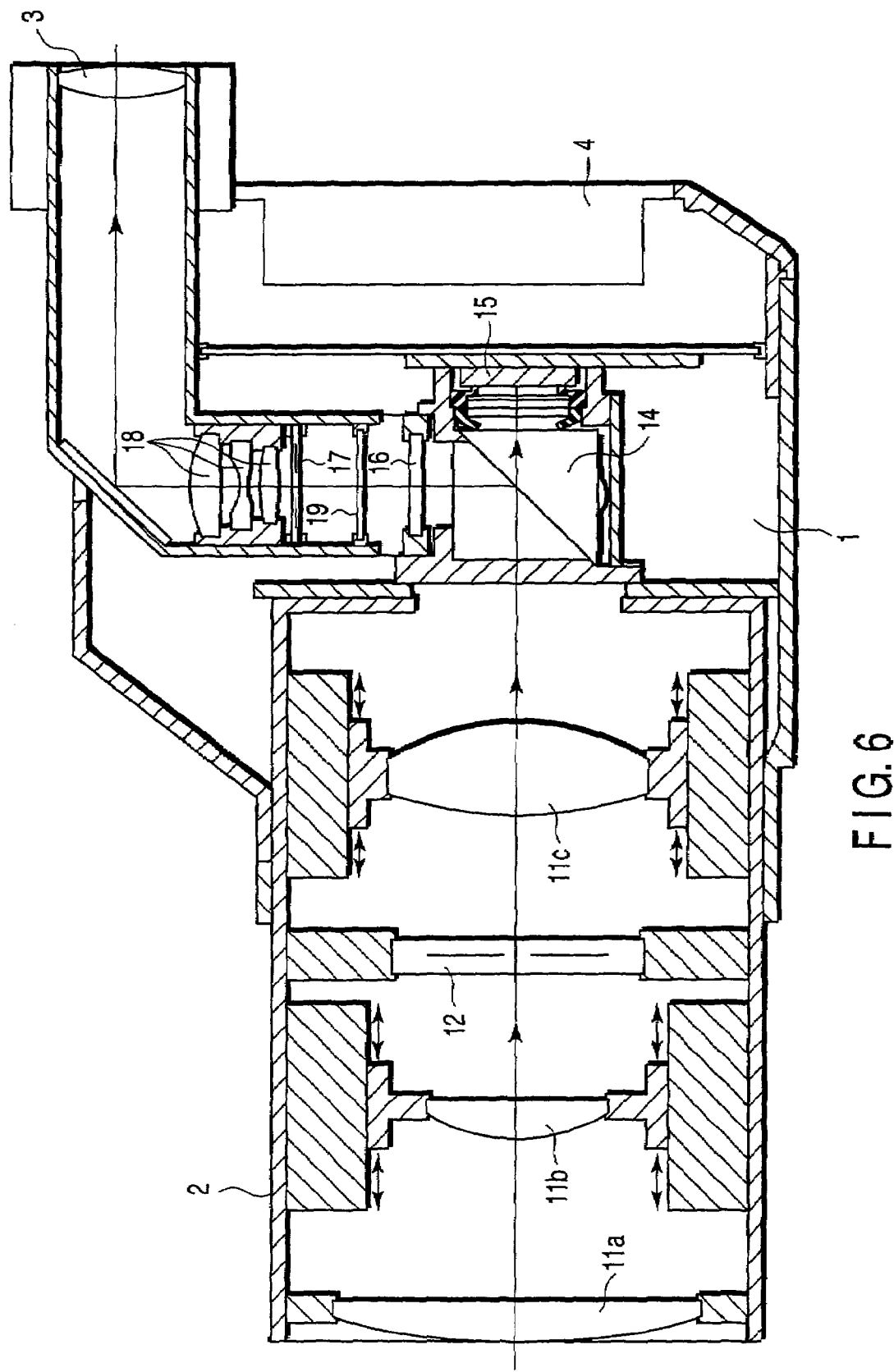
FIG. 6 is a cross sectional view showing an internal structure of an electronic camera according to the third embodiment.

The third embodiment of the present invention will be explained referring to FIG. 6. FIG. 6 is a cross sectional view showing an internal structure of the electronic camera according to the third embodiment.

In the electronic camera, the tendency to housing a high function in a compacter body, that is, miniaturization, is strong, and the result of this miniaturization is a large factor to decide the commodity value. Therefore, in a recent electronic camera, the eyepiece of the viewfinder is inevitably provided in the vicinity of the camera upper surface, and the LCD is provided immediately under the eyepiece. In a word, in the electronic camera to which the LCD is provided immediately under the eyepiece, it is impossible to secure the installation space of the eyepiece shutter in the vicinity of the viewfinder, that is, it is impossible to provide the eyepiece shutter in the vicinity of the viewfinder.

Then, in recent years, it is studied to provide the eyepiece shutter closer to the subject, in a word, at inner side of the main body where the installation space of the eyepiece shutter can be secured. Moreover, a mechanical shutter, in which one of states of open or close can be maintained without electric power, is preferable as the eyepiece shutter.

However, generally, since the eyepiece shutter 17 is a mechanical-type, the dust due to wears etc. of such as the shutter blades and pins may be generated at driving. Therefore, the dust may adhere to the focusing board 16, when the eyepiece shutter 17 is provided between the relay lens 18 and the focusing board 16. To solve this problem, the electronic camera according to the third embodiment comprises a partition glass 19 arranged between the eyepiece shutter 17 and the focusing board 16 and apart from the focusing board 16 in a predetermined distance.

When the dust adheres to the focusing board 16, the adhered dust is magnified and observed in the view of the viewfinder. Therefore, the user feels unpleasant feeling. Then, in the electronic camera according to the third embodiment, the partition glass 19 is arranged at a position apart from the focusing board 16 in a predetermined distance. As a result, even when the dust is adhered to the partition glass 19, the dust is hardly identified in the view of the viewfinder.

As mentioned-above, the electronic camera according to the third embodiment has the partition glass 19 arranged between the eyepiece shutter 17 and the focusing board 16 and arranged at a position apart from the focusing board 16 in a predetermined distance. As a result, it becomes possible to effectively prevent the dust from the eyepiece shutter 17 which needs to provide the LCD 4 between the relay lens 18 and the focusing board 16 from adhering to the focusing board 16.

Fourth Embodiment

Figure 7:
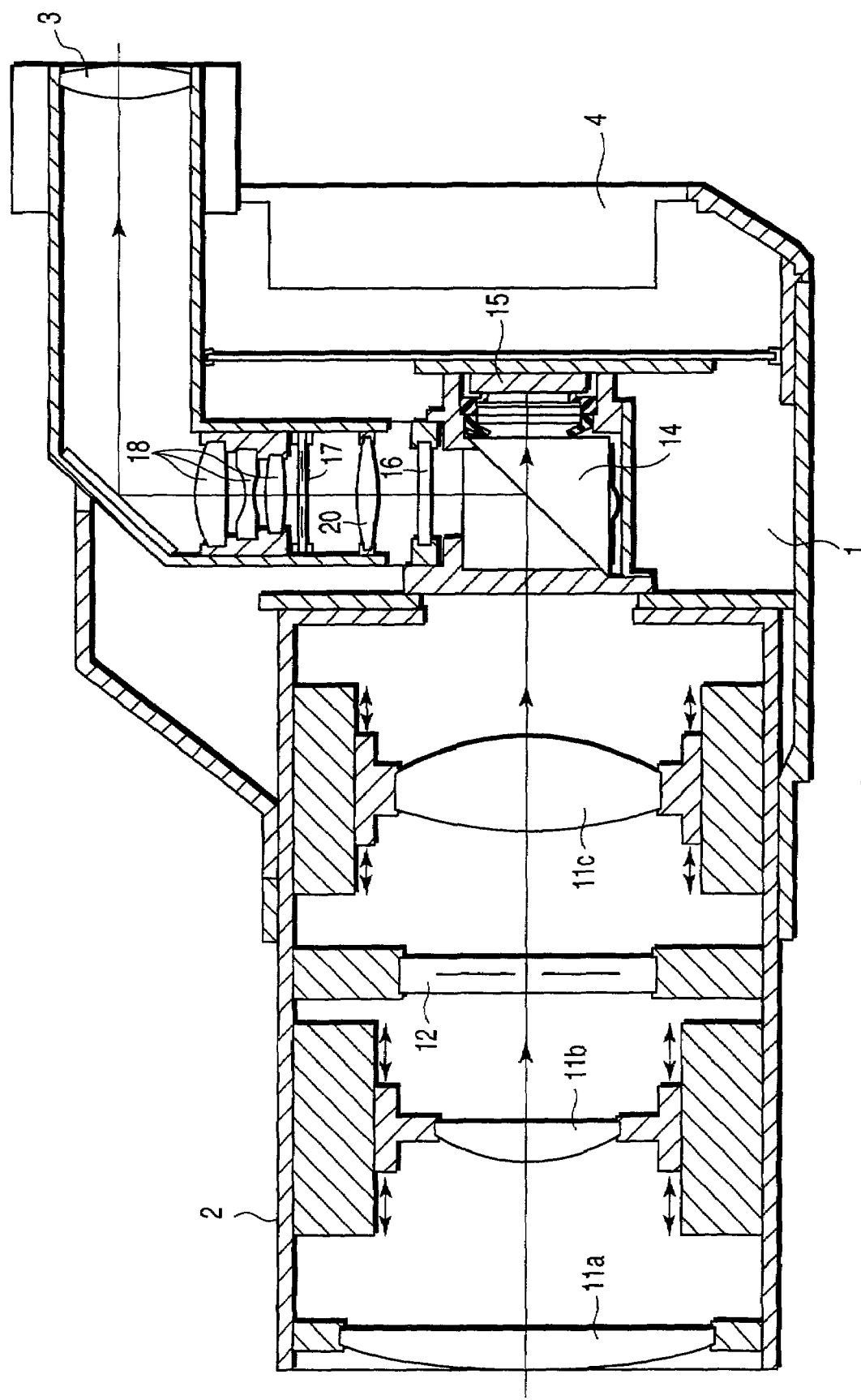
FIG. 7 is a cross sectional view showing an internal structure of an electronic camera according to the fourth embodiment.

The fourth embodiment of the present invention will be explained referring to FIG. 7. FIG. 7 is a cross sectional view showing an internal structure of the electronic camera according to the fourth embodiment.

As shown in FIG. 7, the electronic camera according to the fourth embodiment has a condenser lens 20 in replace of the partition glass 19 according to the third embodiment.

To magnify the subject image observed by the eyepiece lens 3, the electronic camera according to the fourth embodiment provides the condenser lens 20. Specifically, in the electronic camera according to the fourth embodiment, a member (e.g., condenser lens), which can use to prevent the dust from adhering to the focusing board 16, is invoked as a partition glass while an original function is achieved. Therefore, the electronic camera according to the fourth embodiment more effectively prevents the dust from adhering to the focusing board 16 without requiring any new members only preventing the dust from adhering to the focusing board 16 compared with the electronic camera according to the third embodiment.

It is not limited to the condenser lens 20 as the members which can be used to prevent the dust from adhering to the focusing board 16 and has the original function, and optical filters such as low-pass filters and the deflecting plates can be applied, and, additionally, various members can be applied according to the specification.

According to the third embodiment and the fourth embodiment, when providing the eyepiece shutter on closer to the subject (i.e., main body internal side closer to the focusing board) where the installation space of so-called the eyepiece shutter can be secured, an optical member is provided between the eyepiece shutter and the focusing board. As a result, the dust adhered to the focusing board in the conventional one is adhered to the optical member provided between the eyepiece shutter and the focusing board. The dust adhering to the focusing board is magnified and observed in view in the viewfinder. On the other hand, the optical member is provided at a position apart from the focusing board in the predetermined distance. Therefore, the dust adhering to the optical member is hardly identified in view in the viewfinder. Therefore, in the third embodiment and the fourth embodiment, it becomes possible to effectively prevent the dust from the shutter from adhering to the focusing board.

Fifth Embodiment

Figure 8:
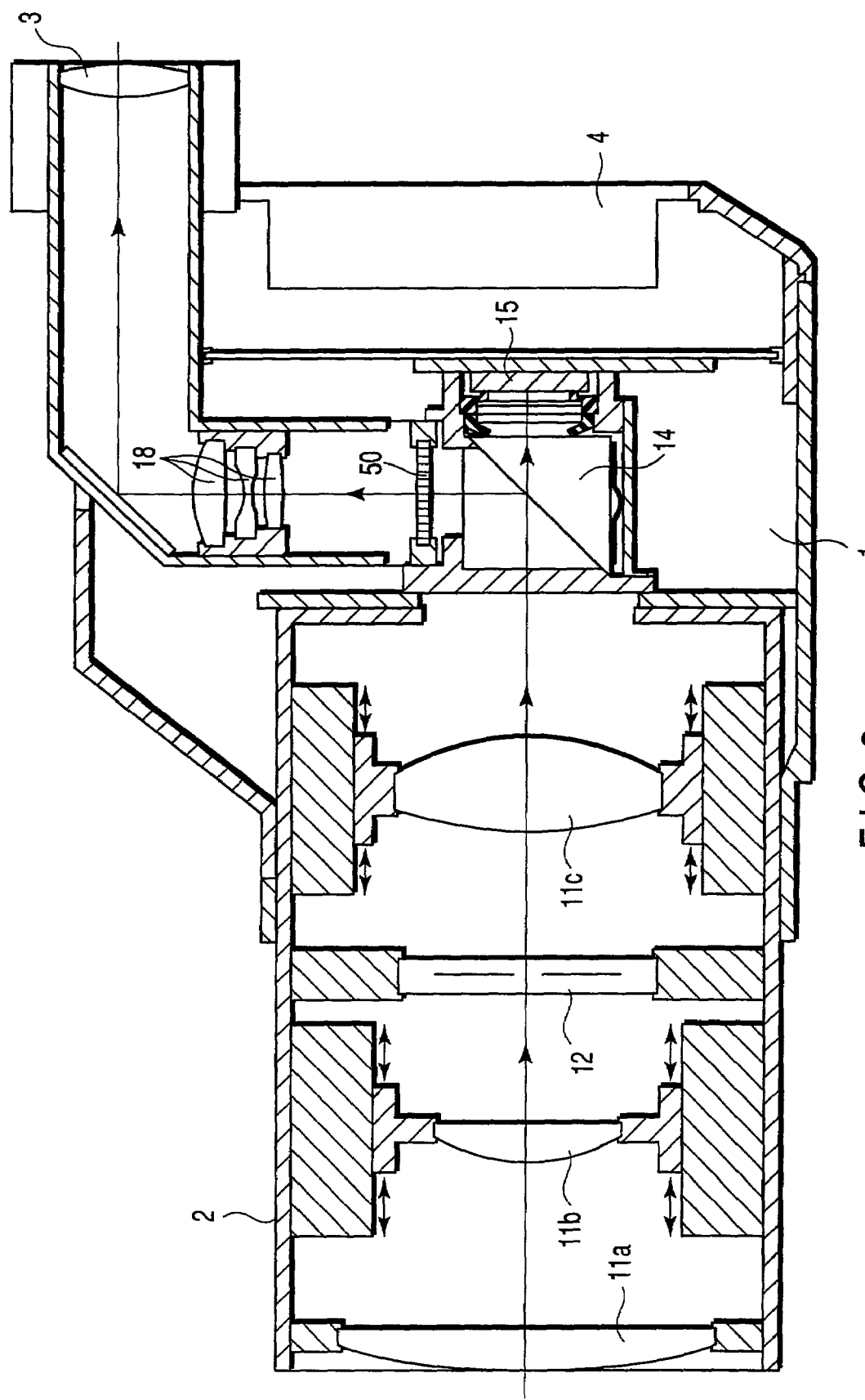
FIG. 8 is a cross sectional view showing an internal structure of an electronic camera according to the fifth embodiment.

The fifth embodiment of the present invention will be explained referring to FIG. 8. FIG. 8 is a cross sectional view showing an internal structure of the electronic camera according to the fifth embodiment.

The electronic camera according to the fifth embodiment has a liquid crystal shutter 50 instead of the eyepiece shutter 17. The liquid crystal shutter 50 is used as a shutter to cut the reverse-incident light from the eyepiece lens 3. In addition, the liquid crystal shutter 50 is also used as a display device to display various displays in the view of the viewfinder. That is, the liquid crystal shutter 50 performs the display of an alarm of the remainder of the battery and the display notifying a setting condition of the flash, etc.

Figure 9:
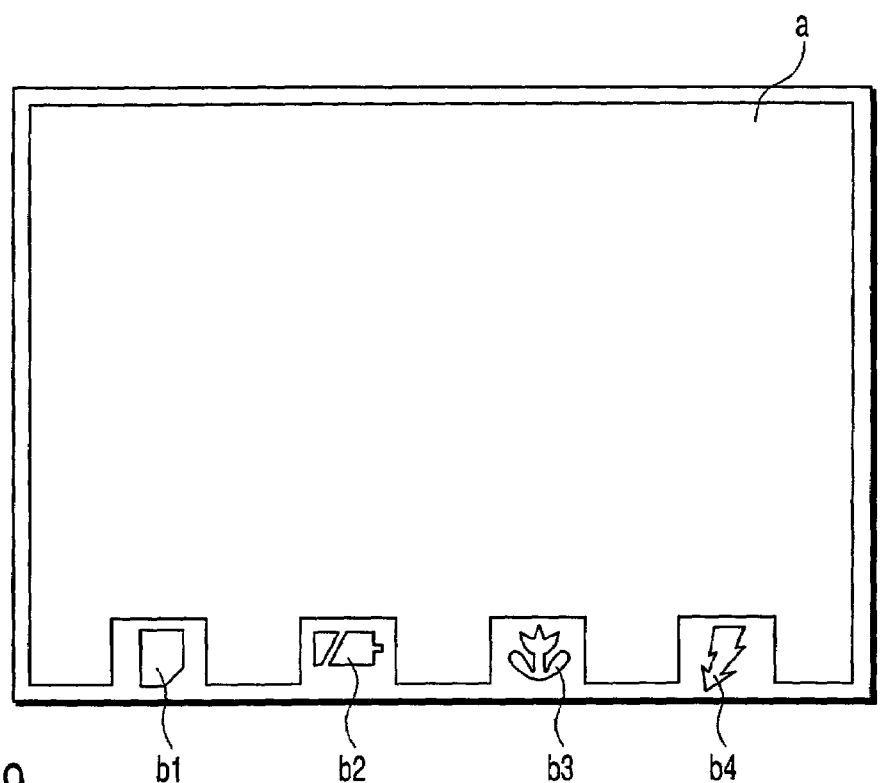
FIG. 9 is a figure showing display segments formed on a liquid crystal surface of the liquid crystal shutter in the fifth embodiment and the sixth embodiment.

FIG. 9 is a figure showing display segments formed on the liquid crystal surface of the liquid crystal shutter 50. As shown in FIG. 9, five segments of a segment a and segments b1 to b4 are formed on the liquid crystal surface of the liquid crystal shutter 50. The segment a functions as a eyepiece shutter, and penetration/non-penetration thereof is switched. The segments b1 to b4 functions a part of the eyepiece shutter, and penetration/non-penetration thereof is switched to present the user various information.

More concretely, the functions of the segments b1 to b4 are as follows. The segment b1 notifies the installation state of the record medium to record the image data of the taken image. The segment b2 notifies the remainder of the battery. The segment b3 notifies a set state of the optimum macro mode when close-up photographing is performed. The segment b4 notifies a set state of the flash.

The penetration/non-penetration of each of the segments a and b1 to b4 formed on the liquid crystal surface of the liquid crystal shutter 50 is controlled as follows.

The segment a is set in a state of penetration before the release button 6 is pushed. The segments b1 to b4 are set to penetration (presentation)/non-penetration (no presentation) according to presentation of each information. Under such a condition, an optical path from the beam splitter 14 to the eyepiece lens 3 is opened. In addition, only the segment switched to non-penetration in the segments b1 to b4 is presented as a display in the viewfinder by the user.

When the release button 6 is pushed, all of the segments a and b1 to b4 are switched to non-penetration state. Under such a condition, an optical path from the beam splitter 14 to the eyepiece lens 3 enters the shutting state. As a result, the reverse-incident light from the eyepiece lens 3 is cut.

All of the segments a and b1 to b4 return in the state before the release button 5 is pushed after completing the exposure.

As mentioned above, the liquid crystal shutter 50 has a function as the display device to display various displays in addition to the function as the shutter to cut the reverse-incident light from the eyepiece lens 3 in the view of the viewfinder. Therefore, great reduction in costs and the miniaturization can be achieved by reducing the number of members according to the fifth embodiment.

In addition, the electronic camera according to the fifth embodiment is characterized in that the liquid crystal shutter 50 has also the function as the focusing board for focusing in addition to each above-mentioned function.

Specifically, the liquid crystal shutter 50 is arranged on the image formation surface of the subject image between the beam splitter 14 and the relay lens 18. Then, the subject image for observation in the viewfinder is formed on the liquid crystal surface. That is, the liquid crystal shutter 50 also has the function as the focusing board. More specifically, various information displayed in the viewfinder and the subject image for observation are superimposed and presented to the user by the liquid crystal shutter 50. The production method of the liquid crystal surface of the liquid crystal shutter 50 may be the same method as the production method of the practical focusing board.

As mentioned above in the fifth embodiment, the liquid crystal shutter 50 has the function as the focusing board for focusing, the function as the shutter to cut the reverse-incident light from the eyepiece lens 3, and the function as the display device to perform various displays in the view of the viewfinder. Therefore, great reduction in costs and the miniaturization can be achieved by reducing the number of members.

Sixth Embodiment

Figure 10:
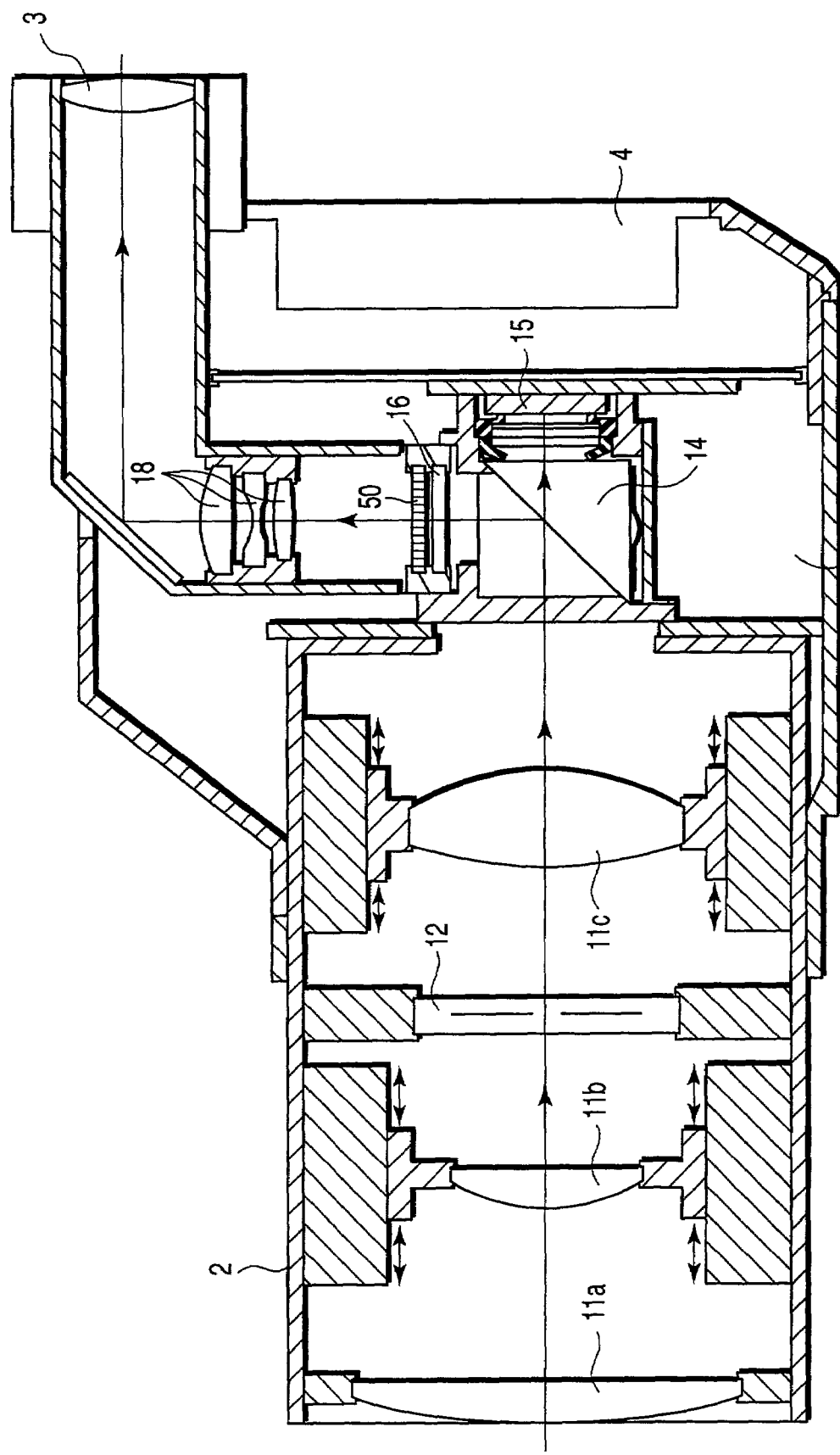
FIG. 10 is a cross sectional view showing an internal structure of an electronic camera according to the sixth embodiment.

The sixth embodiment of the present invention will be explained referring to FIG. 10. FIG. 10 is a cross sectional view showing an internal structure of the electronic camera according to the sixth embodiment.

In the electronic camera according to the sixth embodiment, the focusing board 16 is independently provided to the liquid crystal shutter 50 as shown in FIG. 10.

In the electronic camera according to the sixth embodiment, the focusing board 16 is arranged on the image formation surface of the subject image between the beam splitter 14 and the relay lens 18. In addition, the liquid crystal shutter 50 is arranged in the vicinity of the focusing board 16. The liquid crystal shutter 50 is used to cut the reverse-incident light from the eyepiece lens 3. In addition, the liquid crystal shutter 50 is used as a display device to display various displays of the notification of a set state of the flash etc. in the view of the viewfinder.

The focusing board 16 and the liquid crystal shutter 50 are arranged within the range where the subject image and the segments b1 to b4 can be observed for the user, when the subject image formed on the focusing board 16 and the segments b1 to b4 formed on the liquid crystal surface of the liquid crystal shutter 50 are superimposed.

The electronic camera according to the sixth embodiment needs the installation of independent focusing board 16 compared with the electronic camera according to the fifth embodiment. However, the liquid crystal shutter 50 has the function as the display device to display various displays in addition to the function to cut the reverse-incident light from the eyepiece lens 3 in the view of the viewfinder. Therefore, great reduction in cost and miniaturization can be achieved by reducing the number of members compared with a past electronic camera as well as the electronic camera according to the fifth embodiment. It is also possible to arrange the segments b1 to b4 provided on the liquid crystal surface outside the view frame of the subject image.

In addition, there is an advantage where the degree of freedom of the design is increased by separating the liquid crystal shutter and the focusing board.

Seventh Embodiment

Figure 11:
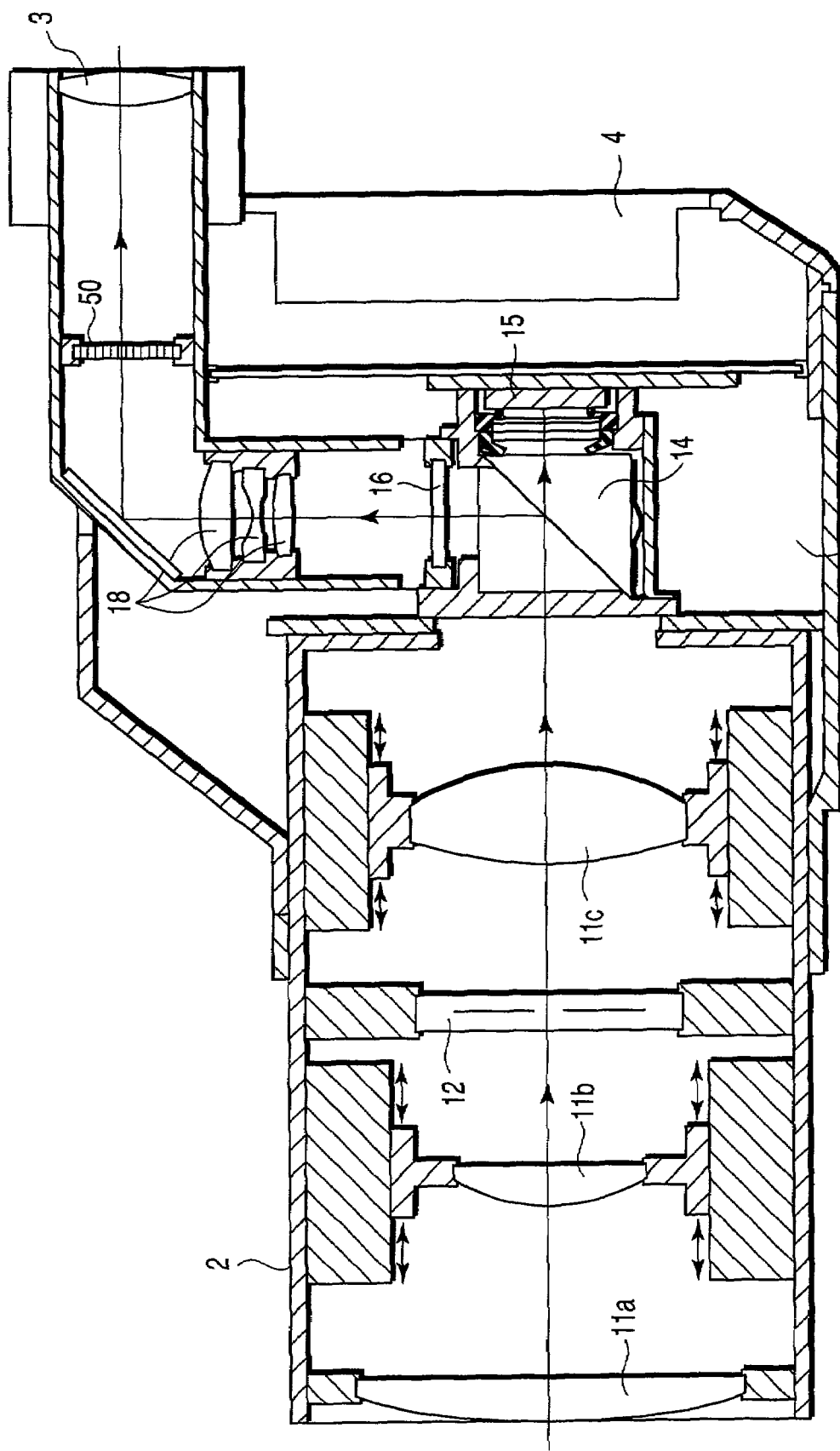
FIG. 11 is a cross sectional view showing an internal structure of an electronic camera according to the seventh embodiment.

The seventh embodiment of the present invention will be explained referring to FIG. 11. FIG. 11 is a cross sectional view showing an internal structure of the electronic camera according to the seventh embodiment.

In the electronic camera according to the seventh embodiment, the liquid crystal shutter 50 is arranged on the second image formation surface between the relay lens 18 and the eyepiece lens 3.

The display segment formed on the liquid crystal surface of the liquid crystal shutter 50 is super-imposed on the formed subject image and is observed by the user. When the display segment is formed on the liquid crystal surface of the liquid crystal shutter 50, since the field curvature is generated on the second image formation surface, it is necessary to consider the field curvature enough.

Figure 12:
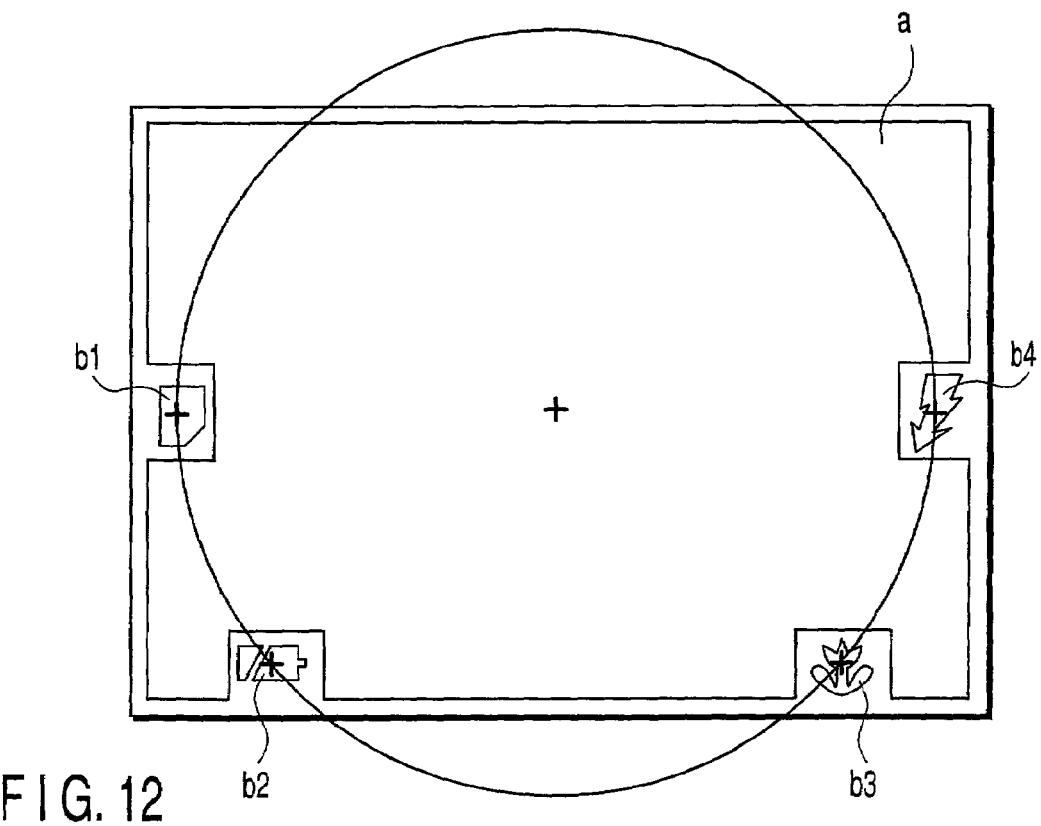
FIG. 12 is a figure showing display segments formed on the liquid crystal surface of the liquid crystal shutter in the seventh embodiment and the eighth embodiment.

FIG. 12 is a figure showing display segments formed on the liquid crystal surface of the liquid crystal shutter 50. As shown in FIG. 12, five segments of the segment a and the segments b1 to b4 are formed on the liquid crystal surface of the liquid crystal shutter 50 as well as FIG. 9. The segment a functions as the eyepiece shutter, and is switched to penetration/non-penetration. The segments b1 to b4 function as a part of function of the eyepiece shutter, and are switched to penetration/non-penetration to present the user various information. Details of each the segment are the same as FIG. 9, and the explanation thereof will be omitted.

The segments b1 to b4 are dispersively arranged from an optical axis of incident light from the subject which penetrates the liquid crystal surface to the distance as in abbreviation etc. in the seventh embodiment as shown in FIG. 12. That is, in the seventh embodiment, the subject image that the field curvature is generated on the second image formation surface and all segments b1 to b4 may be in the almost same distances.

Since the switch of penetration/non-penetration of the segments a and b1 to b4 formed on the liquid crystal surface of the liquid crystal shutter 50 is similar to the fifth embodiment, the explanation thereof will be omitted.

As mentioned above, according to the seventh embodiment, in the liquid crystal shutter 50 to shield the reverse-incident light from the eyepiece 3, the display segments are dispersively arranged at the position in the almost same distance from the optical axis of the incidence light. As a result, it becomes possible to perform an excellent display for the user by solving the problem of the field curvature generated on the second image formation surface.

Eighth Embodiment

Figure 13:
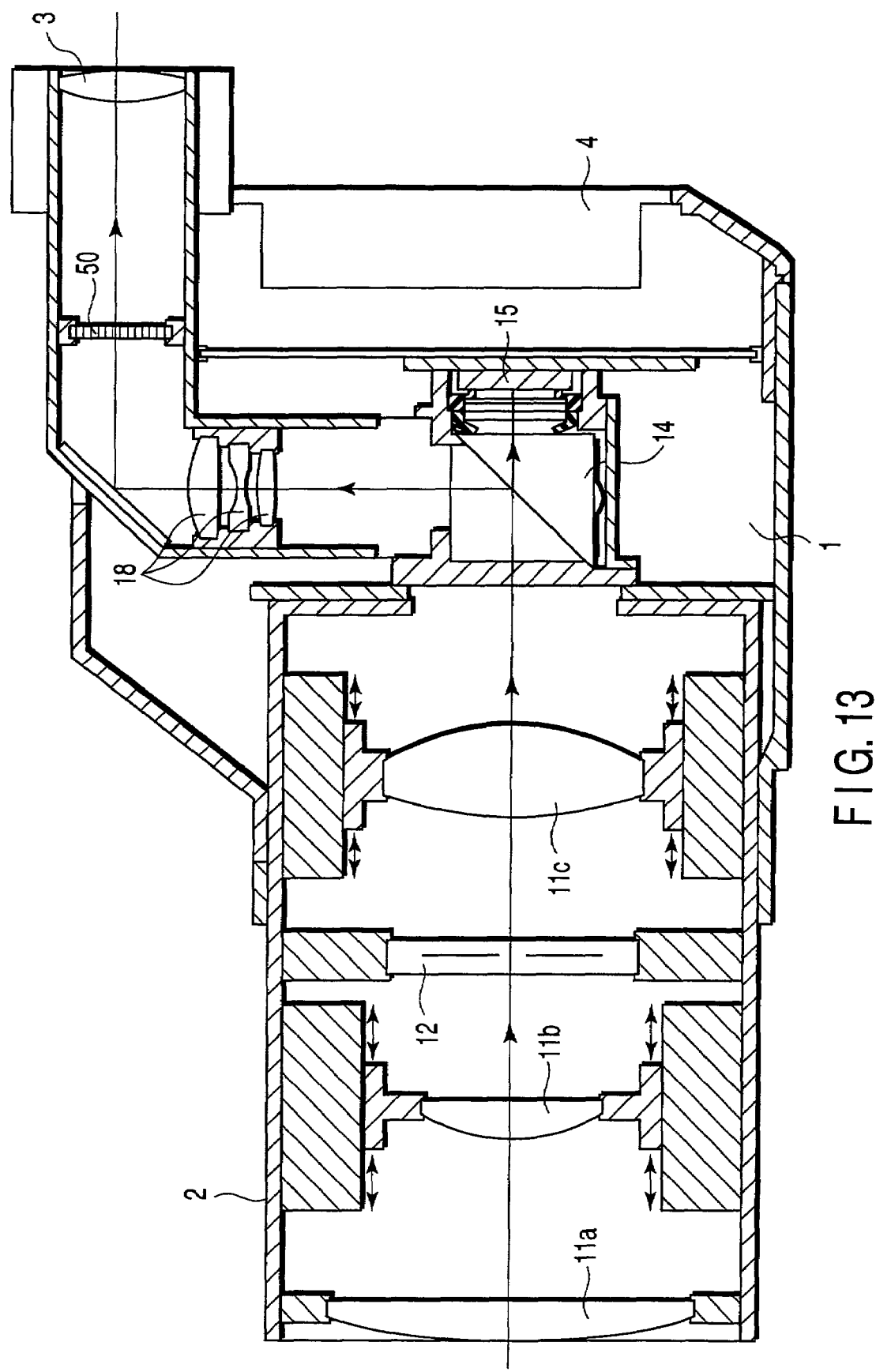
FIG. 13 is a cross sectional view showing an internal structure of an electronic camera according to the eighth embodiment.

The eighth embodiment of the present invention will be explained referring to FIG. 13. FIG. 13 is a cross sectional view showing an internal structure of the electronic camera according to the eighth embodiment.

In the electronic camera according to the eighth embodiment, the liquid crystal shutter 50 is also used as a focusing board as shown in FIG. 13. In other words, the focusing board 16 of the electronic camera according to the seventh embodiment becomes unnecessary.

In the electronic camera according to the eighth embodiment, the liquid crystal surface of liquid crystal shutter 50 to shield the reverse-incident light from eyepiece 3 is created so as to form the subject image for observation in the viewfinder, that is, to form the subject image for focusing. The production method of the liquid crystal surface of liquid crystal shutter 50 may be the same as the practical production method of the focusing board.

As described above, since it becomes unnecessary to the install the focus board compared with the electronic camera according to the seventh embodiment, in the electronic camera according to the eighth embodiment, great further reduction in costs and the miniaturization are achieved by the further reduction in the number of members. In a word, the liquid crystal shutter 50 is used as a focusing board for focusing not only the display device to display various displays in the view of the viewfinder but also the focus in the electronic camera according to the eighth embodiment.

As mentioned above, according to the fifth embodiment to the eighth embodiment, the liquid crystal device constituting so-called the eyepiece shutter is also used as a liquid crystal device which forms the display segment in the viewfinder. As a result, it becomes possible to achieve great reduction in costs and the miniaturization by reducing the number of members. At this time, display segments are dispersively arranged at a position in the almost same distance from the optical axis of the incident light. As a result, it becomes possible to perform an excellent display for the user by dealing with the problem of the field curvature generated on the second image formation surface.

Moreover, the liquid crystal surface is also used as a focusing board for image formation of the subject image for focusing. As a result, it becomes possible to achieve further reduction in costs and miniaturization by further reducing the number of members.

Ninth Embodiment

The ninth embodiment of the present invention will be explained referring to FIG. 14. Since external and internal structures of the electronic camera according to the ninth embodiment are the same as the first embodiment, drawings and explanation thereof will be omitted.

Figure 14:
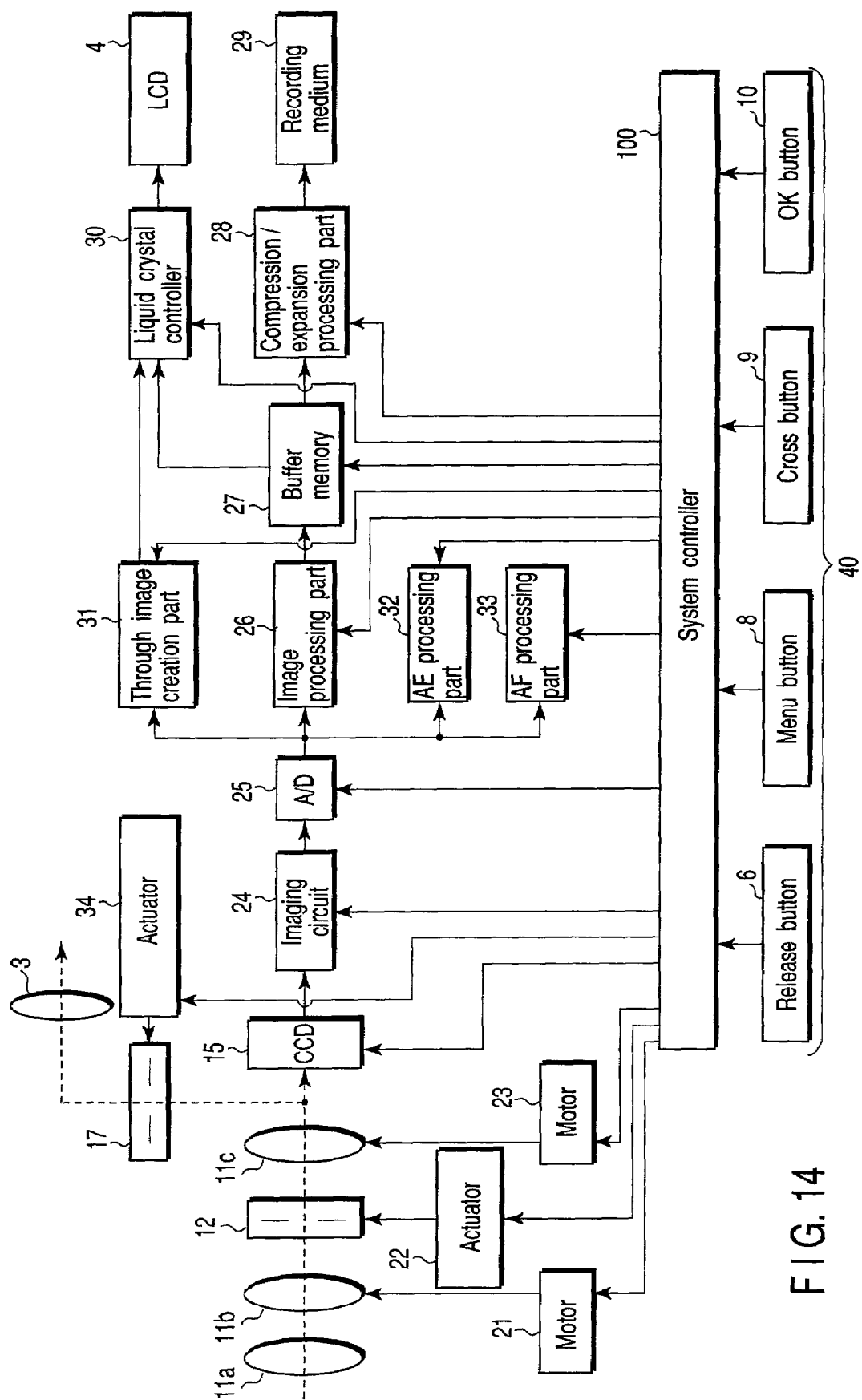
FIG. 14 is a function block of an electronic camera according to the ninth embodiment.

FIG. 14 is a function block of the electronic camera according to the ninth embodiment. In the electronic camera according to the ninth embodiment, the system controller 100 controls the entire device. The system controller 100 integrally controls the motor 21 which drives the second lens group 11*b* shown in FIG. 2, the actuator 22 which drives the iris/shutter 12, the motor 23 which drives the third lens group 11*c*, the CCD 15, and the actuator 34 which drives the eyepiece shutter 17.

The imaging circuit 24 is connected with the CCD 15.

The imaging circuit 24 controls exposure and read operations of the CCD, the device shutter, the gain adjustment, and the electric power supply, etc. Moreover, the output from the CCD 15 is converted into a digital signal with an analog to digital converter 25. The digital signal is input to the image processing part 26. The image processing part 26 performs a setting of an ISO sensitivity, an auto white balance, a brightness/color signal creation, and a gamma processing, etc. to a digital signal, and creates the color image signal of a predetermined format.

The color image signal created with the image processing part 26 is temporarily memorized in the buffer memory 27 consisting of, for instance, a DRAM. The compression extension part 28 is connected with the buffer memory 27. The compression extension part 28 has a compression processing part and an expansion processing part. The compression processing part reads the image signal memorized in the buffer memory 27, performs compression (encode) processing, and converts the image signal in a preferable form for recording on the record medium 29. The expansion processing part reads the image data recorded on the record medium 29 and performs expansion (decoding) processing. As the method of the compression processing, though the JPEG method is used for instance, it is not the limited to this. The reproduction is performed by temporarily memorizing the image signal to which the expansion processing is performed on the buffer memory 27, and displaying it with the LCD 4 properly through the liquid crystal control part 30. The memory card configured by the semiconductor memory as in the card type flash memory, for instance, is generally used as the record medium 29. The record medium 29 is not limited to this. For instance, the record medium in various forms as in the hard drive and the magnetic record medium as in the floppy disk, etc. can be used as the record medium 29.

Moreover, a so-called through image to always observe the subject image is displayed on the LCD 4. The through image is created with the moving image processing of n frame/second in through image generation part 31 to the output from the analog to digital converter 25. The created through image is displayed on the LCD 4 through the liquid crystal control part 30.

Moreover, the output (i.e., a digitalized pixel signal) from the analog to digital converter 25 is input to an AE (automatic exposure) processing part 32 and an AF (automatic focus adjustment) processing part 33 as an image signal.

The AE processing part 32 performs the arithmetic processing, in which accumulation of the pixel signal from each pixel is mainly performed. And, the AE processing part 32 obtains the AE evaluation value corresponding to the brightness of subject based on the accumulated value. For instance, the AF processing part 33 extracts the high frequency component of the pixel signal for one screen with the high-pass filter. And, the AF processing part 33 performs the arithmetic processing of the accumulation etc. to the extracted high frequency component, and calculates the AF evaluation value corresponding to the amount of an outline element on the high region side.

The system controller 100 controls all the operations of the imaging circuit 24, the analog to digital converter 25, the image processing part 26, the buffer memory 27, the compression extension part 28, the liquid crystal control part 30, the through image creation part 31, the AE processing part 32, and AF processing part 33. The system controller 100 executes above-mentioned various controls based on the processing results of the AE processing part 32 and the AF processing part 33, and the instruction from the operation part 40 which has the release button 6, the menu button 8, the cross button 9, and the OK button 10 shown in FIG. 1.

The system controller 100 performs the following processing. The system controller 100 controls a light amount by controlling the iris/shutter 12 based on the AE evaluation value obtained by the AE processing part 32. The system controller 100 controls the charge accumulation time of the CCD 15 by the imaging circuit 24, and performs an automatic exposure (AE) processing. The system controller 100 performs an automatic focus adjustment (AF) processing by moving the third lens group 11c in the direction of an optical axis based on the AF evaluation value obtained by the AF processing part 33.

Moreover, the system controller 100 has a peculiar shutter driving control to the present invention in addition to above-mentioned various controls. A peculiar shutter driving control to the present invention is a control of properly driving the iris/shutter 12 which controls a light amount of the incident light to the CCD 15 and the eyepiece shutter 17 to cut the reverse-incident light from the eyepiece lens 3.

Figure 15:
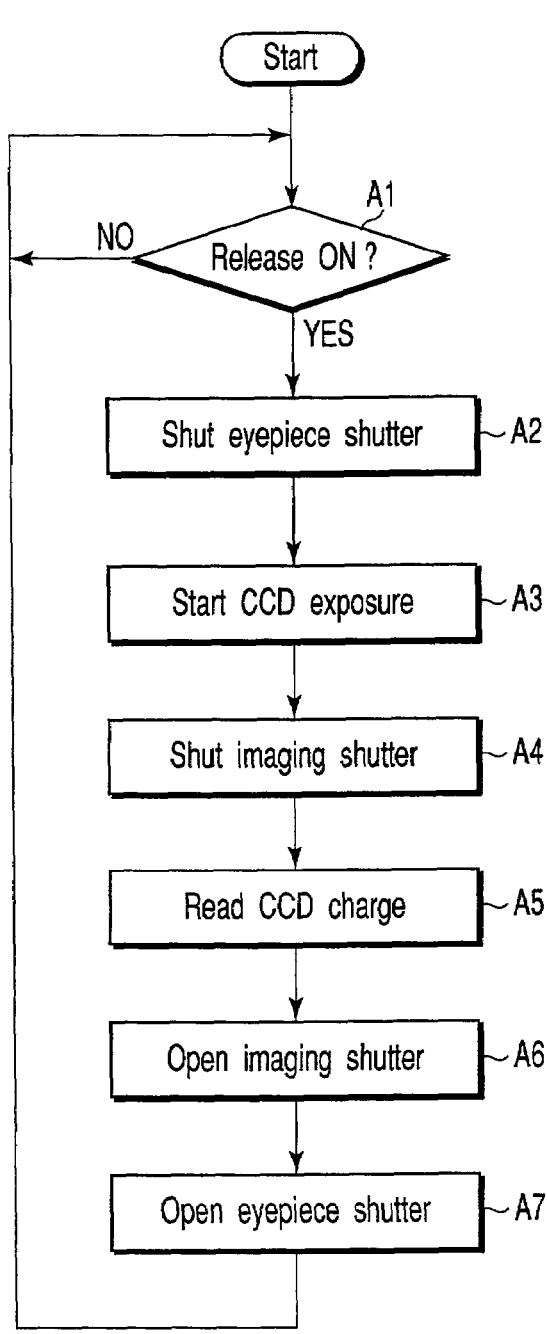
FIG. 15 is a flowchart showing the operation procedure of the shutter driving control by a system controller of an electronic camera according to the ninth embodiment.

The shutter driving control will be explained in detail referring to FIG. 15. FIG. 15 is a flowchart showing the operation procedure of the shutter driving control by the system controller 100.

When the ON of the release button 6 is notified from the operation part 40 (YES in step A1), the system controller 100 closes the eyepiece shutter 17 by the actuator 34 (step A2). When the eyepiece shutter 17 is closed, the system controller 100 directs the imaging circuit 24 start of the exposure of the CCD 15 (step A3).

The system controller 100 closes the imaging shutter 12 by the actuator 22 and ends the exposure (step A4). Thereafter, the system controller 100 makes the imaging circuit 24 execute the read of the charge from the CCD 15.

When the read of the charge from the CCD 15 is ended, the system controller 100 opens the imaging shutter 12 through the actuator 22 (step A6), and, next, opens the eyepiece shutter 17 through the actuator 34 (step A7).

The system controller 100 controls and drives the imaging shutter 12 and the eyepiece shutter 17 as mentioned above. That is, the system controller 100 controls the imaging shutter as a shutter closed only a period from the end of the exposure to the CCD 15 to the end of read from the CCD 15, thereby the subject image imaged with the CCD 15 can be observed in anytime on the LCD 4. In addition, the system controller 100 controls the eyepiece shutter 17 as a shutter closed before the start of the exposure to the CCD 15 to the end of read from the CCD 15, thereby unnecessary reverse-incident light can be removed.

As mentioned above, in the electronic camera according to the ninth embodiment, it becomes possible to achieve both of the display of the usual through image by the LCD and the removal of the reverse-incident light at photographing by only providing the lens shutter without focal plane shutter having the start curtain and the end curtain. As a result, it becomes possible to further promote the miniaturization of the entire camera.

It is sufficient to comprise only the end curtain, even when the focal plane shutter is adopted. Therefore, the miniaturization of the camera is not obstructed.

Tenth Embodiment

Figure 18:
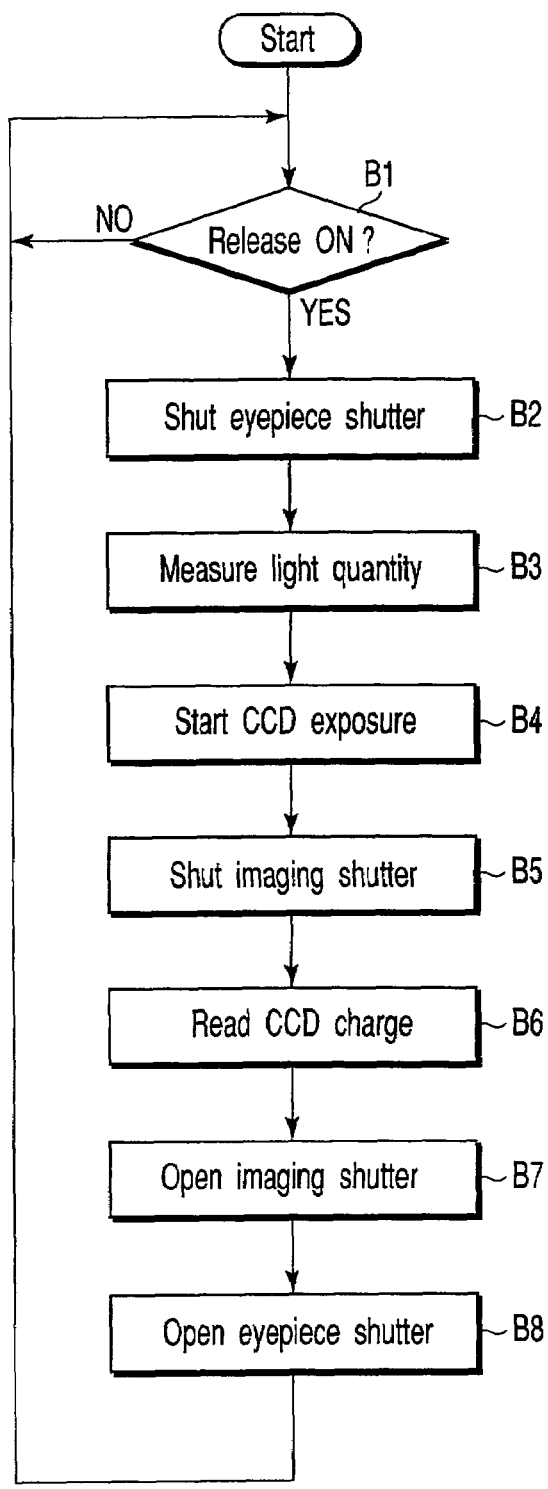
FIG. 18 is a flowchart showing the operation procedure of the shutter driving control by a system controller of an electronic camera according to the tenth embodiment.
Figure 16:
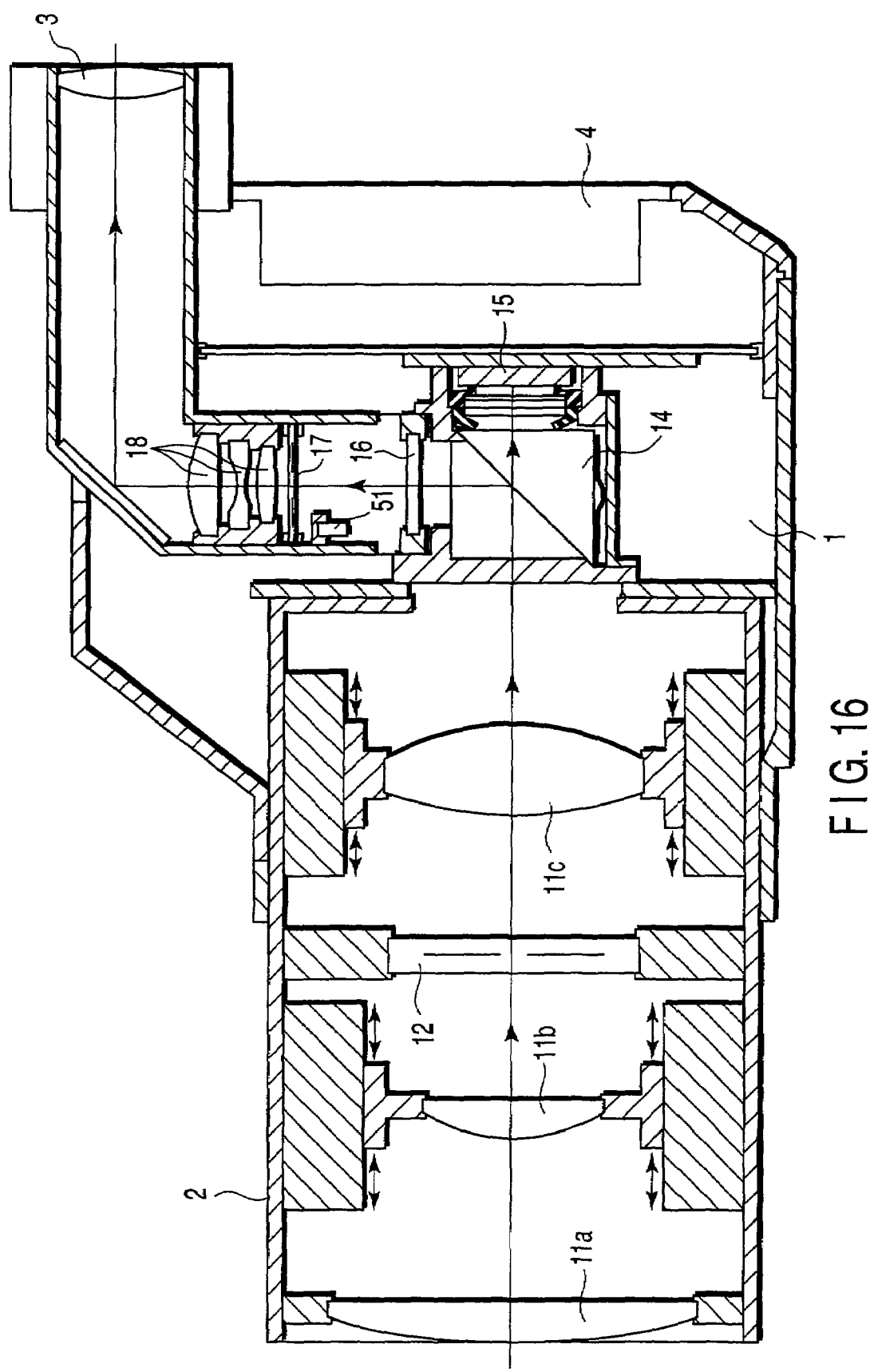
FIG. 16 is a cross sectional view showing an internal structure of an electronic camera according to the tenth embodiment.

The tenth embodiment of the present invention will be explained referring to FIG. 16 to FIG. 18. FIG. 16 is a cross sectional view showing an internal structure of the electronic camera according to the tenth embodiment.

As shown in FIG. 16, the electronic camera according to the tenth embodiment further comprises a light amount measurement device 51 to control an exposure in addition to the camera according to the ninth embodiment.

With above-mentioned configuration, the electronic camera according to the tenth embodiment is characterized in that an influence of the reverse-incident light is completely removed at the light amount measurement by performing the shutter driving control to close the eyepiece shutter 17 before the light amount measurement with the light amount measurement device 51 when release button 6 is pushed.

Figure 17:
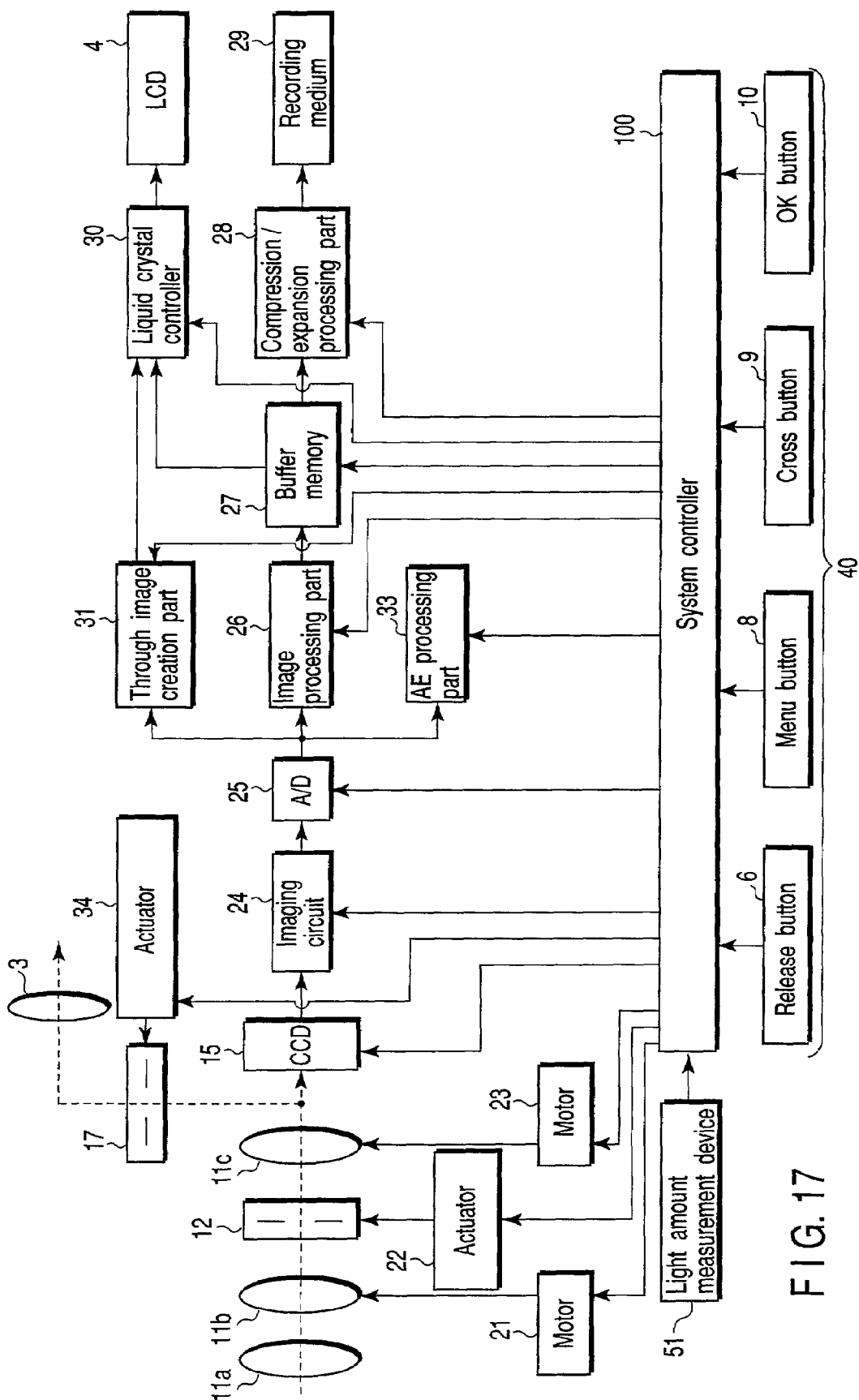
FIG. 17 is a function block of an electronic camera according to the tenth embodiment.

FIG. 17 is a function block of the electronic camera according to the tenth embodiment. In FIG. 17, the same reference numeral is fixed to the same part as FIG. 14, and a detailed explanation will be omitted. As shown in FIG. 17, the output of the light amount measurement device 51 provided in the electronic camera is supplied to the system controller 100. The system controller 100 determines a so-called exposure condition such as a light amount with the imaging shutter 12 and a charge accumulation time of the CCD 15 etc., based on the output from the light amount measurement device 51. Then, the system controller 100 properly controls the driving of the imaging shutter 12 and the eyepiece shutter 17 to more adequately perform the decision of the exposure condition.

The shutter driving control will be explained in detail referring to FIG. 18. FIG. 18 is a flowchart showing the operation procedure of the shutter driving control by the system controller 100.

First of all, when an ON of the release button 6 is notified from the operation part 40 (YES in step B1), the system controller 100 closes the eyepiece shutter 17 by the actuator 34 (step B2). When the eyepiece shutter 17 is closed, the system controller 100 performs the light amount measurement with the light amount measurement device 51 and determines the exposure condition (step B3).

Since the processing from the following step of step B4 to step B8 is the same as the processing from step A3 to step A7 in FIG. 15, the explanation thereof will be omitted.

As mentioned above, in the electronic camera according to the tenth embodiment, the eyepiece shutter 17 is closed before the light amount measurement to determine the exposure condition. As a result, the influence of the reverse-incident light at the light amount measurement can be removed.

In the tenth embodiment, an example for executing the light amount measurement with the light amount measurement device 51 to determine the exposure condition is explained. It is not limited to this, the light amount measurement may be performed by using the pixel signal read from the CCD 15. In a word, even when the automatic exposure (AE) processing by the AE processing part 32 explained in the ninth embodiment after the eyepiece shutter 17 is closed, the control method of driving the shutter is effective.

According to the ninth embodiment and the tenth embodiment, the imaging shutter and the eyepiece shutter are controlled as follows. The imaging shutter is used as a shutter closed only a period from the end of the exposure of the image data reading to the end of the read of the imaging data in the imaging device. As a result, it becomes possible to observe the subject image taken by the imaging device with the LCD anytime. The eyepiece shutter is used as a shutter closed a period before start exposure of the imaging device to after end of the read of the image data. As a result, it becomes possible to remove unnecessary the reverse-incident light.

Moreover, it is sufficient to provide only the end curtain, when the focal plane shutter is adopted in the ninth embodiment and the tenth embodiment. Therefore, the camera can be miniaturized. In addition, if the lens shutter is adopted, the miniaturization of the camera can be further promoted.

If eyepiece shutter is closed before the light amount measurement to determine the exposure condition, the influence of reverse-incident light at the light amount measurement can be removed.

Eleventh Embodiment

Figure 19:
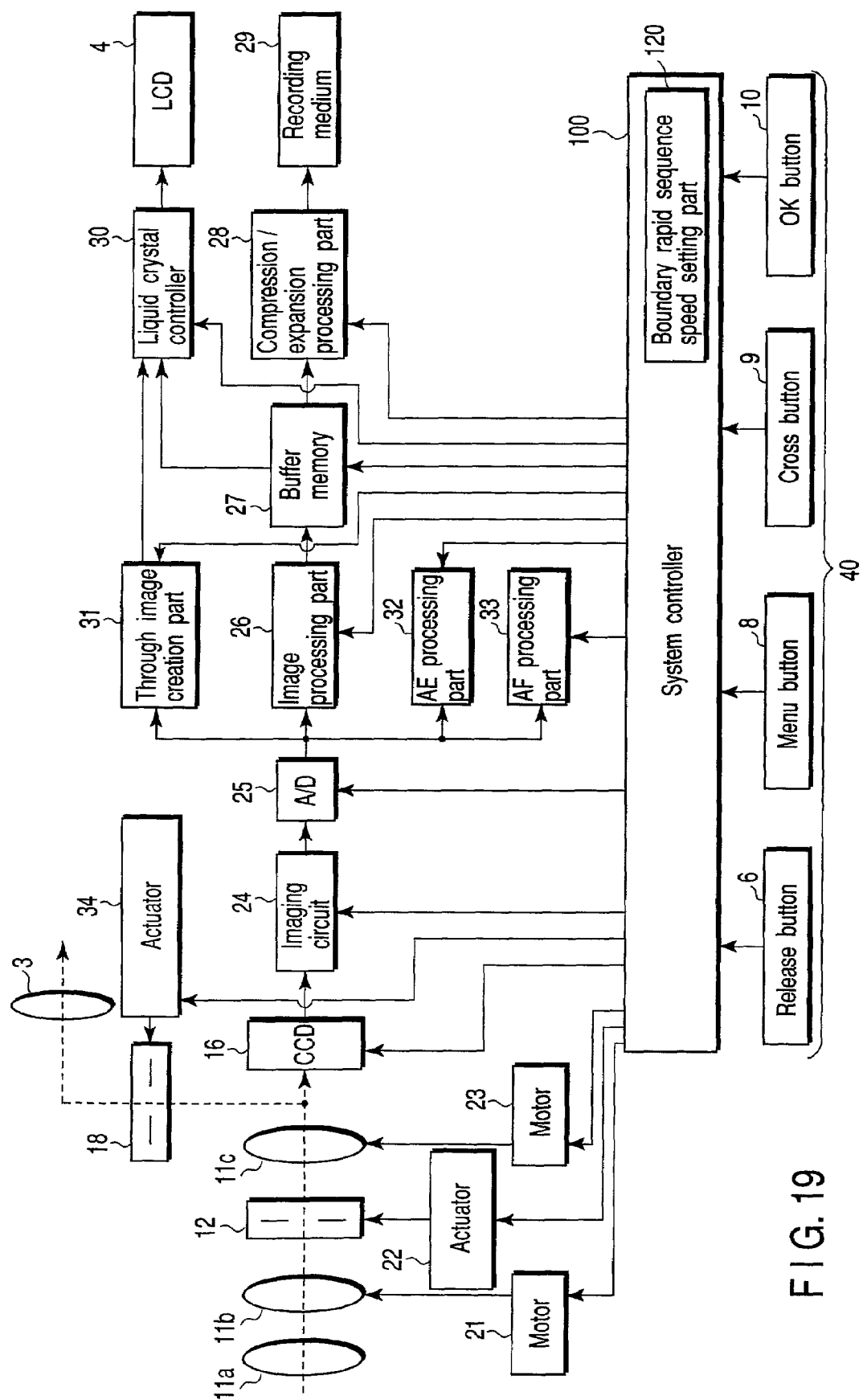
FIG. 19 is a function block of an electronic camera according to the eleventh embodiment and the twelfth embodiment.

The eleventh embodiment of the present invention will be explained referring to FIG. 19 and FIG. 20. FIG. 19 is a function block of the electronic camera. The point where FIG. 19 is different from FIG. 14 is that the boundary rapid sequence speed setting part 120 is provided in the system controllers 100.

The electronic camera according to the eleventh embodiment has a so-called rapid sequence function. When the rapid sequence function is set to the system controller 100, the photographing processing is repeated at a predetermined rapid sequence speed, in a word, at intervals of n times (n is positive numerical excluding 0) for one second during a push information of the release button 6 is notified from the operation part 40. The rapid sequence function is set by the operation of the menu button 8, the cross button 9, and the OK button 10. Then, the system controller 100 has a peculiar shutter driving control to the present invention such as a driving control of the eyepiece shutter 17 so as to make the disappearance of the subject image in the viewfinder and the influence of reverse-incident light from the eyepiece minimum, relating to the rapid sequence function besides the above-mentioned various controls.

The shutter driving control will be explained in detail referring to FIG. 20. FIG. 20 is a flowchart showing the operation procedure of the shutter driving control by the system controller 100.

First, when the ON of the release button 6 is notified from the operation part 40 (YES in step C1), the system controller 100 checks whether the rapid sequence function is set (step C2). In step C2, if the rapid sequence mode is set (YES in step C2), whether the rapid sequence speed set by the user is faster than the predetermined boundary rapid sequence speed is checked (step C3).

In step C3, if the rapid sequence speed set by the user is faster than that (YES in step C3), the system controller 100 executes the light amount measurement by the AE processing part 32 without driving the eyepiece shutter 17 (step C4). And, the system controller 100 directs the imaging circuit 24 start of the exposure of the CCD 15 based on the light amount measurement result (step C5). Thereafter, the system controller 100 closes the imaging shutter 12 by the actuator 22 to end the exposure (step C6). Then, under the control of the system controller 100, the imaging circuit 24 read the signal from the CCD 15.

When read from the CCD 15 is ended, the system controller 100 opens the imaging shutter 12 through the actuator 22 (step C8). Next, the system controller 100 checks whether the release button 6 is kept ON (step C9). In step C9, the release button 6 is ON (YES in step C9), the system controller 100 repeats procedure from step C4.

The system controller 100 makes the eyepiece shutter 17 open fixedly, when photographing which uses the rapid sequence function and the rapid sequence speed set by user is faster than the predetermined boundary rapid sequence speed, as mentioned above.

In step C3, when the speed set by the user is the same speed as the predetermined boundary rapid sequence speed or the speed set by the user is slower than that (NO in step C3), the system controller 100 closes the eyepiece shutter 17 through the actuator 34 (step C10). Thereafter, the system controller 100 executes the light amount measurement by the AE processing part 32 (step C11). The system controller 100 directs imaging circuit 24 the start of the exposure of the CCD 15 based on the light amount measurement result (step C12). The system controller 100 closes the imaging shutter 12 through the actuator 22 to end the exposure (step C13) and makes the imaging circuit executing read from the CCD 15 (step C14).

When the read from the CCD 15 is ended, the system controller 100 opens the imaging shutter 12 through the actuator 22 (step C15). And, the system controller 100 opens the eyepiece shutter 17 through the actuator 34 (step C16). The system controller 100 checks whether the release button 6 is kept ON, if the release button 6 is ON (YES in step C17), the system controller 100 repeats procedure from step C10.

As mentioned-above, the eyepiece shutter 17 is i15 opened and closed each every photographing by the system controller 100, when photographing which uses the rapid sequence function is performed and the rapid sequence speed set by the user is the same as the predetermined rapid sequence speed or the rapid sequence speed set by the user is slower than that.

In a case that the rapid sequence mode is not set (NO in step C2), the system controller 100 performs the usual photographing by the procedure from step C18 to step C24. The processing from step C18 to step C24 is the same as processing from above-mentioned step C10 to step C16, detailed explanations will be omitted.

As mentioned above, in the electronic camera according to the eleventh embodiment, the eyepiece shutter 17 is opened and closed in every photographing when photographing which uses the rapid sequence function is executed, at the low-speed rapid sequence and cut the reverse-incident light from the viewfinder completely. On the other hand, the electronic camera according to the eleventh embodiment opens the eyepiece shutter 17 fixedly at high-speed rapid sequence and removes the disappearance of the subject image in the viewfinder.

The system controller 100 has the boundary rapid sequence speed setting part 120 for the user to set the above-mentioned boundary rapid sequence speed arbitrarily.

The user selects the desired boundary rapid sequence speed from two or more selection alternatives such as five photographings or three photographings per a second, for instance, by operating the menu button 8, the cross button 9, and The OK button 10 in boundary rapid sequence speed setting part 120.

As mentioned above, since the user can set the boundary rapid sequence speed, it becomes possible to reflect the hope of the user such as "I want to give priority to removing the influence of the reverse-incident light from the viewfinder even if the subject image disappears in the viewfinder" or "I want to give priority to avoiding the disappearance of the subject image in the viewfinder even if the reverse-incident light from the viewfinder somewhat influences".

Twelfth Embodiment

The twelfth embodiment of the present invention will be explained referring to FIG. 21. In the twelfth embodiment, since the configuration is similar to the eleventh embodiment, drawings and explanation will be omitted.

When the rapid sequence speed set by the user is faster than the predetermined boundary rapid sequence speed, in the eleventh embodiment, the eyepiece shutter 17 is fixedly opened. When the rapid sequence speed set by the user is faster than the predetermined boundary rapid sequence speed, the eyepiece shutter 17 is fixedly closed in the twelfth embodiment.

Figure 21:
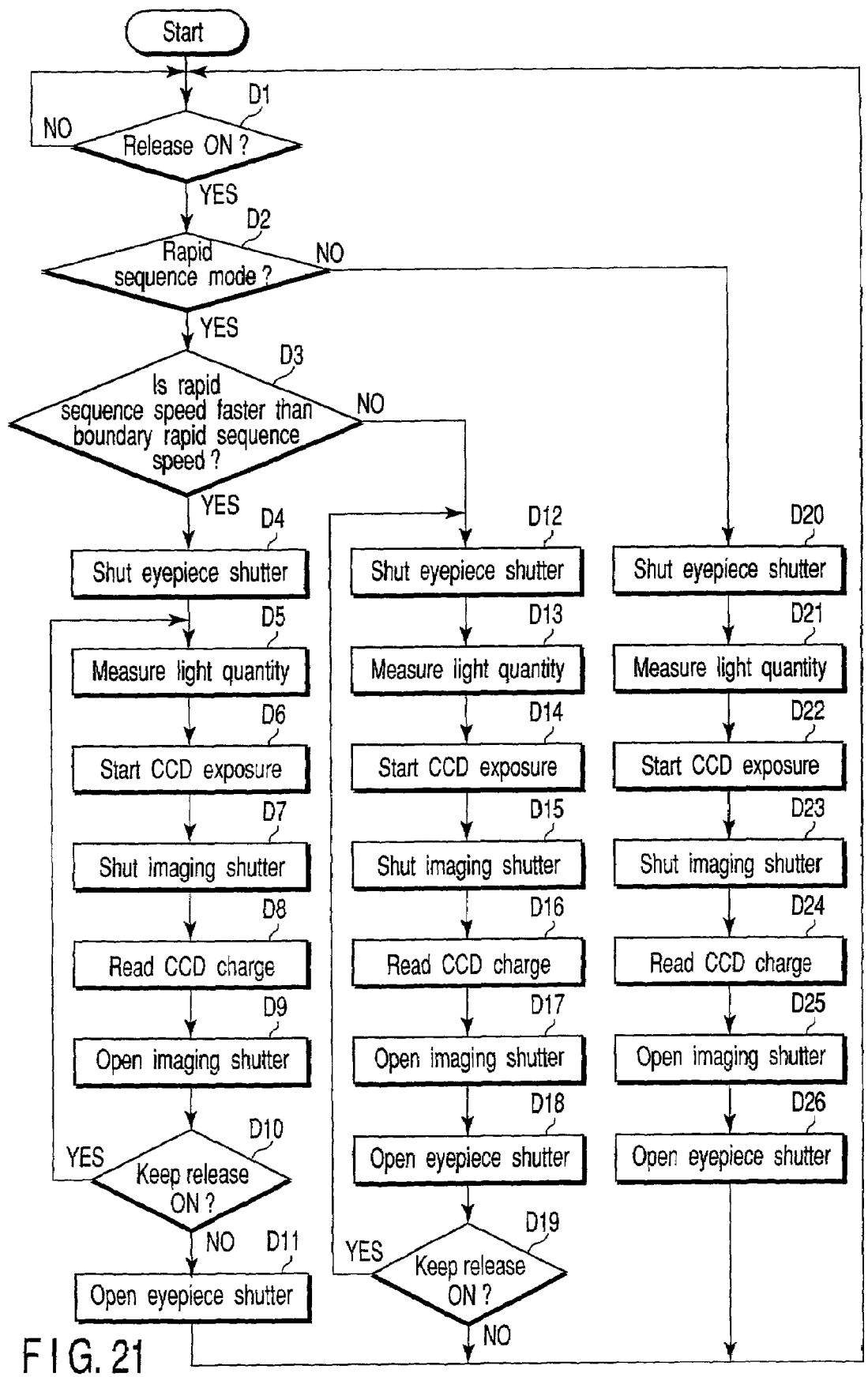
FIG. 21 is a flowchart showing the operation procedure of the shutter driving control by a system controller of an electronic camera according to the twelfth embodiment.

FIG. 21 is a flowchart showing the operation procedure of the shutter driving control by the system controller 100 of the electronic camera according to the twelfth embodiment.

First, when the ON of the release button 6 is notified from the operation part 40 (YES in step D1), the system controller 100 checks whether the rapid sequence function is set (step D2). In step D2, if the rapid sequence mode is set (YES in step D2), whether the rapid sequence speed set by the user is faster than the predetermined boundary rapid sequence speed is checked (step D3).

In step D3, if the rapid sequence speed set by the user is faster than that (YES in step D3), the system controller 100 closes the eyepiece shutter 17 through the actuator 34 (step D4). Thereafter, since processing from step D5 to step D10 is similar to processing from step C4 in FIG. 20 to step C9, the explanation thereof will be omitted.

In step D10, the system controller 100 checks whether the release button 6 is kept ON (step D10). In step D10, if the release button 6 is ON (YES in step D10), the system controller 100 repeats procedure from step D5. If the release button 6 becomes turned off (NO in step D10), the system controller 100 opens the eyepiece shutter 17 through the actuator 34 (step D11).

As mentioned above, when photographing using the rapid sequence function is performed and the rapid sequence speed set by the user is faster than the predetermined boundary rapid sequence speed, the system controller 100 closes the eyepiece shutter 17 fixedly.

When the rapid sequence speed set by the user is the same as the predetermined boundary rapid sequence or the rapid sequence speed set by the user is slower than that (NO in step D3), the processing from step D12 to step D19 is executed.

In a case that the rapid sequence mode is not set (NO in step D2), the system controller 100 performs the usual photographing by the procedure from step D20 to step D26.

Figure 20:
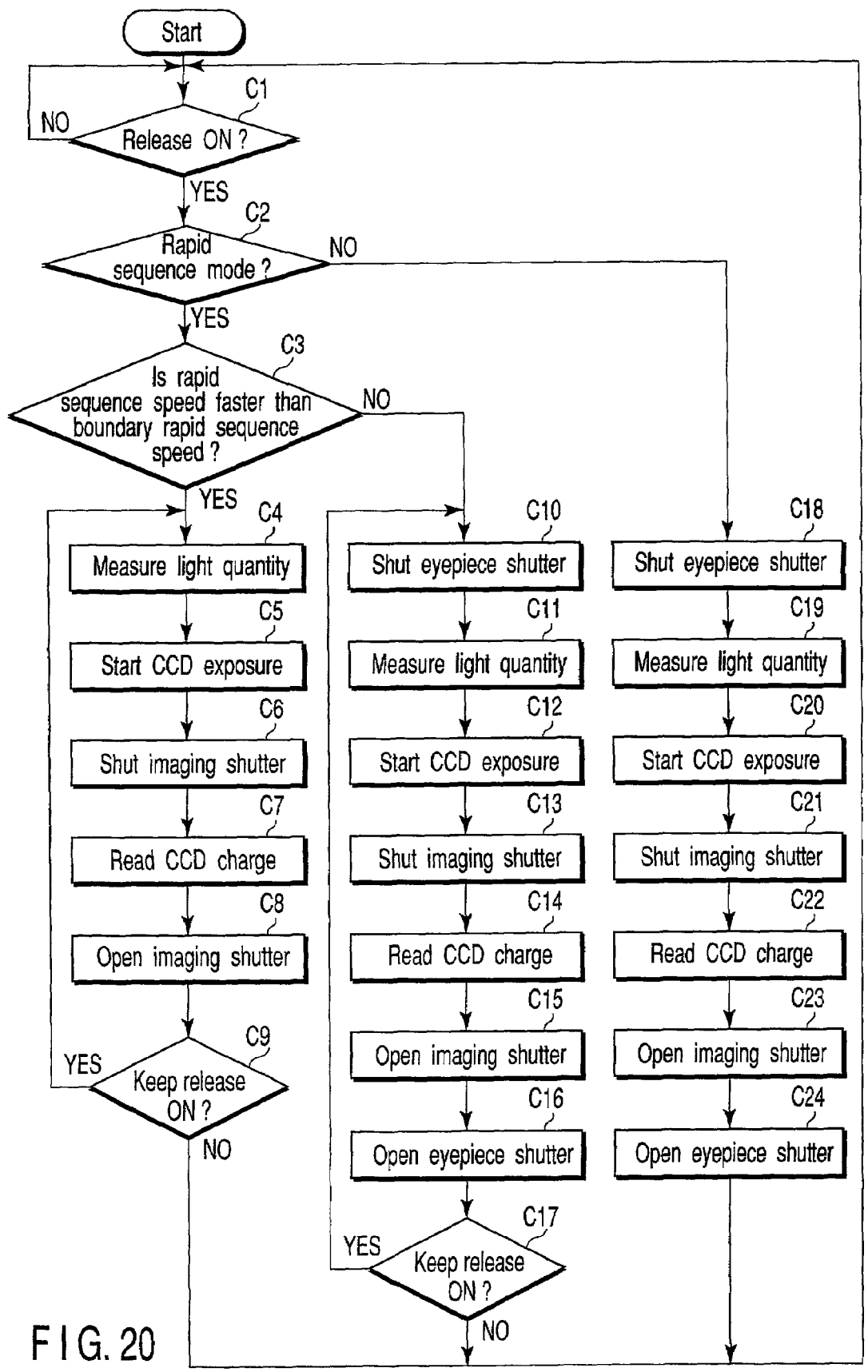
FIG. 20 is a flowchart showing the operation procedure of the shutter driving control by a system controller of an electronic camera according to the eleventh embodiment.

Since the processing from step D12 to step D19 is similar to the processing from step C10 in FIG. 20 to step C17, and the processing from step D20 to step D26 is similar to the processing from step C18 in FIG. 20 to step C24, a detailed explanation thereof will be omitted.

As mentioned above, in the electronic camera according to the twelfth embodiment, the eyepiece shutter 17 is closed fixedly in consideration of substantially disappearance of the subject image in the viewfinder at high-speed rapid sequence, when the eyepiece shutter 17 is high-speed driven.

As a result, it is achieved to remove the influence of the reverse-incident light from the viewfinder at high-speed rapid sequence completely.

Thirteenth Embodiment

The thirteenth embodiment of the present invention will be explained referring to FIG. 22 and FIG. 23.

Figure 22:
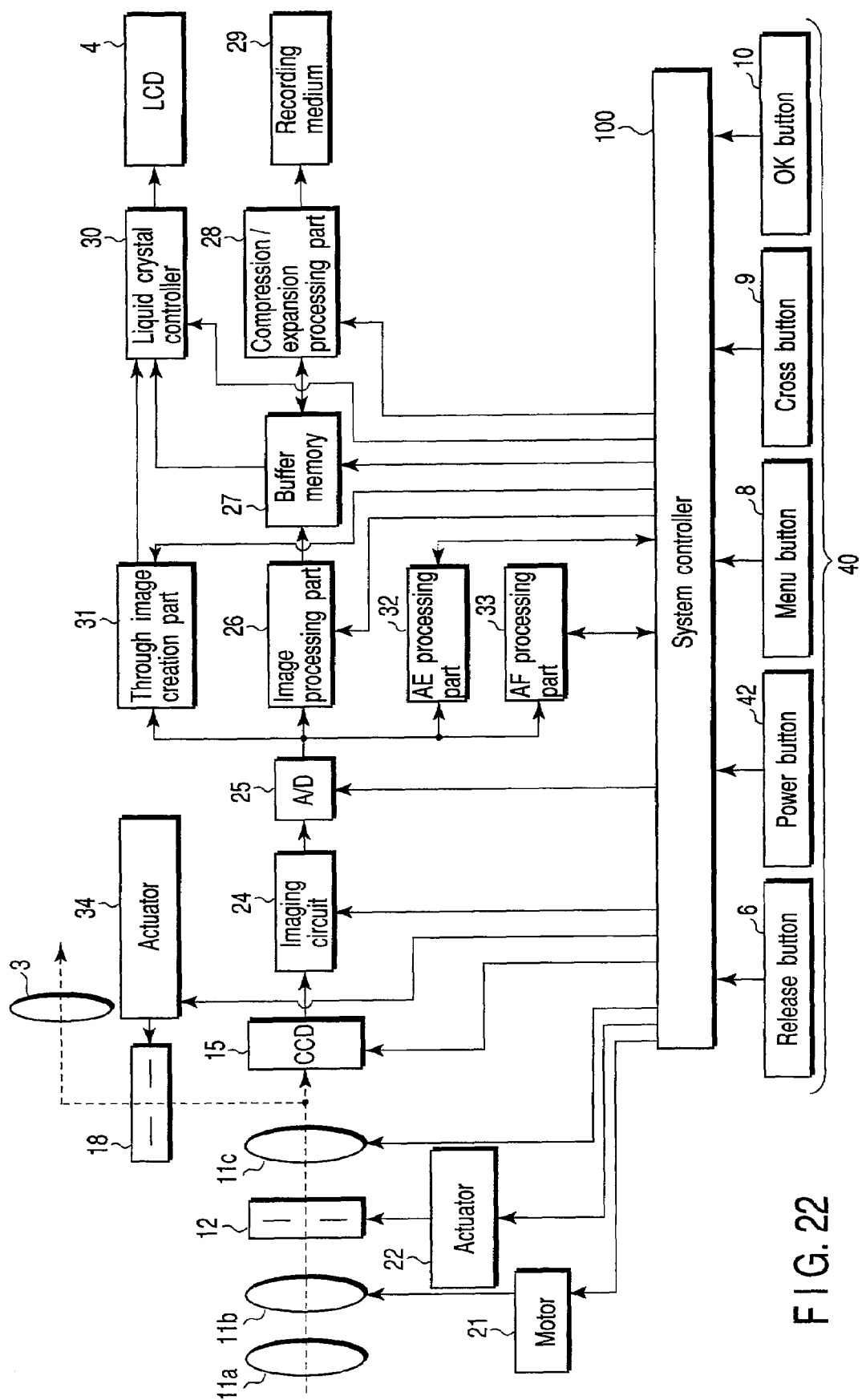
FIG. 22 is a function block of an electronic camera according to the thirteenth embodiment.
Figure 23:
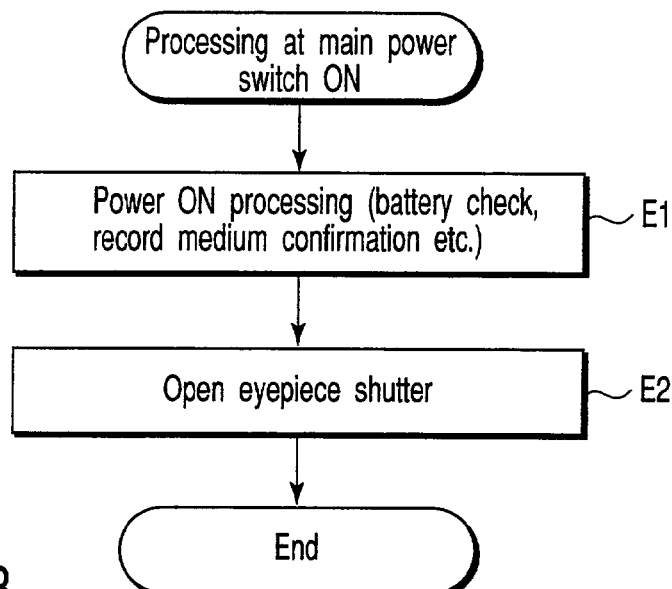
FIG. 23 is a flowchart showing the operation procedure of the shutter driving control by a system controller of an electronic camera according to the thirteenth embodiment.

FIG. 22 is a function block of the electronic camera according to the thirteenth embodiment. In the electronic camera according to the thirteenth embodiment, the power supply switch 42 is added to FIG. 14. A detailed explanation will be omitted since other construction is similar to FIG. 14. FIG. 23 is a flowchart showing the operation procedure of the shutter driving control by the system controller 100.

When the ON of the power supply switch 42 is notified from the operation part 40 to the system controller 100, the battery check and the record medium check, etc., so-called a power on processing are executed (step E1). When the power on processing is finished, the system controller 100 opens the eyepiece shutter 17 through the actuator 34 (step E2).

To shift the eyepiece shutter 17 from the close state to the open state, when a main power supply is turned on, the system controller 100 forcibly operates the actuator 34 as mentioned above in the thirteenth embodiment.

As a result, the eyepiece shutter 17 enters the open state corresponding to a power supply on even if the eyepiece shutter 17 is displaced at an off power supply for instance in the close state. Therefore, a valuable shutter chance is never missed according to the thirteenth embodiment.

When the eyepiece shutter 17 is configured to be driven with the actuator 34 which is an electrical-mechanical conversion actuator, it becomes possible for the eyepiece shutter 17 to surely be a close state when the camera is non-used. As a result, fear to cause damage for the mechanism in the camera by the reverse-incident light from the eyepiece lens 3 of the viewfinder can be removed.

In the thirteenth embodiment, the example of automatically opening and closing the eyepiece shutter 17 with the actuator 34 is explained. It is not limited to this, and when the open or close of the eyepiece shutter 17 is performed manually, the technique of the shutter driving control is effective. In this case, the actuator 34 may have only the mechanism to open the eyepiece shutter 17 when a main power supply is turned on.

The actuator is forcibly operated to shift the eyepiece shutter from the close state to the open state regardless of the state of the eyepiece shutter when the power supply of the camera is turned on (even in a case of being in a shutter open state) according to the thirteenth embodiment. As a result, the eyepiece shutter enters the open state at the power supply ON, even when the eyepiece shutter becomes in close state by the impact applied to the main body of the camera when the power supply is OFF. Therefore, it becomes possible to start the photographing operation immediately if looking at the viewfinder. Therefore, a valuable shutter chance is surely prevented from being missed.

Fourteenth Embodiment

Figure 24:
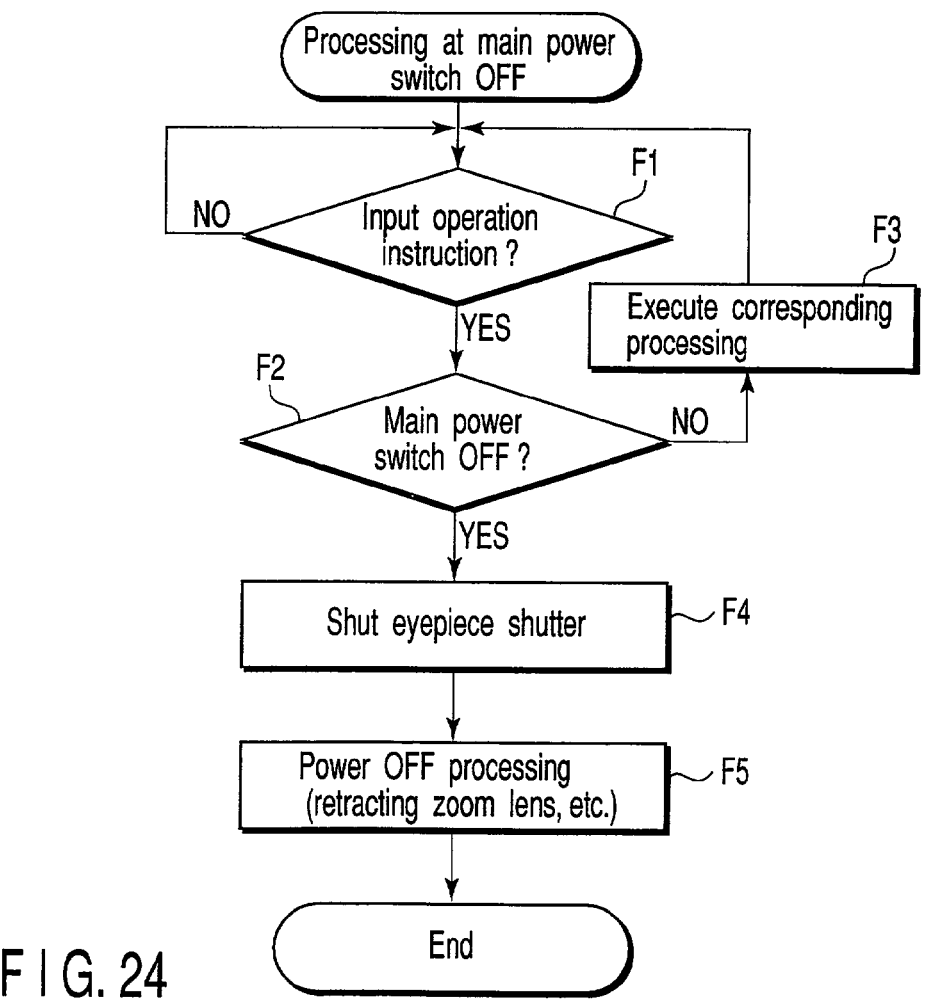
FIG. 24 is the first flowchart showing the operation procedure of the shutter driving control by a system controller of an electronic camera according to the fourteenth embodiment.

The fourteenth embodiment of the present invention will be explained referring to FIG. 24. In the fourteenth embodiment, since the function configuration is similar to FIG. 22, drawings and explanation thereof will be omitted. FIG. 24 is a flowchart showing the operation procedure of the shutter driving control by the system controller 100.

The system controller 100 waits the notification from the operation part 40 (step F1). The system controller 100 judges whether the notification is OFF of the power supply switch 42 (step F2), when some notifications are received from the operation part 40 (YES in step F1).

If the corresponding notification is not OFF of the power supply switch 42 (NO in step F2), the system controller 100 executes the processing corresponding to the operation (step F3). The system controller 100 waits the notification from the operation part 40, again. On the other hand, if the corresponding notification is OFF of the power supply switch 42 (YES in step F2), the system controller 100 closes the eyepiece shutter 17 through the actuator 34 (step F4) and executes the zoom lens housing, etc. that is, power off processing (step F5).

As mentioned above, in the fourteenth embodiment, the system controller 100 forcibly operates the actuator 34 to shift the eyepiece shutter 17 from the open state to the close state when a main power supply is turned off.

The actuator is forcibly operated to shift the eyepiece shutter from the open state to the close state regardless of the state of the eyepiece shutter when the power supply of the camera is turned off (even in a case of being in a shutter close state) according to the fourteenth embodiment. When the eyepiece shutter is configured to be driven with the actuator which is an electrical-mechanical conversion actuator, it becomes possible for the eyepiece shutter 17 to surely be a close state when the camera is non-used. As a result, fear to cause damage for the mechanism in the camera by the reverse-incident light from the eyepiece lens 3 of the viewfinder can be removed.

Fifteenth Embodiment

The fifteenth embodiment of the present invention will be explained from FIG. 25 referring to FIG. 27. FIG. 25 is a function block of the electronic camera according to the fifteenth embodiment. In FIG. 25, the same reference numeral is fixed to the same part as FIG. 17, and a detailed explanation will be omitted.

In FIG. 25, the operation part 40 comprises a white balance button 7 to execute the best color temperature adjustment, in a word, the auto white balance processing according to the state of the source of light at the time of photographing. When pushing the white balance button 7 is notified from the operation part 40, by the system controller 100, the adjustment data which is a reference of the auto white balance processing from the digital signal obtained by the CCD 15, imaging circuit 24, and analogue to digital converter 25 is created in the image processing part 26 and the created adjustment data is memorized to the image processing part 26. In a word, when the subject is photographed in the room illuminated by the colors other than white, if the white balance button 7 is pushed to match the white paper put in the room, the color on paper is acquired as the adjustment data that of the reference of the auto white balance processing. As a result, it become possible to photograph the image of the subject influenced by the illumination by an original color etc. in externals.

Moreover, in the camera according to the fifteenth embodiment, the AE evaluation value calculated by the AE processing part 32 is acquired, when the release button 6 is semi-pushed, to perform an appropriate automatic exposure processing in which the subject is centralized, for instance, even if it is a state of so-called reverse-light that the sun enters in the frame. As a result, if the release button 6 is semi-pushed while the sun is at an outside of the frame once, it becomes possible to perform photographing in which the exposure is determined where the subject is centralized without the influence of the sun even when the sun is in the frame at pushing the release button 6 (this operation is called an "AE lock").

To precisely perform the above-mentioned processing, when the white balance button 7 is pushed and/or the release button 6 is semi-pushed, the reverse-incident-light from the viewfinder is cut by closing the eyepiece shutter 17.

Moreover, the camera has the flash forced luminescence mode by which the flash 5 emits light forcibly, and when the flash forced luminescence mode is set by operating the menu button 8, the cross button 9, and the OK button 10, when the release button 6 is pushed, the system controller 100 makes the flash 5 emit light through flash control circuit 35 regardless of the state.

Since the color temperature when the flash forced luminescence mode is set becomes the color temperature of the flash light, a precise color temperature adjustment is unnecessary. In a word, when the white balance button 7 is pushed in such a state, the camera gives a higher priority the removal of the disappearance of the subject image by closing the eyepiece shutter than the precision of the color temperature adjustment.

Figure 26:
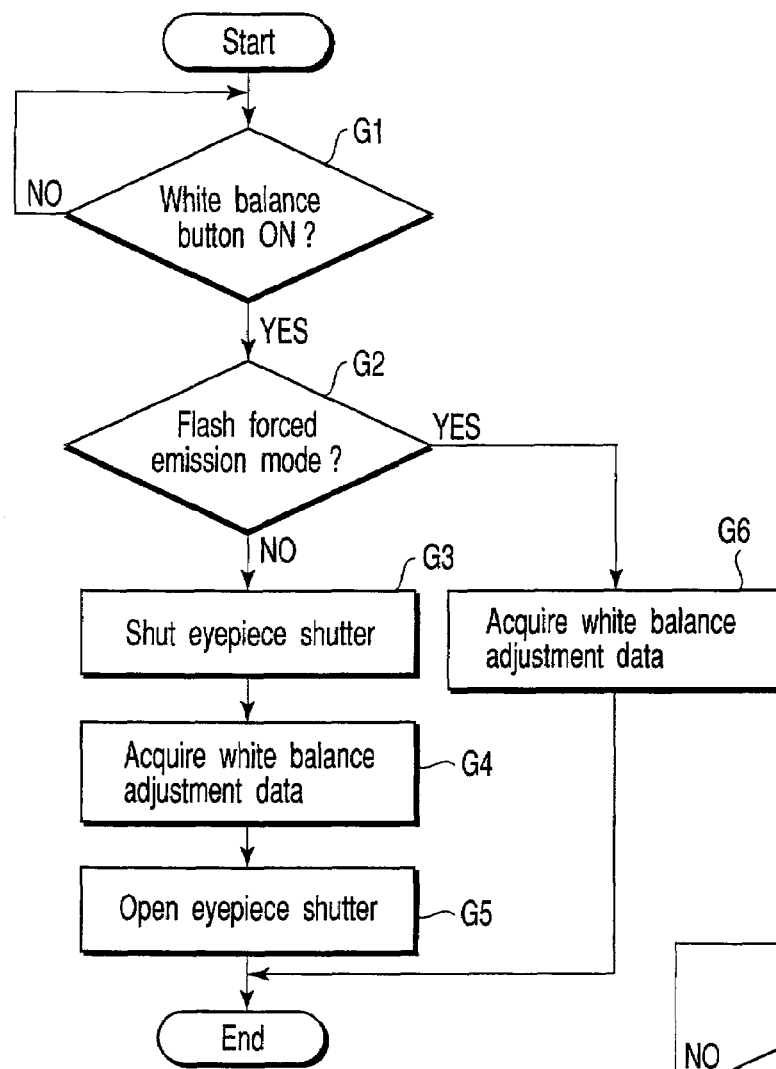
FIG. 26 is a flowchart showing the first operation procedure of the shutter driving control by a system controller of an electronic camera according to the fifteenth embodiment.

FIG. 26 is a flowchart showing the first operation procedure of the shutter driving control by the system controller 100.

The system controller 100 checks whether the flash forced luminescence mode is set (step G2), when on of the white balance button 7 is notified from the operation part 40 (YES in step G1). In step G2, if the flash forced luminescence mode is not set (NO in step G2), the system controller 100 closes the eyepiece shutter 17 through the actuator 34(step G3).

The system controller 100 controls the CCD 15, the imaging circuit 24, the analog to digital converter 25, and the image processing part 26, and acquires the adjustment data for white balance processing (step G4). After acquiring the adjustment data, the system controller 100 opens the eyepiece shutter 17 through the actuator 34 (step G5).

In step G2, when the flash forced luminescence mode is set (YES in step G2), the system controller 100 acquires the adjustment data for white balance processing (step G6). In this case, the system controller 100 does not open and close the eyepiece shutter 17 through the actuator 34.

As mentioned above, the white balance button 7 is pushed in a state where the flash forced luminescence mode is not set, the system controller 100 operates the actuator 34 to close or open the eyepiece shutter before and after acquiring the adjustment data for white balance processing.

As a result, the adjustment data for white balance processing can be acquired in a state where the reverse-incident light is cut from the viewfinder. Therefore, it becomes possible to more precisely perform the auto white balance processing.

Moreover, gives priority to losing the disappearance of the subject image by closing the eyepiece shutter 17 when the flash forced luminescence mode which does not need precise auto white balance processing is set.

Figure 27:
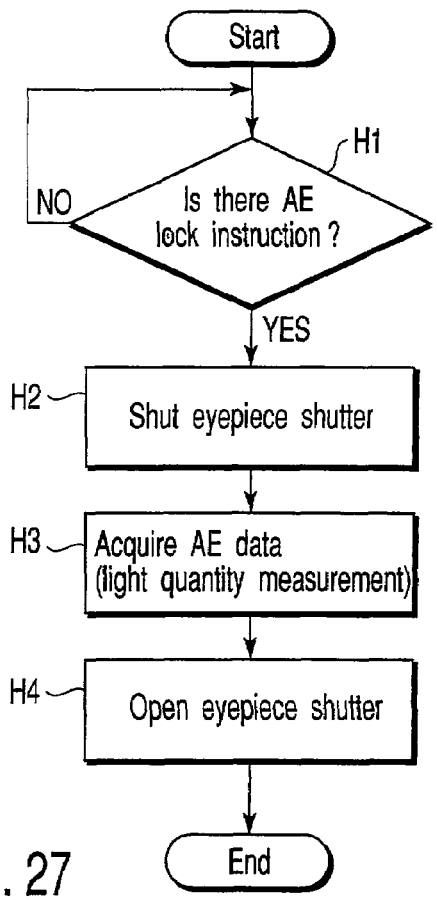
FIG. 27 is a flowchart showing the second operation procedure of the shutter driving control by a system controller of an electronic camera according to the fifteenth embodiment.

FIG. 27 is a flowchart showing the second operation procedure of the shutter driving control by the system controller 100.

When the semi-push of the release button 6 and is notified from the operation part 40 (YES in step H1), the system controller 100 closes the eyepiece shutter 17 through the actuator 34(step H2). Next, the system controller 100 controls the CCD 15, the imaging circuit 24, the analog to digital converter 25, and the AE processing part 32, and acquires the AE data for automatic exposure processing (step H3). And, after acquiring the AE data, the system controller 100 opens the eyepiece shutter 17 through the actuator 34 (step H4).

As mentioned above, the release button 6 is semi-pushed, the system controller operates the actuator 34 to close or open the eyepiece shutter before and after acquiring the AE data for automatic exposure processing.

As a result, the AE data for automatic exposure processing can be acquired in a state where the reverse-incident light is cut from the viewfinder. Therefore, it becomes possible to more precisely perform the automatic exposure processing.

The eyepiece shutter 17 may have a configuration to switch the penetration or cut (corresponding to open and close of the shutter) of the light from the subject are switched as the liquid crystal shutter.

Moreover, it is unnecessary to perform the AE lock by semi-push of the release button 6. A special AE lock button can be provided to the camera main body 1 by the same manner as the white balance button 7.

When the adjustment data which becomes the reference of the color temperature adjustment is acquired, the eyepiece shutter is automatically closed according to the fifteenth embodiment. Therefore, the reverse-incident light from the viewfinder can be prevented from being exerted on the adjustment data from influencing. Therefore, it becomes possible to more precisely perform the color temperature adjustment. It gives priority to the disappearance prevention of the subject image without performing the close or open of the eyepiece shutter in consideration of the precise color temperature adjustment being unnecessary at the flash forced luminescence.

Moreover, the eyepiece shutter is closed automatically when the light amount measurement data for exposure adjustment is acquired, for instance. Therefore, the reverse-incident light from the viewfinder can be prevented from being exerted on the light amount measurement data from influencing. Therefore, it becomes possible to more precisely perform the exposure adjustment.

Sixteenth Embodiment

Figure 28:
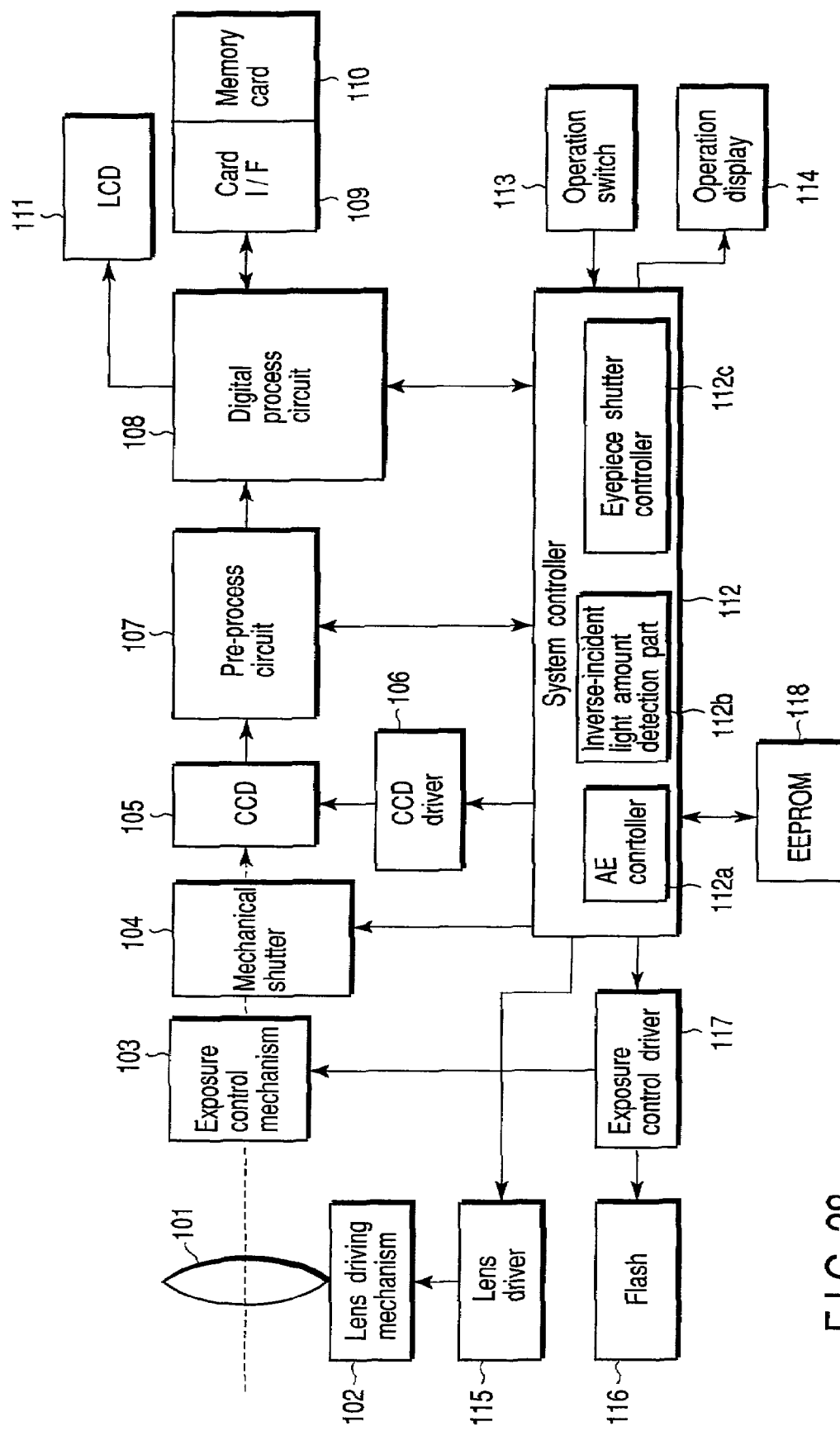
FIG. 28 is a function block of an electronic camera according to the sixteenth embodiment of the present invention.

The sixteenth embodiment of the present invention will be explained referring to FIG. 28 to FIG. 36. FIG. 28 is a figure showing the function configuration of the electronic camera according to the sixteenth embodiment of the present invention.

The electronic camera according to the sixteenth embodiment has a photographing lens system 101, a lens driving mechanism 102, an exposure control mechanism 103, a mechanical shutter 104, a CCD color imaging device 105, a CCD driver 106, a preprocess circuit 107, a digital process circuit 108, a card interface 109, a memory card 110, and an LCD image display system 111. The imaging lens system 101 comprises various lenses. The lens driving mechanism 102 drives the lens system 101. The exposure control mechanism 103 controls an iris of the lens system 101 to control the exposure. The color filter is built into the CCD color imaging device 105. The CCD driver 106 drives the imaging device 105. The preprocess circuit 107 includes the analog to digital converter etc. The digital process circuit 108 performs various digital processing, such as a color signal creation processing, a matrix conversion processing etc. The card interface 109 is connected with the digital process circuit 108.

The memory card 110 includes a CF (Compact Flash Memory Card) and a Smart Media, etc.

In addition, the electronic camera according to the sixteenth embodiment further comprises a system controller (CPU) 112, an operation switch system 113, an operation display system 114, a lens driver 115, a flash 116, an exposure control driver 117, and a nonvolatile memory (EEPROM) 118. The system controller (CPU) 112 controls each part integrally. The operation switch system 113 includes various operation buttons. The operation display system 114 displays the state of the operation and the state of the mode etc. The lens driver 115 controls the lens driving mechanism 102. The flash 116 is a luminescence means. The exposure control driver 117 controls the flash 116 and the exposure control mechanism 103. The EEPROM 118 memorizes various condition setting set information etc. The image defect data is stored in the EEPROM 118 beforehand with various condition setting set information etc.

Figure 29:
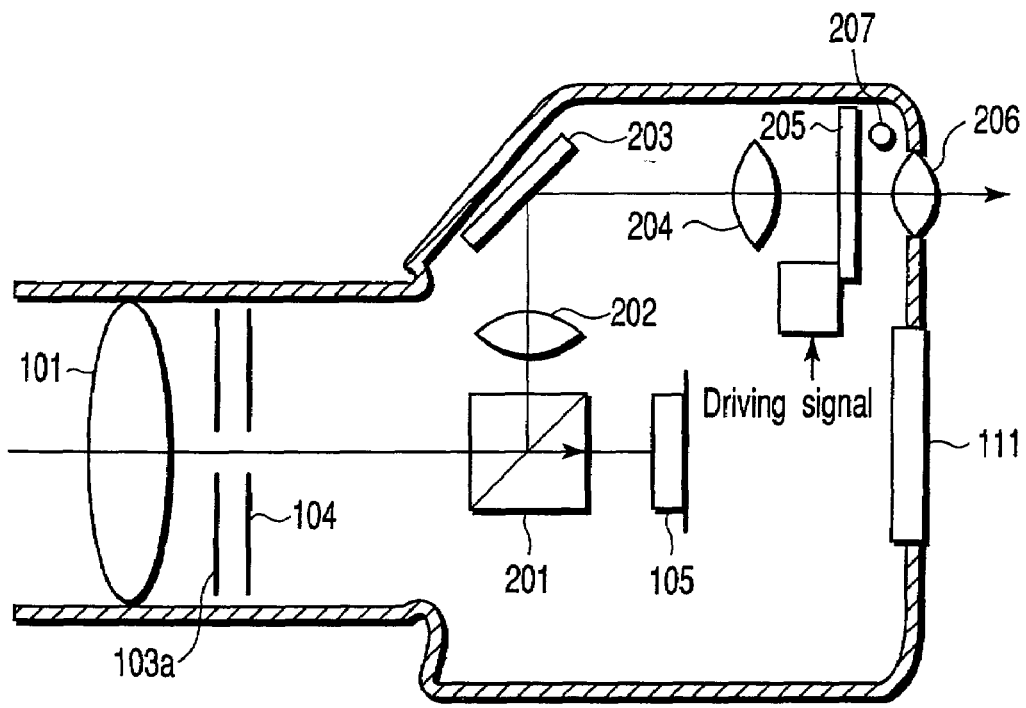
FIG. 29 is a figure showing the eyepiece shutter provided in an electronic camera according to the sixteenth embodiment and the configuration of the circumference.

The electronic camera according to the sixteenth embodiment has a well-known single lens reflex optical viewfinder. However, the optical path branched to the optical viewfinder is performed with the half mirror (prism). FIG. 29 shows the structure around the optical viewfinder.

The iris 103a, the mechanical shutter 104 and the half mirror 201 (prism) are provided on an optical path, which directs from photographing lens 101 to the imaging device 105 as shown in FIG. 29. The iris 103a has the above-mentioned exposure control mechanism 103. That is, the iris 103a has the aperture with a changeable size (iris). In the state that mechanical shutter 104 is open, on the imaging surface of CCD 105, the subject image input by the lens system 101 is formed through the half mirror 201 (prism). Moreover, the subject image is branched by the half mirror 201 (prism). An aerial image, which is branched by the prism 201 and is formed on the first image formation surface (between the prism 201 and the plane mirror 203), relayed by the plane mirror 203 and the second image formation lens 204. And, an aerial image re-formed by the second image formation lens 204 is magnified and observed by loupe lens 206 provided at the eyepiece window of the optical viewfinder (aperture).

Figure 30:
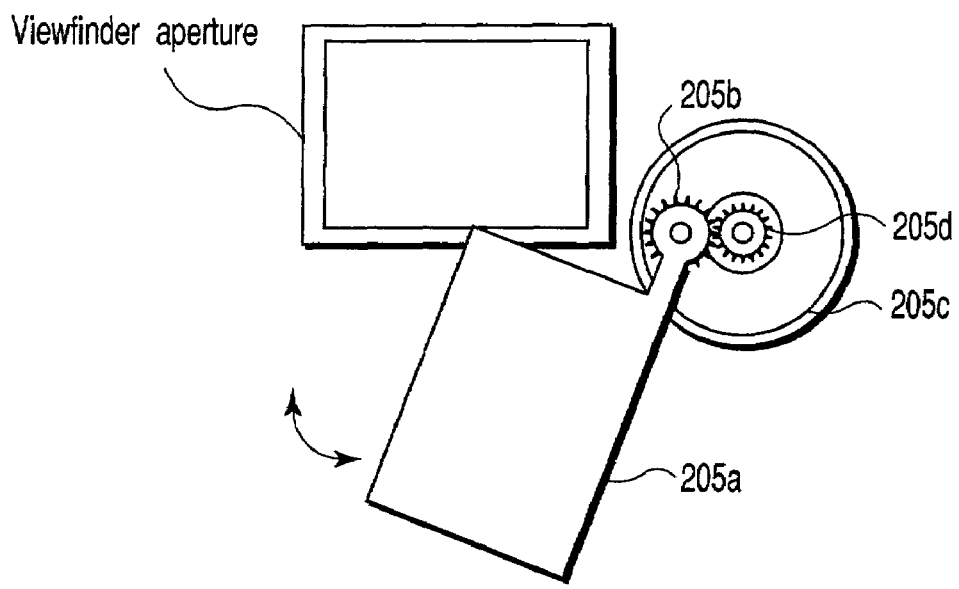
FIG. 30 is a figure showing a driving mechanism of the eyepiece shutter provided in an electronic camera according to the sixteenth embodiment.

The eyepiece shutter 205 to cut the reverse-incident light from the optical viewfinder is provided inside the loupe lens 206. The eyepiece shutter 205 is an electric shutter. The eyepiece shutter 205 is set to a position of one of light-shielding position or non-light shielding position to the eyepiece window of the optical viewfinder according to the driving signal from the system controller 112. The eyepiece shutter 205 has a shielding board 205a which consists of a resin board with matte black paint as shown in FIG. 30, and the gear 205b is provided to the turning shaft to which the shielding board 205a is attached. The gear 205b meshes to the gear 205d of motor 205c as driving mechanism of the eyepiece shutter 205. The shielding board 205a rotates between the shielding position and non-shielding position by the driving motor 205c.

A sensor 207 to detect the strength of the reverse-incident light from the optical viewfinder is provided inside of the eyepiece window 206. The strength of the reverse-incident light changes greatly according to the surrounding brightness, and whether the photographing operation is performed in the state that the photographer looks the optical viewfinder. The strength of the reverse-incident light at release operation can be detected accurately by providing the sensor 207. The strength of the reverse-incident light at release operation without using a special detection means as in sensor 207 of course can be detected. The strength of the reverse-incident light at release operation may be detected by checking the CCD output in the state of the close of the mechanical shutter 104 for instance in this case. Moreover, for instance, the control of considering that the eyepiece shutter 205 is set at a position of close position or open position by energizing the motor more than the predetermined time. In this case, the current setting (whether the shutter is at the close position or the open position) of the eyepiece shutter 205 may be managed by the internal flag of the system controller 112.

Moreover, other actuator, for instance, the solenoid and stepping motor etc. may be used instead of the control of the motor energizing time as mentioned above. It becomes possible to distinguish whether the current position of the eyepiece shutter 205 is the close position or the open position correctly by providing the sensor 207, though the current setting condition of the eyepiece shutter 205 can be controlled by the internal flag of the system controller 112 in this case.

The system controller 112 integrally performs entire control of the camera according to the sixteenth embodiment. The system controller 112 controls the driving of the CCD imaging device 105 by the exposure control mechanism 103 and the CCD driver 106 to read the exposure (charge accumulation) and the signal. The system controller 112 performs an A/D-conversion through the preprocess circuit 107 and takes it into the digital process circuit 108. And, after various signal processing is performed in the digital process circuit 108, the system controller 112 records it on the memory card 110 by the card interface 109.

The driving control of the CCD imaging device 105 is performed by using various driving signals (a charge transfer pulse, a vertical driving pulse, a horizontal driving pulse, and a substrate voltage VSUB, etc.) output from the CCD driver 106. For instance, the CCD imaging device etc. with an interline vertical overflow drain (VOFD) structure are used as CCD the imaging device 105. The substrate voltage VSUB is a voltage of the substrate bias to determine the maximum charge accumulation level of each photoelectric conversion element PD (overflow level OFL). The charge of each PD is drained to the substrate by superimposing the pulse of a large value (VSUB pulse) on substrate voltage VSUB, and the photoelectric conversion element PD is reset.

The system controller 112 comprises an AE (automatic exposure) control part 112a, a reverse-incident light amount detection part 112b, and an eyepiece shutter control part 112c, as shown in the figure. The AE control part 112a controls the iris by the exposure control mechanism 103 and the exposure time of CCD imaging device 105 etc. according to the value of the light amount measurement. A reverse-incident light amount detection part 112b detects a reverse-incident light amount from the optical viewfinder by using the sensor 207. The eyepiece shutter control part 112c controls the open and close driving of the eyepiece shutter 205.

The close driving of the eyepiece shutter 205 by the eyepiece shutter control part 112c is performed according to whether a photographing environment that the reverse-incident light from the optical viewfinder becomes a problem or not. In the sixteenth embodiment, the photographing environment that the reverse-incident light becomes a problem is a photographing environment in which a ratio of the reverse-incident light amount to the light amount of the subject exceeds a predetermined value. The condition judgment is performed based on the exposure control condition when photographing, that is, the exposure amount determined with the aperture of the iris 103a and the mechanical shutter 104 (exposure time=shutter speed). In addition, the absolute amount of the reverse-incident light detected in the reverse-incident light amount detection part 112b is also considered. Even if there is the exposure control condition in which the ratio of the reverse-incident light amount to the light amount of the subject exceeds the predetermined value, when the absolute amount of the reverse-incident light detected by the reverse-incident light amount detection part 112b is negligible (that is, the absolute light amount is small, and level which seems to be almost the same level as the noise component of an S/N), it is judged that it is not a photographing environment that reverse-incidence light becomes a problem.

The operation at photographing in which the driving control of the eyepiece shutter 205 is a main operation will be explained.

Figure 31:
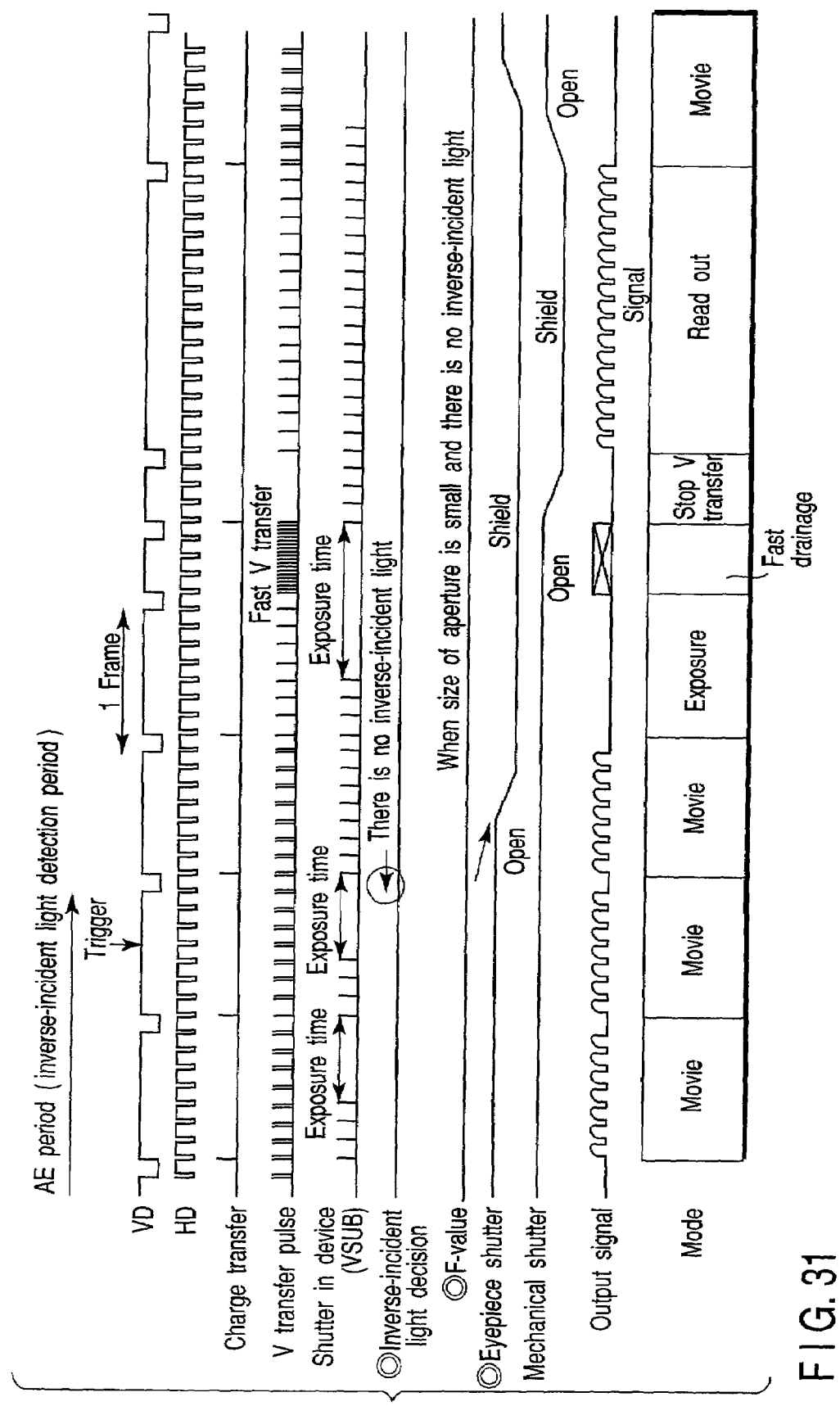
FIG. 31 is the first timing showing the control operation of the eyepiece shutter in an electronic camera according to the sixteenth embodiment.

FIG. 31 shows the imaging sequence corresponding to the case where the aperture of the iris 103a is small, and a reverse-incident light by a reverse-incident light amount detection part 112b are not judged. Here, a case to determine the exposure time by the device shutter control using the VSUB pulse and the charge transfer pulse is assumed.

In FIG. 31, a VD shows a vertical synchronous signal (since a reset is performed if necessary, it can be said the start reference signal of one frame operation in this sense) and an HD shows a horizontal synchronous signal.

In the photographing mode, the exposure and the read of the signal for EVF (electronic view viewfinder) display etc. are repeatedly executed in synchronous with a VD. In addition, by the semi-push of shutter button etc., the light amount measurement for automatic exposure control and the reverse-incident light judgment operation to detect the reverse-incident light amount is performed (AE period). The aperture of the iris and the shutter speed (=exposure time) are determined by the AE control part 112a based on the measurement value of the light amount. Of course, the exposure control may be performed by the manual operation.

The eyepiece shutter 205 is closed in synchronous with the release operation (shutter trigger), when the determined aperture of the iris (F-value) is smaller than that of the predetermined reference value, first. As a result, the eyepiece shutter 205 is moved and set at the shielding position where the light from the optical viewfinder is cut. Then, the exposure is started when the final VSUB pulse is output. When the exposure time determined by the AE or the manual operation elapses, the charge transfer pulse is output. As a result, the charges of all pixels are transferred to the vertical transfer path. Thereafter, the vertical transfer and the horizontal transfer to read the signal charges obtained by the exposure are performed (read mode). Here, to prevent a so-called vertical line noise mixed by the influence by smear etc., the mechanical shutter 104 is closed during the period of the read mode.

The influence of the reverse-incident light relatively becomes large when the aperture of the iris (F-value) is smaller than that of a predetermined reference value. Therefore, the reverse-incident light can be prevented from being influenced the photographing image by performing the exposure after the eyepiece shutter 205 is closed in synchronous with the release operation as the mentioned above. Moreover, the exposure time is controlled with the device shutter in the sixteenth embodiment. Therefore, the ratio of the light amount of the subject and the reverse-incident light amount is not changed by the exposure time. The ratio of the light amount of the subject and the reverse-incident light amount is basically determined only by the aperture of the iris (F-value). The high accurate eyepiece shutter control can be performed only by the control based on the aperture of the iris (F-value) without considering the exposure time.

Figure 32:
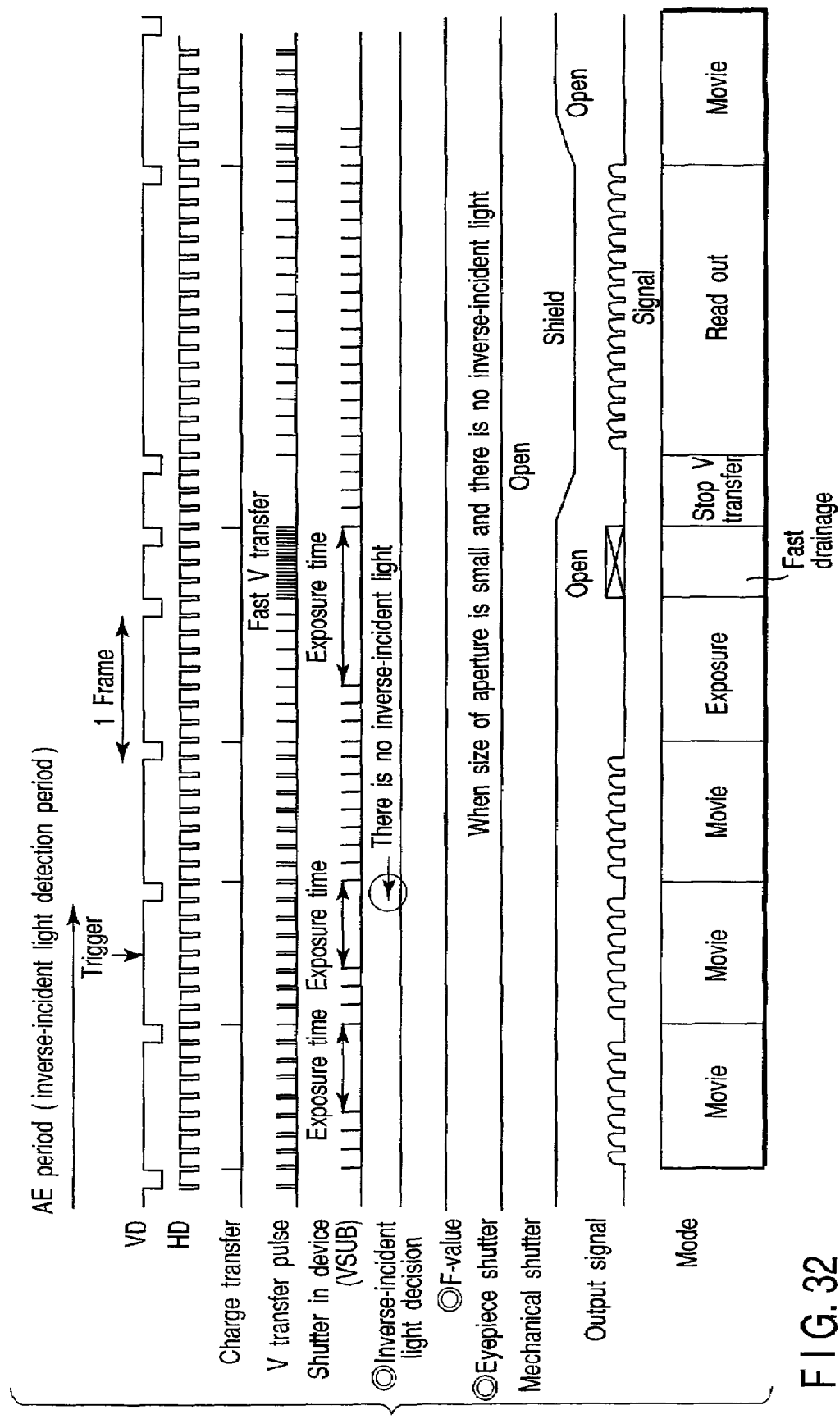
FIG. 32 is the second timing showing the control operation of the eyepiece shutter in an electronic camera according to the sixteenth embodiment.

FIG. 32 shows the imaging sequence corresponding to the case where the aperture of the iris 103a is large and the judge of the reverse-incident light by the reverse-incident light amount detection part 112b is not performed.

The control (shutter trigger) in which the eyepiece shutter 205 is closed is not performed in synchronize with the release operation as mentioned above, when the aperture of the iris determined by the AE or the manual operation (F-value) is larger than the above-mentioned reference value. That is, the eyepiece shutter 205 is kept being set at non-shielding position. And, the exposure is started when the final VSUB pulse is output. The charge transfer pulse is output when the exposure time determined by the AE or the manual operation elapses, and the charges of all pixels are transferred to the vertical transfer path. Thereafter, the vertical transfer and the horizontal transfer are performed to read the signal charges obtained by the exposure.

The influence of the reverse-incident light relatively becomes small when the aperture of the iris (F-value) is larger than a predetermined reference value. Therefore, even if the exposure is performed with the eyepiece shutter 205 opened as mentioned above, the influence of the reverse-incident light on the photographing image is not caused.

Figure 33:
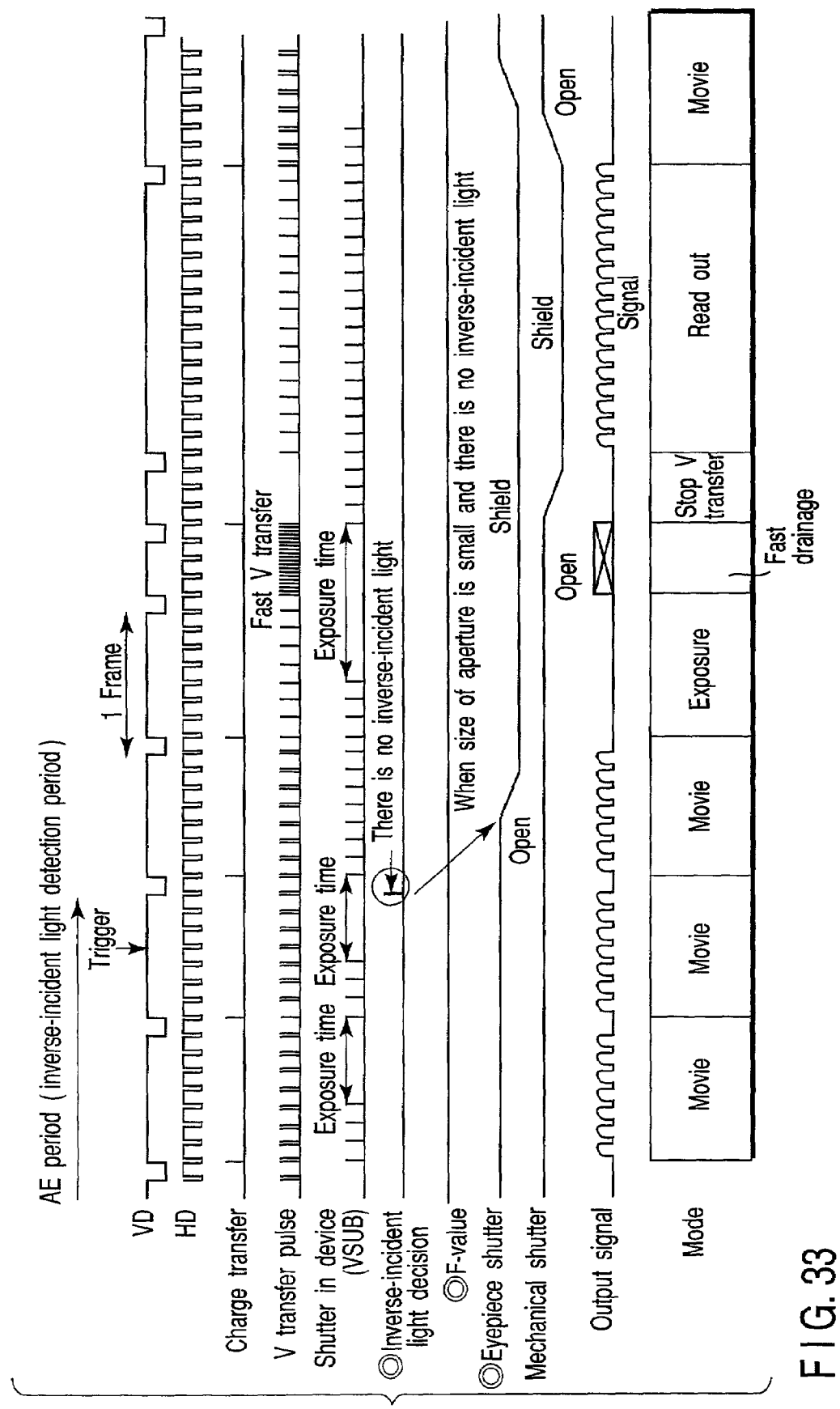
FIG. 33 is the third timing showing the control operation of the eyepiece shutter in an electronic camera according to the sixteenth embodiment.

FIG. 33 shows the case where the reverse-incident light amount more than a predetermined value is detected such that although the aperture of the iris (F-value) is larger than the predetermined reference value, the photographing operation is performed by looking at the EVF for instance. In this case, for instance, the above-mentioned reference value relating to the aperture of the iris (F-value) is changed and set at a higher value. As a result, even when the aperture of the iris is comparatively large, the close driving of the eyepiece shutter 205 is performed.

In a word, in synchronous with the release operation (shutter trigger), the eyepiece shutter 205 is driven to close. As a result, the eyepiece shutter 205 is moved and set at the shielding position where the light from the optical viewfinder is cut. And, the exposure is started when the final VSUB pulse is output. The charge transfer pulse is output when the exposure time determined by the AE or the manual operation elapses, and the charges of all pixels are transferred to the vertical transfer path. Thereafter, the vertical transfer and the horizontal transfer to read the signal charges obtained by the exposure are performed (read mode). When the reverse-incident light amount exceeds a certain constant value, the control of closing the eyepiece shutter 205 regardless of the aperture of the iris (even for the value of open F-value).

Next, the control of the eyepiece shutter 205 when the exposure is controlled by using the mechanical shutter 104 in place of the device shutter will be explained.

Figure 34:
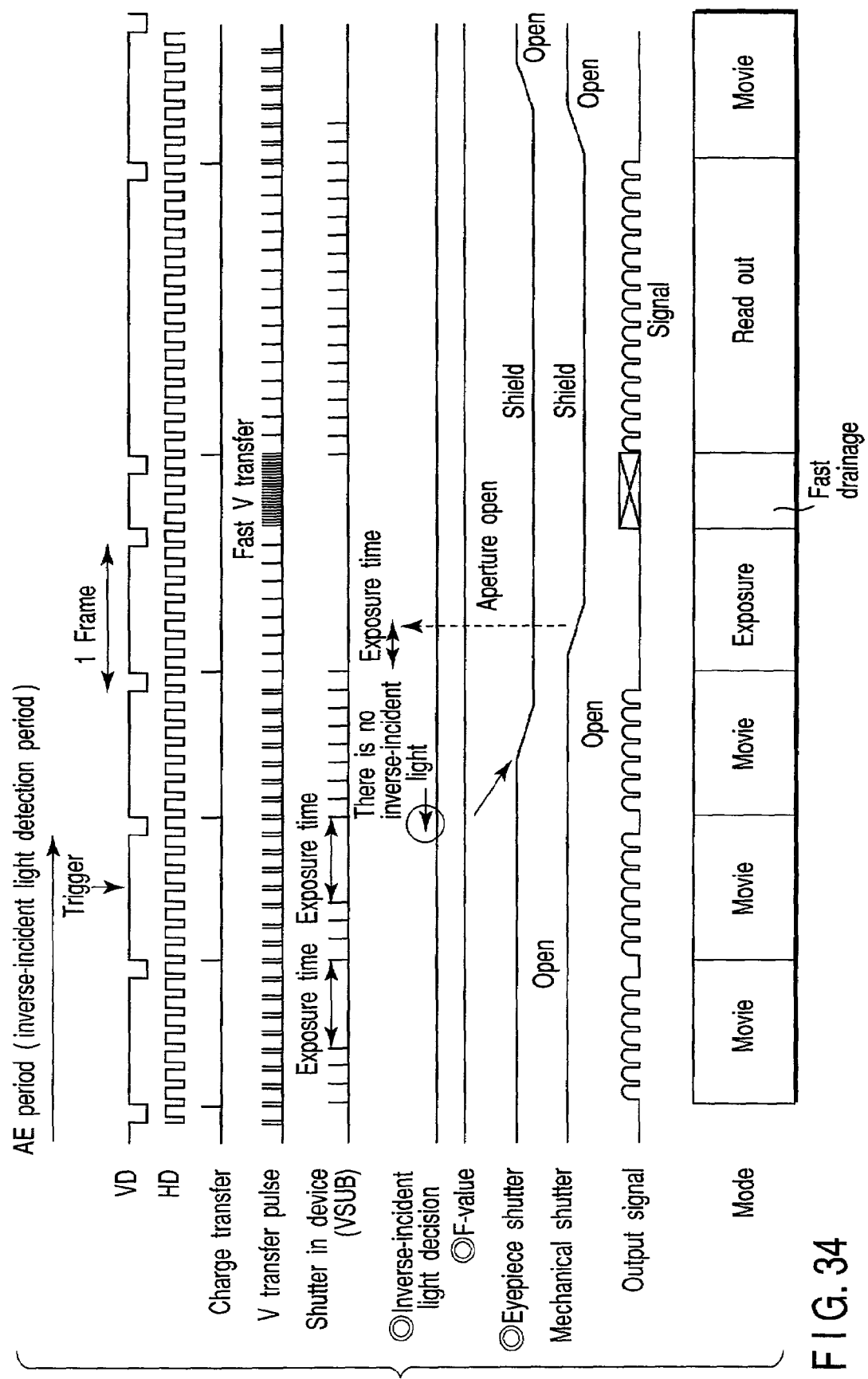
FIG. 34 is the fourth timing showing the control operation of the eyepiece shutter in an electronic camera according to the sixteenth embodiment.

FIG. 34 shows the imaging sequence corresponding to the case where the exposure (exposure time) determined with the mechanical shutter 104 is smaller than that of a predetermined reference value and a reverse-incident light by the reverse-incident light amount detection part 112b are not judged.

When the mechanical shutter 104 is closed, the light from the subject is cut. However, the reverse-incident light from the optical viewfinder is not cut by the mechanical shutter 104. Therefore, when the exposure time with the mechanical shutter 104 determined by the AE or the manual operation is smaller than the predetermined reference value, the influence of the reverse-incident light relatively becomes large. Therefore, in synchronous with the release operation (shutter trigger), in this case, first, the eyepiece shutter 205 is driven to close. As a result, the eyepiece shutter 205 is moved and set at the position where the light from the optical viewfinder is cut. And, the exposure is started when the final VSUB pulse is output. When the exposure time determined by the AE or the manual operation elapses, the mechanical shutter 104 is closed. Thereafter, the charge transfer pulse is output, and the charges of all pixels are transferred to the vertical transfer path. And, thereafter, the charge transfer pulse is output, and the charges of all pixels are transferred to the vertical transfer path.

Figure 35:
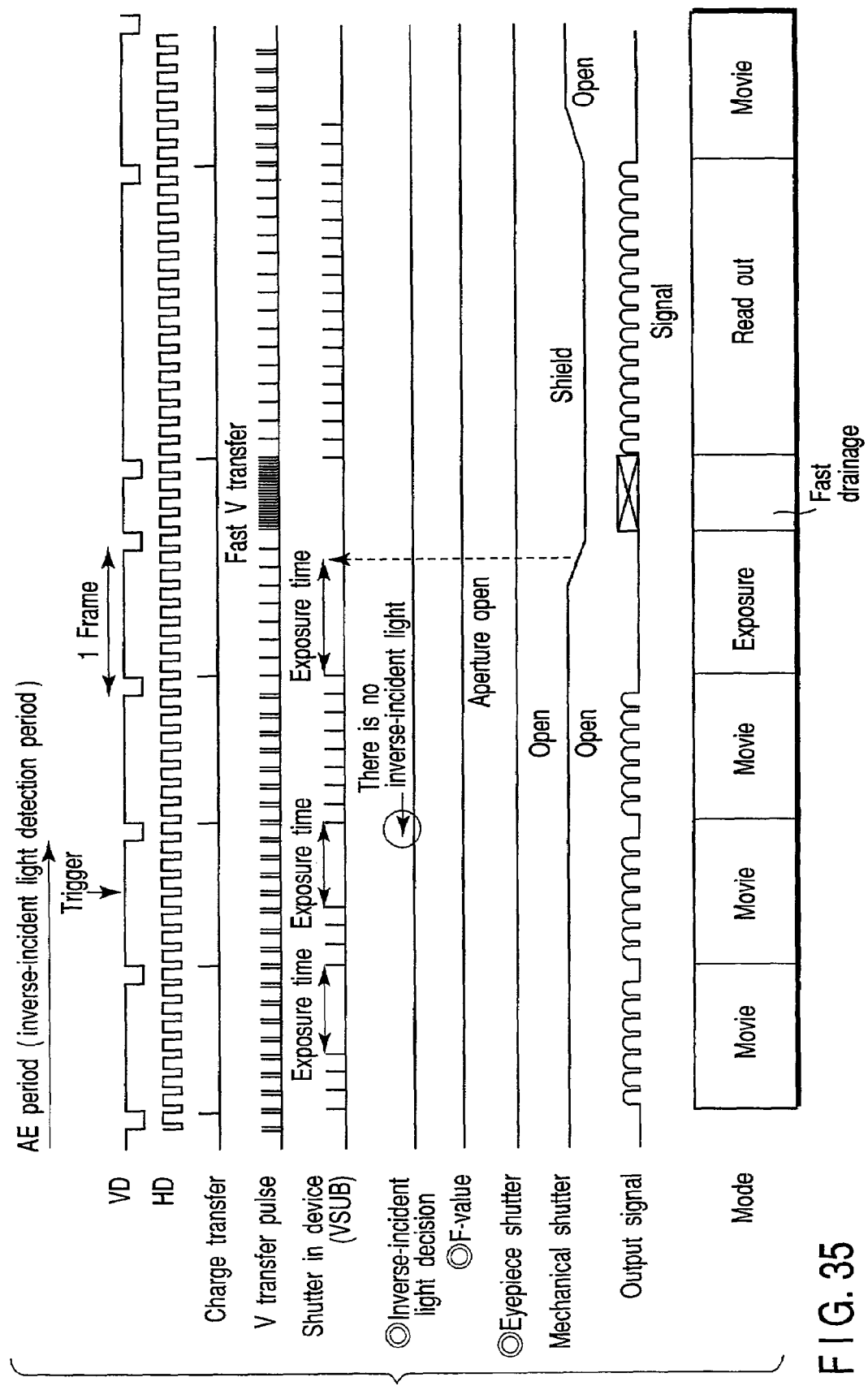
FIG. 35 is the fifth timing showing the control operation of the eyepiece shutter in an electronic camera according to the sixteenth embodiment.

FIG. 35 shows the imaging sequence corresponding to the case where the exposure (exposure time) determined with the mechanical shutter 104 is larger than the predetermined reference value and the reverse-incident light by the reverse-incident light amount detection part 112b is not judged.

The control of driving the eyepiece shutter 205 to close in synchronous with the release operation (shutter trigger) as mentioned above is not performed, when the exposure time with the mechanical shutter 104 determined by the AE or the manual operation is larger than a reference value and the eyepiece shutter 205 is kept to be set at non-shielding position as it is. And, the exposure is started when the final VSUB pulse is output. When the exposure time determined by the AE or the manual operation elapses, the mechanical shutter 104 is closed. The charge transfer pulse is output thereafter, and the charges of all pixels are transferred to the vertical transfer path. And, thereafter, the charge transfer pulse is output, and the charges of all pixels are transferred to the vertical transfer path.

The influence of the reverse-incident light relatively becomes small when the exposure time with the mechanical shutter 104 is larger than the above-mentioned reference value. Therefore, even if the exposure is performed with the eyepiece shutter 205 opened as the above-mentioned, the influence of the reverse-incident light on the photographing image is not caused.

Figure 36:
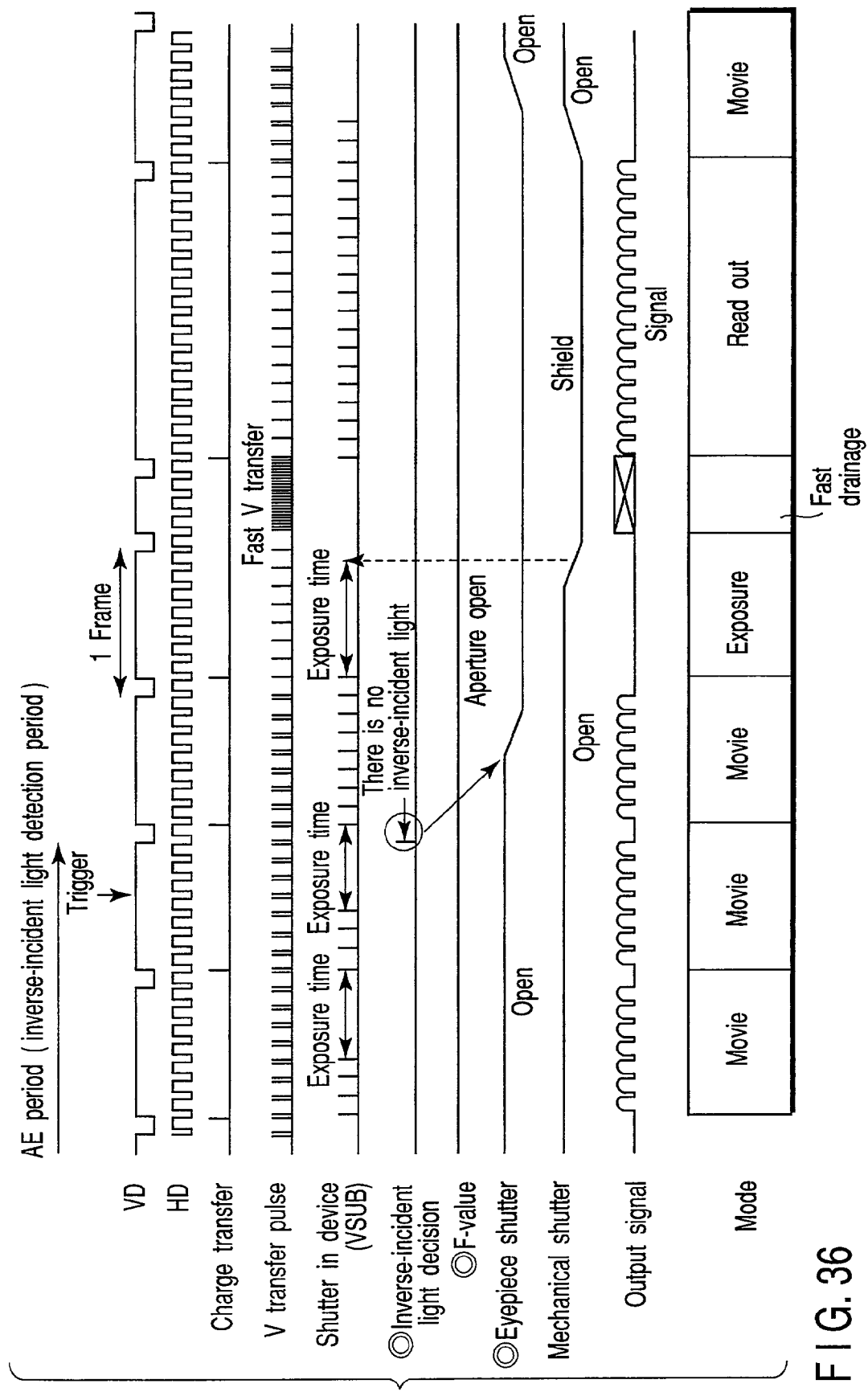
FIG. 36 is the sixth timing showing the control operation of the eyepiece shutter in an electronic camera according to the sixteenth embodiment.

FIG. 36 shows the case where the exposure time with the mechanical shutter 104 is larger than the predetermined reference value, and the reverse-incident light amount larger than a predetermined value is detected to perform the photographing operation while looking at the EVF for instance. In this case, the above-mentioned reference value relating to the exposure time with the mechanical shutter 104 is changed and set at high, for instance. As a result, even when it is comparatively long the exposure time with the mechanical shutter 104, the close driving of the eyepiece shutter 205 is performed.

In a word, in synchronous with the release operation (shutter trigger), first, the eyepiece shutter 205 is driven to close. As a result, the eyepiece shutter 205 is moved and set at the position where the light from the optical viewfinder is cut. When the exposure time determined by the AE or the manual operation elapses, the mechanical shutter 104 is closed. The charge transfer pulse is output thereafter, and the charges of all pixels are transferred to the vertical transfer path. And, thereafter, the charge transfer pulse is output, and the charges of all pixels are transferred to the vertical transfer path. (read mode). When the reverse-incident light amount exceeds a certain constant value, the control of closing the eyepiece shutter 205 regardless of the exposure time with the mechanical shutter 104.

In the sixteenth embodiment, the electronic camera, which performs imaging by using the solid state imaging device such as CCD, is exemplified. In the same way, the control of above-mentioned the eyepiece shutter in the sixteenth embodiment can be applied to the silver halide camera.

According to the sixteenth embodiment, only when it is necessary according to whether it is a photographing environment that the reverse-incident light from the viewfinder becomes a problem or not, the eyepiece shutter is closed. As a result, it become possible to reduce the open and close of the eyepiece shutter as much as possible, and prevent the picture quality degradation by the reverse-incident light from the viewfinder efficiently.

Seventeenth Embodiment

The seventeenth embodiment will be explained referring to FIG. 37. FIG. 37 is a function block of the electronic camera according to the seventeenth embodiment of the present invention. In FIG. 37, the same reference numeral is fixed to the same part as FIG. 28, and a detailed explanation will be omitted.

In FIG. 37, the filter system 104' comprises the low-pass filter and the filter for cutting the infrared ray. The ray which passes the exposure control mechanism 103 is led to the imaging device 105 through the filter 104'. Therefore, the image corresponding to the subject is formed on the imaging device 105.

The detection switch 119 detects a setting condition of the reverse-incident light shielding means described later.

The system controller 112 performs all the controls integrally, in the electronic camera according to the seventeenth embodiment as well as the sixteenth embodiment.

FIG. 38 is a figure showing the configuration of the imaging part in the camera and the configuration of the viewfinder according to the seventeenth embodiment.

The incident light is led to the CCD imaging device 105 by the imaging lens system 101 provided in camera case 200. And, the subject image is formed on a receiving optical side of the imaging device 105. The half mirror 201 with the prism type is arranged between the lens system 101 and the imaging device 105. A part of the incident light from the lens system 101 can be reflected with the half mirror 201. The light reflected with the half mirror 201 is reflected with the mirror 203. And, the light reflected with the half mirror 201 is led to the viewfinder aperture through the lenses 204 and 206.

In the seventeenth embodiment, the reverse-incident light shielding means to cut the incident light from the viewfinder aperture is provided as well as the above-mentioned each embodiment. The reverse-incidence optical means is configured of a light-shielding board 211, an axis body 212, and a lever 213 as shown in FIG. 39A and FIG. 39B. The axis body 212 is rotably provided in penetration through the camera case 200. The light-shielding board 211 is provided inside edge of the camera of the axis body 212. The light-shielding board 211 cuts the light from the viewfinder aperture by a rotation of the axis body 212. That is, the light-shielding board 211 (the eyepiece shutter) consisting of the resin board with matte black paint in the aperture outermost lens 206 of the optical viewfinder is arranged insertably. The lever 213 is formed on a camera outside edge of the axis body 212 integrally, and the axis body 212 rotates by operating the lever 213.

The cut 215 is fixed to the inside edge of the camera of the axis body 212, and the electric contact (mechanical switch) 230 (119 of FIG. 37) is provided at a position adjacent to the cut 215. In the state that the lever 213 is set vertically, the light-shielding board 211 does not shield an optical path as shown in FIG. 39A. At this time, the cut 215 does not contact with the switch 230, and the switch 230 is in an off state. When the lever 213 is moved in the inclined state, the light-shielding board 211 cuts the optical path as shown in FIG. 39B. The cut 215 pushes the switch 230, and at this time the switch 230 becomes in the on state.

In a word, a viewfinder aperture can be opened and closed by rotating the lever 213, and open and close can be detected with the switch 230.

FIG. 40 is a block functionally showing the defect detection and the configuration relating to the defect compensation according to the seventeenth embodiment. In FIG. 17, an EEPROM 401 which stores the defect data, pixel defect compensation means 402, defect data detection means 403, and defect data management means 404 are shown. The configuration relating to the defect detection and the defect compensation is achieved under the control of the system controller 112 by controlling the digital process circuit 108 and the EEPROM 118.

The EEPROM 401 is a part of the above-mentioned EEPROM 118. The address data relating to defect data (hereinafter, it is called as a "registered defect data") existing (latest data at this time) is stored in the EEPROM 401. In the first stage (at the shipping of the camera from the factory), the defect data acquired in the manufacturing adjustment process is registered as the registered defect data.

The defect compensation means 402 performs the supplemental processing by neighboring pixels to the defect pixel. The defect compensation means 402 reads the registered defect data stored in the EEPROM 401 to the input image data, and performs the pixel defect compensation processing of the adjacent supplementation etc. based on the defect data. The defect data detection means 403 analyzes the output of the imaging device obtained in a state that the incident light to the imaging device is cut. As a result, the pixel defect address is newly detected. The defect data management means 404 updates the defect data registered in the EEPROM 401 based on the defect data newly detected.

The processing of the imaging operation, especially the processing of the detection of the pixel defect and compensation of the pixel defect and the processing of prevention of malfunction caused by the reverse-incident light from a viewfinder aperture according to the seventeenth embodiment will be explained. Here, it is assumed that the digital processing of the signal level is performed by eight bits (0–255) in the camera. Moreover, an explain will be performed by assuming the normal temperature except for a part specially described later.

First, the processing relating to the detection and the compensation of the pixel defect will be explained.

The exposure time necessary for photographing is set based on the manual setting or the light amount measurement result before photographing. Next, the photographing trigger instruction of this photographing is waited and if the instruction is received, the exposure based on an exposure control value is performed. Then, after reading the photographing signal and performing the predetermined signal processing, the signal is recorded on the memory card 110. In this case, the pixel defect compensation is performed for the above-mentioned registered defect pixel. The image signal processing until recording after compensation of the defect is a well-known processing properly used if necessary, for instance, a color balance processing, a conversion or inversion processing to a brightness-color difference signal by a matrix operation, a false color removal or decrease processing by band-limit etc., a various, non-linear processing, for example, γ-conversion, and a various information compression.

In the camera according to the seventeenth embodiment, as the defect compensation, well-known "Supplementation by neighboring pixels relating to the pixel to which the defect address is registered" is adopted.

The following supplementation method is adopted as a concrete supplementation method.

The average value of four pixels information among the closest adjacent pixels with the same color "four pixels being the nearest corresponding defect pixels among the same color pixels: four G pixels adjacent to four diagonal direction for G, and each of four pixels R (or, B) which is arranged to place one G there among not directly adjacent to R (or, B) at four directions of upper and lower, right and left directions for R (or, B), when a case of RGB bayer array is exemplified" is substitutedly applied.

Figure 41:
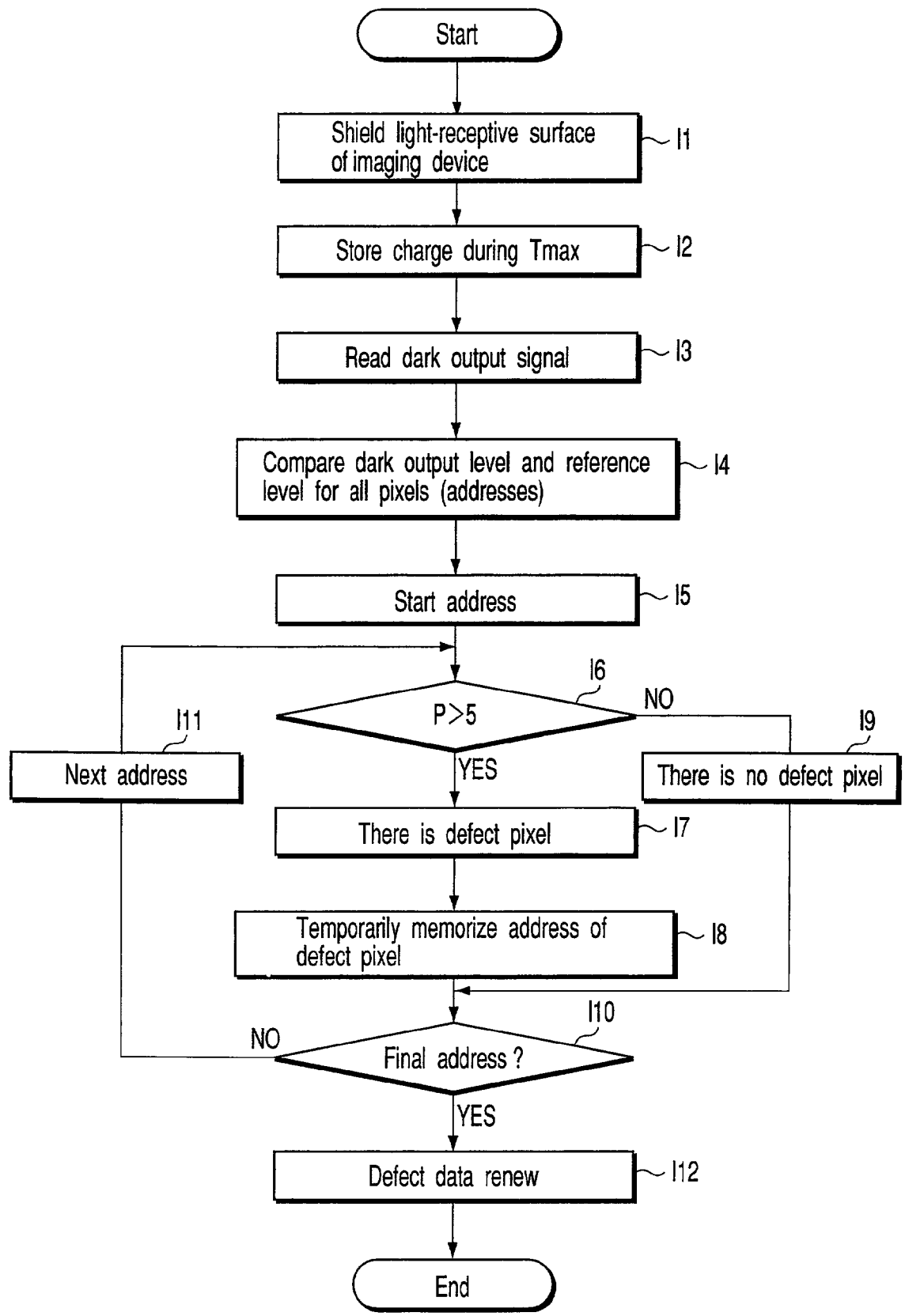
FIG. 41 is a flowchart to explain the pixel defect detection and the update of the defect address.

The camera according to the seventeenth embodiment detects the defect when it is necessary and additionally updates the above-mentioned registered defect based on the result. The defect detection is performed as follows. FIG. 41 is a flowchart according to the defect detection.

The light-receiving surface of the imaging device is shielded with the shutter device included in the exposure control mechanism 103. And, the test imaging is performed while light-shielded (step I2). That is, the charge accumulation operation with the longest exposure time Tmax of the camera (setting is arbitrary: exemplified value 5s, here) is performed by the CCD driver 106 in the dark state. The test imaging signal (dark output signal) is read, and is stored in digital process 108 (step I3). It is judged whether it is a defect or not by checking each output level of all data of the stored effective output pixel and digitally comparing it with the reference level (step I4).

For instance, the judgment reference is as follows. When the output level of the target pixel is P, it is judged that the defect in the case of P>5 and non-defect in other cases (P≦5). This means that the dark output level at photographing is allowed by about 2% of maximum full range of 255.

The judgment reference level of the output level about 2% is merely one example, and at designing, it is possible to set it arbitrarily according to circumstances. The possibility of appearance of the influence of the dark output superimposed on the image becomes lower enough if a preferable value of about 2% (besides, for instance, about 5% and about 1%, etc. are also effective) is chosen. Moreover, if the judgment reference level is chosen to be 0%, the pixel on which the dark output is superimposed can be completely excluded. On contrast, this means that the pixel information is completely abandoned for superimposition of a little dark signal. Therefore, if the judgment reference level is set to 0%, it may be a case of degrading the total picture quality. Actually, the reference level is set considering these trade-off elements.

A concrete step since step I4 is as follows. After the first address is specified (step I5), it is judged to this address whether P>5 or not (step I6). It is considered there is pixel defect (step I7), and the address of the detection pixel defect is memorized temporarily (step I8), when it is judged as P>5 in step I6. It is considered that it is not defective (step I9), when it is judged as P≦5 by step I6. And, the final address is judged in step I10 (step I10). In step I10, the following address is specified (step I11) and the procedure returns to step I6 when is not the final address. The address of the pixel defect by which the above-mentioned is temporarily memorized is registered in the EEPROM 201, if it is judged as the final address in step I10 (step I12).

When the defect data is updated to the EEPROM 401, the defect data, which removes the address overlapping with the registered defect of the addresses of the detected defect pixel, is additionally registered. At this time, the data of the detected defect may be replaced with merely existing registered data. However, in this case, when the detection mistake caused by some causes such as the noise etc. is occurred, for instance, if the defect is newly detected, there is a fear that the defect is appeared because the defect pixel is treated as the non-defect pixel at the factory shipment or deteriorating with the passage of time till then. On the other hand, the pixel overlapping with the existing registered defect is removed from the detected defect and the remainder defect is added to the existing data in the seventeenth embodiment. Therefore, the advantage which the defect registered once can be prevented from being appeared again is obtained.

The update of data (above-mentioned defect detection and additional update of the registered defect) is performed based on the clock function installed to the camera. For instance, a case where the update time is set once a day at two o'clock of midnight is considered. When the update time comes, the update of data is executed, when the power supply is turned on for the first time and the finder aperture is closed, after that. In that case, it is preferable to display the display such as "The camera is being set up" in the electronic viewfinder by the appropriate place, for instance, by the LCD 111 for instance since the user is not perplexed. Thereafter, the time lag is not caused on the first in the day since data is not updated until the next update time comes. Moreover, since data is not updated as long as the power supply is not turned on, a useless electric power is not consumed.

Next, the malfunction prevention processing by the reverse-incident light from the viewfinder aperture will be explained.

The viewfinder aperture is detected whether being shut with light-shielding board 211 when the defect pixel is detected. If the viewfinder aperture is closed, the detection of the defect pixel and the defect pixel data are updated as explained previously. If the viewfinder aperture is not closed, neither the detection of the defect pixel nor the update of data are performed. At this time "Please shut the eyepieceshutter" etc. are displayed on the LCD 111, and it is urged to close the optical viewfinder to the user. After confirming that the optical viewfinder is closed, the detection of the pixel defect may be performed.

The open or close state of the viewfinder aperture with the light-shielding board 211 is detected as mentioned above according to the seventeenth embodiment. If the viewfinder aperture is closed, the detection of the defect pixel and the defect pixel data are updated. When the viewfinder aperture is not closed, the detection of the defect pixel is prohibited. Therefore, the mis-detection can be prevented from being caused by the reverse-incident light from the viewfinder aperture when the pixel defect is detected.

In the seventeenth embodiment, the defect data registered in the EEPROM 401 is updated based on the defect data newly detected. As a result, the defect data registered in the EEPROM 401 becomes the data to have the pixel defect with variation with time in addition to the initial pixel defect at the time of the shipping from the factory. Therefore, the picture quality degradation because of a pixel defect increase with variation with time can be prevented by performing the compensation processing by the vicinity pixel data based on the defect data registered in the EEPROM 401.

Eighteenth Embodiment

Figure 42:
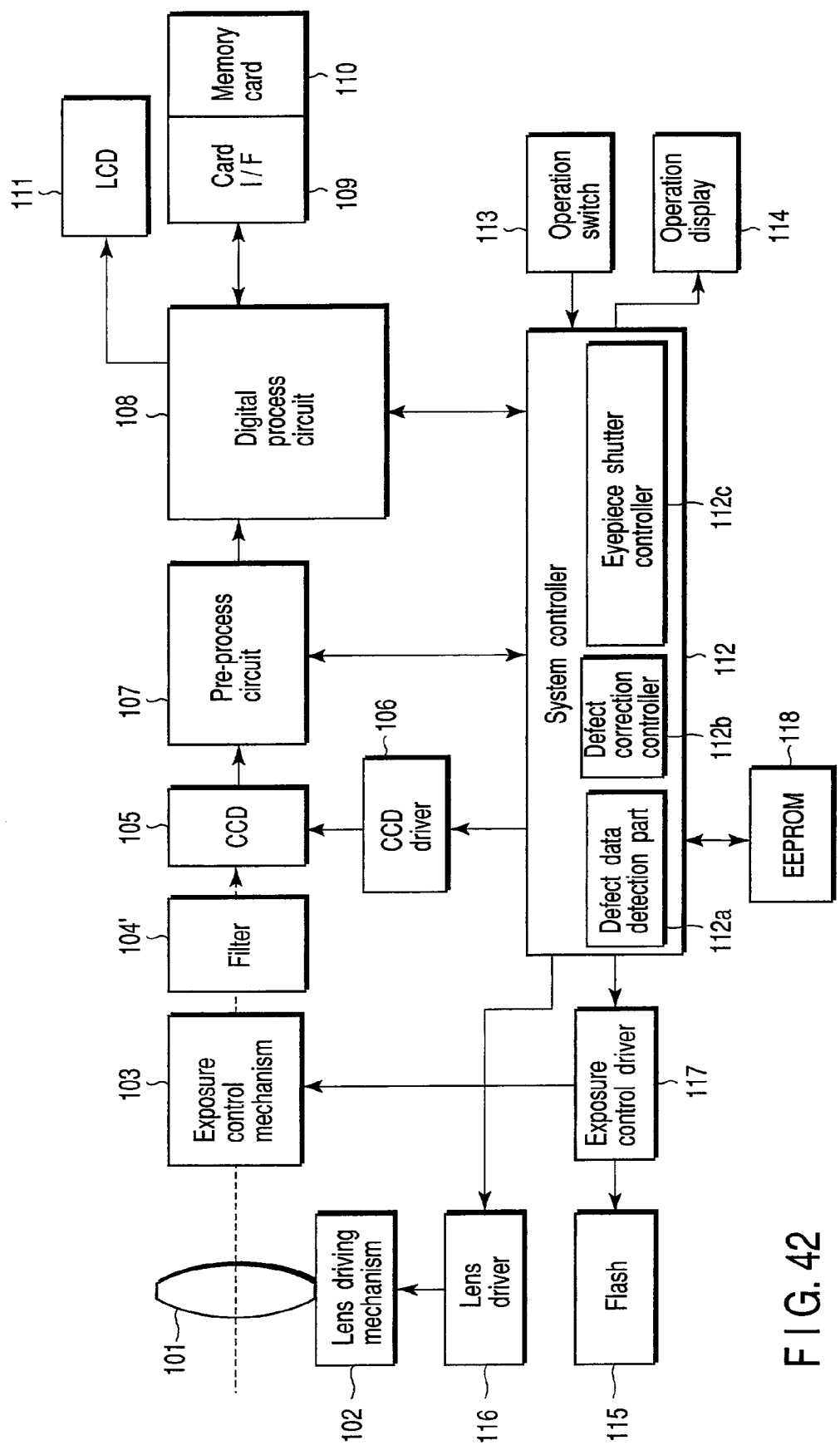
FIG. 42 is a function block of an electronic camera according to the eighteenth embodiment of the present invention.

The eighteenth embodiment of the present invention will be explained referring to FIG. 42. FIG. 42 is a block showing the configuration of the electronic camera according to the eighteenth embodiment of the present invention. In FIG. 42, the same reference numeral is fixed to the same part as FIG. 28, and a detailed explanation is omitted.

In the camera according to the eighteenth embodiment, the system controller 112 comprises an eyepiece shutter control part 112c, a defect data detection part 112d, and a defect compensation control part 112e. The eyepiece shutter 205 is driven when the eyepiece shutter 205 is open at the detection of the pixel defect data and the eyepiece shutter control part 112c is set at the close position. The defect data detection part 112d detects the pixel defect data by analyzing the signal from the CCD 105 obtained in the shielded state with digital process circuit 108. The defect compensation control part 112e performs the pixel defect compensation processing to the signal obtained from the CCD 105 at photographing.

The pixel defect compensation processing is executed in digital process circuit 108 according to the instruction from the defect compensation control part 112e based on the address data of the defect pixel relating to the defect (Hereinafter, it is called as a "registered defect") existing (latest data at this time) stored in the EEPROM 118. In the initial state (at the shipping of the camera from the factory), the defect data acquired in the manufacturing adjustment process is registered as the registered defect.

The camera control by the system controller 112 will be explained around the processing relating to compensation directly with the detection of the pixel defect in the eighteenth embodiment. However, a detailed explanation will be omitted since the detection condition of the defect pixel etc. is similar to the seventeenth embodiment.

Figure 43:
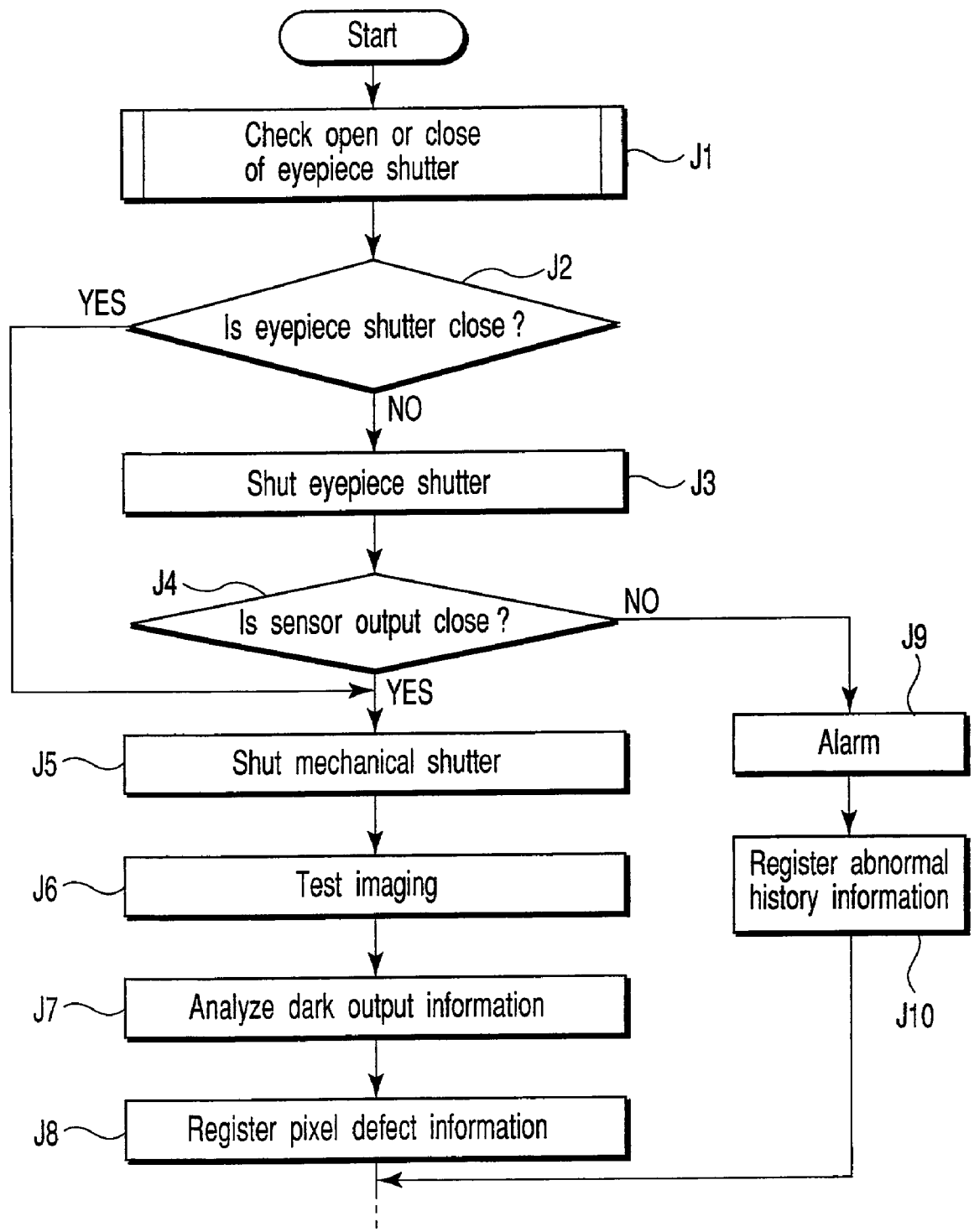
FIG. 43 is a flowchart to explain the defect detection operation in an electronic camera according to the eighteenth embodiment.

The camera detects the defect if necessary, and additionally updates the registered defect based on the result. Hereinafter, the defect detection operation will be explained referring to the flowchart of FIG. 43.

The system controller 112 confirms the open and close state of the eyepiece shutter 205 before the defect detection (step J1). And, it is judged whether the eyepiece shutter 205 is closed (step J2). In step J2, it is most preferable to confirm open and close state by using the detection signal from the above-mentioned sensor 207, but it may be judged only with an internal flag.

In step J2, when the eyepiece shutter 205 is in the close state, the defect detection processing of step J5 or later is performed. In step J2, when the eyepiece shutter 205 is in the open state, the system controller 112 drives the motor 205c and closes the eyepiece shutter 205 (step J3). And, it is judged whether the detection signal from the sensor 207 shows the close position (step J4). In step J4, when the detection signal from the sensor 207 does not show the close position, that is, when the close is not confirmed even though the close driving of eyepiece shutter 205 is executed (NO in step J4), there is a possibility that the eyepiece shutter 205 is in the open state due to the abnormality of the driving system. Since the fear of the mis-detection is large if the defect is detected in such a state, it is extremely preferable to configure so as not to execute (prohibit) the detection of the defect (and the update of the defect address data of the EEPROM 118 according to this) in this case. In addition, in this case, the user is warned according to the message display and the buzzer sound, etc. by which the occurrence of abnormality is shown and the attention rousing is performed (step J9). At the same time, it is preferable to record the state of abnormal occurrence in the EEPROM 118 and to make can refer the repair service (step J10).

The defect detection is performed as follows.

The system controller 112 further light-shields the light-receiving surface of the imaging device by the shutter device 104 included in the exposure control mechanism 103 in the state of closing the eyepiece shutter 205. And, the test photographing is performed with the light-shielded state (step J6). That is, the charge accumulation operation of maximum exposure time Tmax of the camera (Setting is arbitrary: exemplified value is 5 s, here) is performed by the CCD driver 106 under darkness. Next, the test imaging signal (dark output signal) is read, and is stored in the digital process 108. And, the dark output signal is analyzed in the digital process 108, each output level is checked relating to all data of the effective output pixel, and is compared digitally with the reference level. As a result, it is judged whether it is a defect (step J7).

Since the judgment reference is similar to the seventeenth embodiment, the description will be omitted. The update timing of data is similar to the seventeenth embodiment.

The defect that the defect overlapping with the registered defect which has already been registered in the EEPROM 118 was removed among the addresses of the requested detection defect pixels as mentioned above is additionally registered to the EEPROM 118 (step J8). At this time, it may be configured to replace the data of the detected defect with merely existing registered data as described in the seventeenth embodiment. In the eighteenth embodiment, since the defect overlapping with an existing registered defect and the remainder thereof are removed from the detected defect is added to the existing data as well as the seventeenth embodiment, the advantage in which the defect registered once can be prevented from being appeared again is obtained.

Modification of the Seventeenth Embodiment and the Eighteenth Embodiment

When the mechanical switch turns on instead of "power supply turning on" as the modification of the seventeenth embodiment and the eighteenth embodiment (that is, when the eyepiece shutter changes into the light-shielded state), the data may be updated.

As another modification, when the update time comes in the state that the power supply is not turned on, the data may be updated. For instance, an internal power supply of the camera is voluntarily turned on when the update time comes, once for three days at two o'clock of midnight, ON of a mechanical switch is confirmed, and the update of data is executed. In this case, the update will be executed at little frequency at a time zone with low possibility that the camera is generally used. Therefore, the possibility to influence the user is extremely low, and the user can use it without time-lag in almost any case. If the update operation is discontinued at once in this case, there is a manual instruction of the power supply turning on during the data update execution, and a usual photographing function is made to give priority, it is also possible to remove the time-lag completely.

Moreover, if the user can arbitrarily change the setting of the update time, the degree of freedom increases and it is more preferable. In addition, the update time is not made at a constant cycle but an irregular random numbers interval of time may be set. It is not a time management with the clock, but the update time may be set by counter information, for instance, once every the photographing number of sheets. However, since the change with time of the pixel defect is a probabilistic phenomenon, the management by the counter information is usually more desirable than the regular time control.

The quantization level of the A/D converter used in the embodiment the seventeenth embodiment and 18 is supplemented. Actually, even in the existence of the error characteristic included in the A/D converter hardware or no-existence thereof, quantized error becomes relatively 100% fundamentally, in the vicinity of the minimum quantization level. Considering this, the A/D converter used for actually quantization concerning the seventeenth embodiment, it is preferable that it is more than the number of the quantized bits (it is eight bits in the seventeenth embodiment) of the image processing system, and for instance, about 10 bits or 12 bits (it is more acceptable than it). As a result, when each above-mentioned arithmetic expression is operated, the influence of the error can be decreased enough.

It become possible to achieve a high-efficient electronic camera in which the mis-detection by the reverse-incident light from the viewfinder can be prevented and the picture quality degradation because of a pixel defect increase with time is not caused according to the seventeenth embodiment and the eighteenth embodiment.

The defect detection in the seventeenth embodiment and the eighteenth embodiment targets only a so-called white defect. For instance, when white light on the imaging surface is input by some methods and a black defect is detected, the influence of the reverse-incident light from the viewfinder might become a problem according to the light input method. The present invention is quite similarly preferable for this case.

The defect detection and the correction in the seventeenth embodiment and the eighteenth embodiment are supplementations (data substitution application) by the address registration and vicinity pixel information performed based on this. It is not limited to this, it may be applied to an arithmetic pixel defect correction (analog defect detection and data correction), in which, for instance, the level of the dark output is acquired in the shielded state and the dark output is subtracted from the image signal at photographing. It is apparent that it is also similar to remove the influence of the reverse-incident light.

In the same way, it is possible to apply to the digital movie though digital still camera is exemplified, and explained in the seventeenth embodiment and the eighteenth embodiment.

Nineteenth Embodiment

The nineteenth embodiment will be explained referring to FIG. 44 to FIG. 47. In the nineteenth embodiment, since the function block is basically the same as FIG. 14, showing and the detailed explanation will be omitted. Moreover, the detailed description thereof will be omitted about the detection of the pixel defect about the detection method described in the seventeenth embodiment and the eighteenth embodiment.

The operation of the pixel defect check with the electronic camera according to the nineteenth embodiment will be explained.

Figure 44:
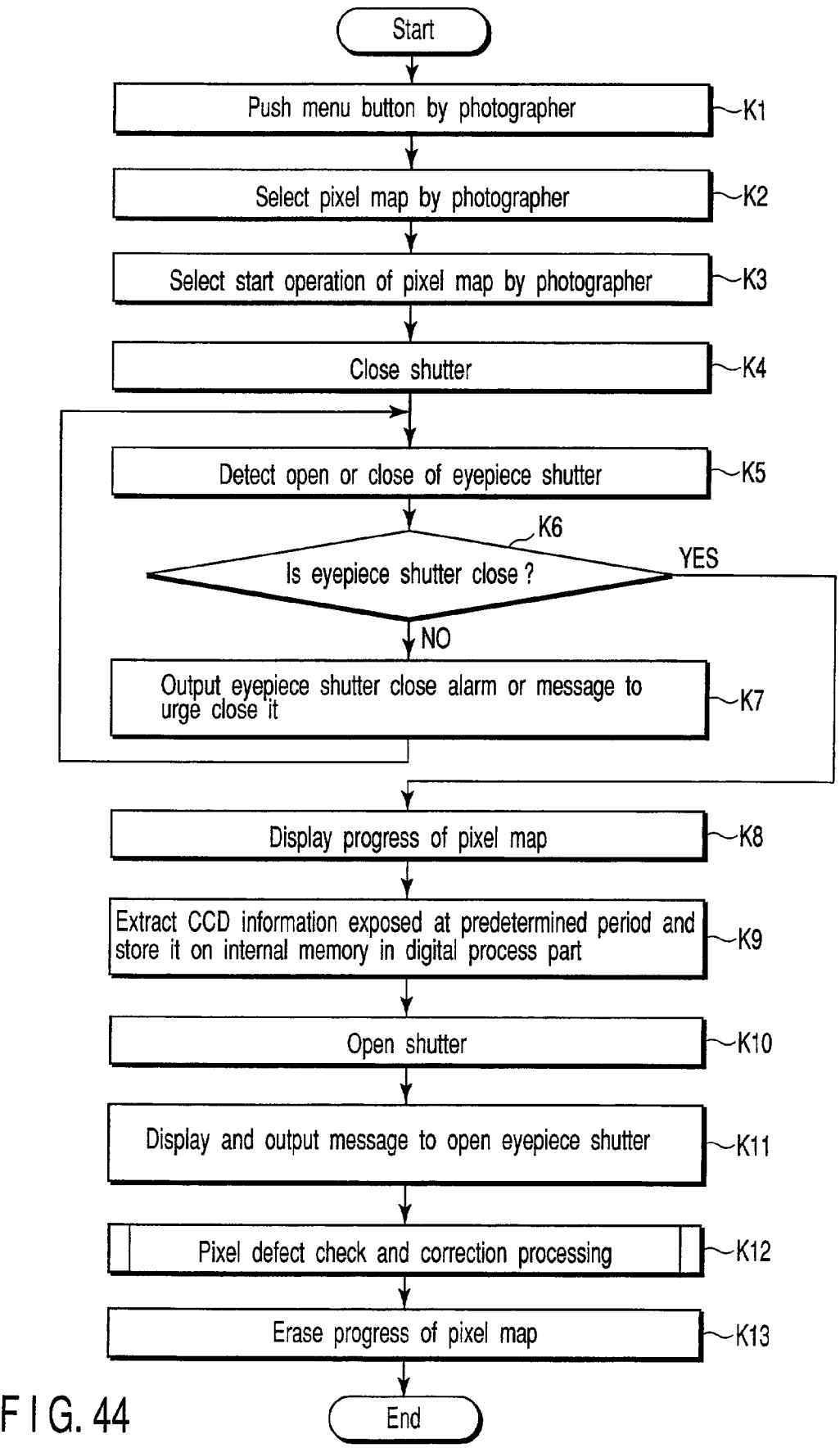
FIG. 44 is a flowchart showing the procedure of the outline of the pixel defect check operation in an electronic camera according to the nineteenth embodiment.

FIG. 44 is a flowchart showing the procedure of the outline of the pixel defect check operation according to the nineteenth embodiment of the present invention.

Figure 45:
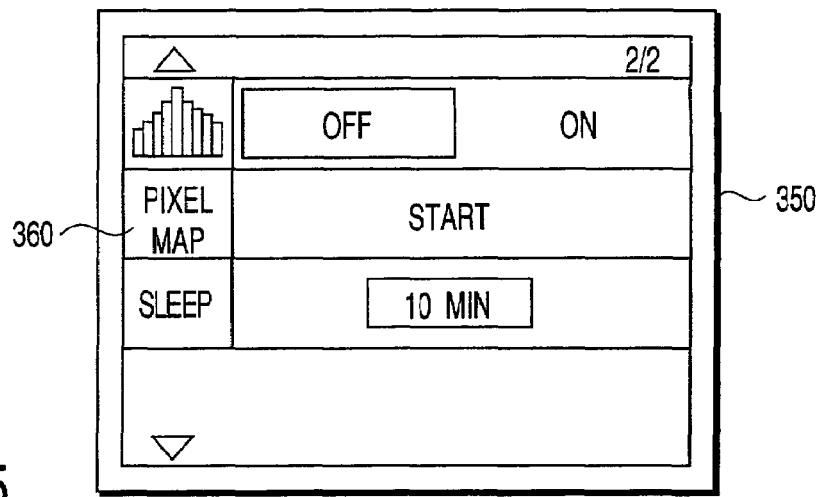
FIG. 45 is a figure showing the configuration of the menu screen.

When the check of the pixel defect starts, the menu button 8 is pushed (step K1). The menu screen 350 shown in FIG. 45 is displayed on the image information display part 4 (the LCD) of the camera main body 1. In the following explanations, the pixel defect check operation is called a pixel mapping or a pixel map.

Figure 46:
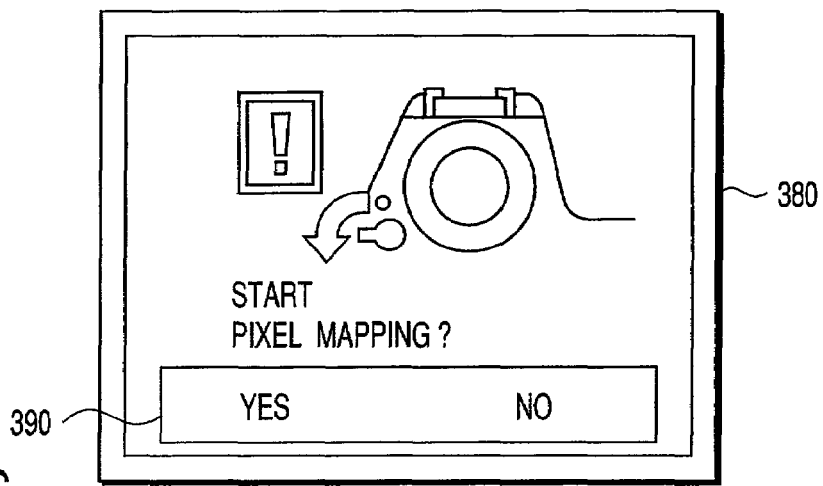
FIG. 46 is a figure showing the configuration of the start screen.

The pixel map column 360 to select the start of the pixel defect check is provided on the menu screen 350. When the photographer operates the cross button 9, "START" of the pixel map column 360 is selected, and the OK button 10 is pushed. The pixel map is selected from among the menu (step K2), and the start screen 380 shown in FIG. 46 is displayed.

On the start screen 380, when the photographer operates the cross button 9, "YES" of the start selection column 390 is selected, and the OK button 10 is pushed, the defect check operation is started (step K3).

First of all, the shutter driving part 22 is controlled and the shutter 12 becomes to the close state by the system controller 100 (step K4).

Subsequently, the open and close of the eyepiece shutter 17 is checked (step K5). The alarm of which the shutter is not in the close state or the message which urges to close the eyepiece shutter 17 to the photographer to the image information display part 4, when the eyepiece shutter 17 is not in the close state (step K7).

When the photographer operates the eyepiece shutter lever 26 according to this warning, the signal is input to the system controller 100 through the switch 21. As a result, the eyepiece shutter control part 20 is controlled to close eyepiece shutter 17 by the system controller 100.

In the nineteenth embodiment, warning etc. are displayed by checking the open and close of the eyepiece shutter 17. It is not limited to this, after the shutter is closed, the alarm which urges to close the eyepiece shutter 17 to the photographer may be output always, and next processing may be performed after inputting the OK button after operating the eyepiece shutter lever of the photographer.

Figure 47:
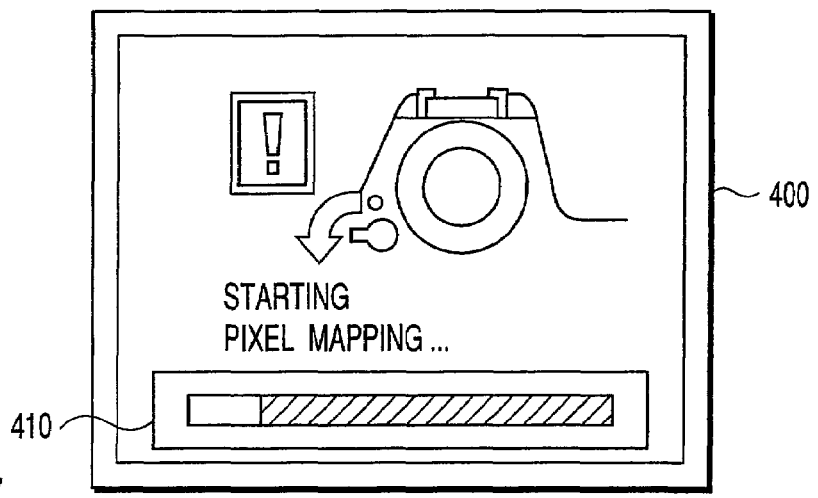
FIG. 47 is a figure showing the configuration of the progress state screen of the pixel map.

When the eyepiece shutter 17 enters the close state, the progress state screen 400 of the pixel map shown in FIG. 47 is displayed on the image information display part 4 (step K8). The progress bar 410 is displayed on the progress state screen 400. The progress bar 410 is displayed for the bar to extend with time according to the rate of completion of the processing. The signal operation form the switch 21 is prohibited from when the progress state screen 400 is displayed of the pixel map to the end of the pixel mapping.

The information on the CCD 15 on which the charge is accumulated by the exposure with the predetermined time is read from the state that both shutter 104 and the eyepiece shutter 17 become close. The image (black image) taken thus is memorized in the built-in memory of the imaging circuit 24 as photographing data (step K9).

After the photographing data is stored, the shutter 12 becomes in the open state (step K10). In addition, the message of which the open operation of the eyepiece shutter 17 is pushed to the photographer is output to the image information display part 4 (step K11).

And, the image defect check processing and the correction processing as mentioned above are executed concurrently with these operations (step K12). Moreover, when the progress bar 410 of the progress state screen 400 is updated according to the progress degree of the processing, and the processing is completed, the display of progress state screen 400 is erased (step K13).

In the nineteenth embodiment, since the open or close instruction of the eyepiece shutter 17 may be alarmed to the photographer in the necessary time, the photographer can surely perform the pixel defect check with good operativeness.

Twentieth Embodiment

Figure 48:
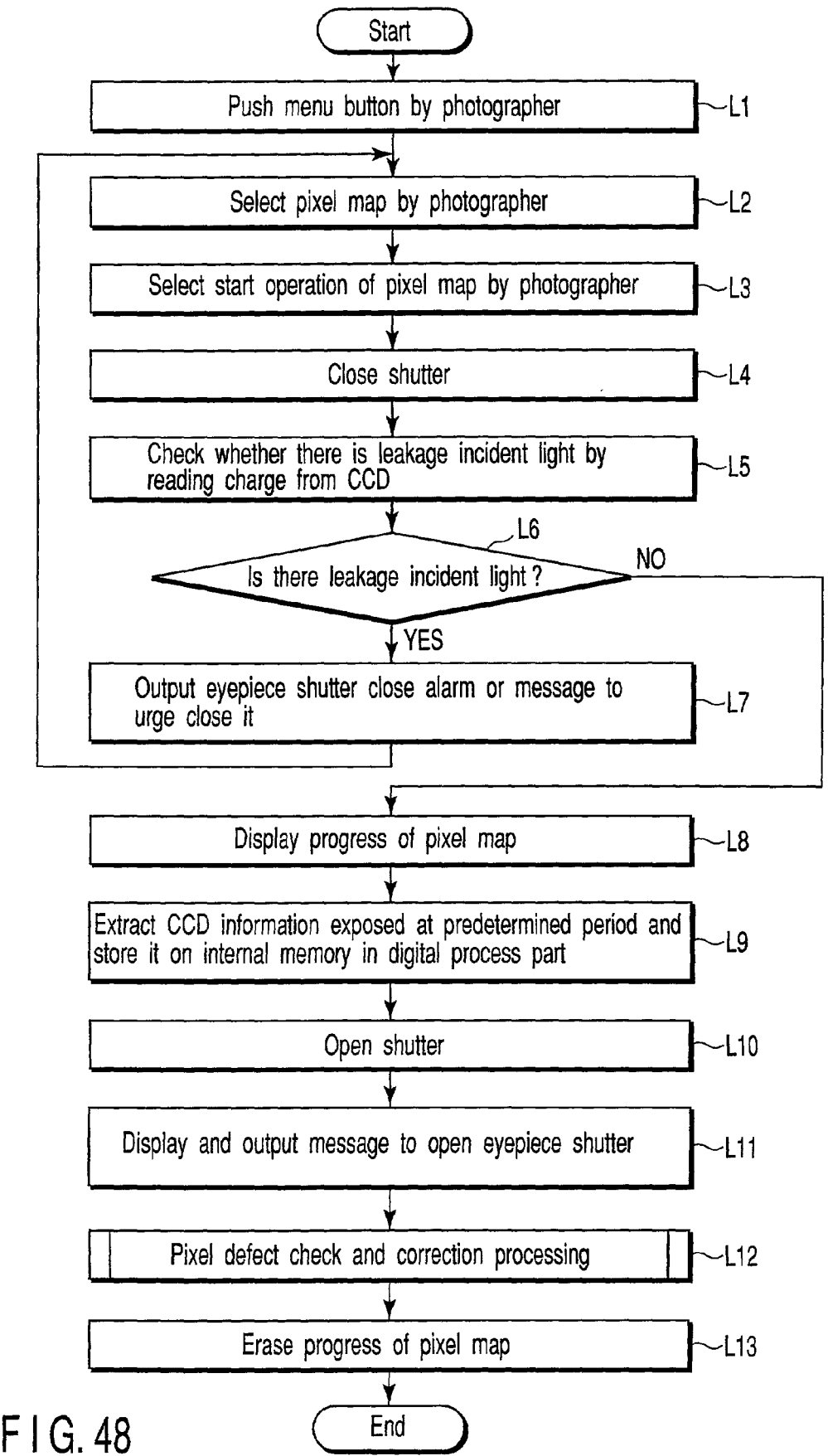
FIG. 48 is a flowchart showing the procedure of the outline of the pixel defect check operation in an electronic camera according to the twentieth embodiment.

The twentieth embodiment will be explained referring to FIG. 48 etc. FIG. 48 is a flowchart showing the procedure of the outline of the pixel defect check operation according to the twentieth embodiment.

When the photographer starts the check of the pixel defect, the menu button 8 is pushed (step L1). The menu screen 350 shown in FIG. 45 is displayed on the image information display part 4 of the camera main body 1.

The pixel map column 360 to select the pixel defect check starting is provided on the menu screen 350. When the photographer operates the cross button 9, "START" of the pixel map column 360 is selected, and the OK button 10 is pushed, the pixel map is selected from among the menu (step L2), and the start screen 380 shown in FIG. 46 is displayed.

On the start screen 380, when the photographer operates the cross button 9, "YES" of the start selection column 390 is selected, and the OK button 10 is pushed, the defect check operation is started (step L3).

First of all, the shutter driving part 22 (actuator) is controlled and shutter 12 becomes in the close state by the system controller 100 (step L4).

Subsequently, the image data is read from the CCD 15 and the presence of the leakage of the incident light from the viewfinder 3 is checked based on the image data (step L5). A lot of charges are accumulated in the CCD 15 compared with the case without the leakage of the incident light when there is the leakage of the incident light from the viewfinder 3. Then, it can be judged that there is the leakage of the incident light at the case when the total amount of the accumulated charge in a predetermined area is larger than a predetermined value, for instance.

Figure 49:
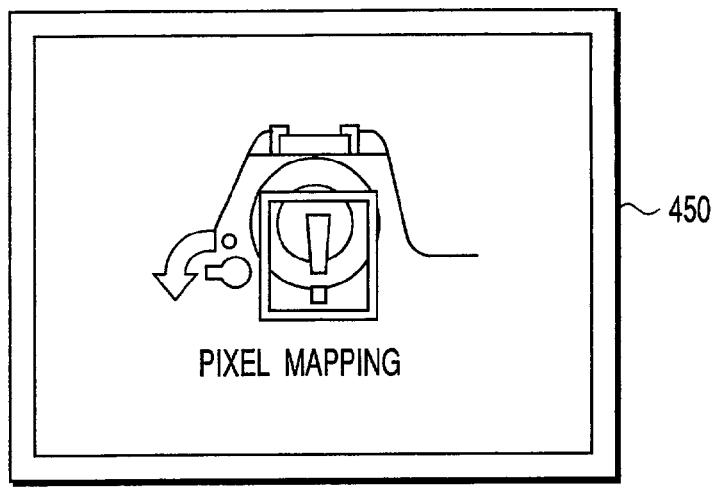
FIG. 49 is a figure showing the configuration of the alarm screen.

When it is judged that there is the leakage of the incident light, for the photographer, it is noted that the eyepiece shutter 17 is not in the close state, and the warning screen 450 shown in FIG. 49 is output to the image information display part 4 (step L7). After closing the eyepiece shutter 17 by operating the eyepiece shutter lever 26 as mentioned above, the photographer performs the operation from step 22 which is the initializing step again, when the warning screen 450 is displayed.

The warning is displayed in the twentieth embodiment, but it is not limited to this example, and the attention may be noticed according to the warning sound. The warning mark may be substituted in the color or the blink may be displayed. Moreover, the sound and the color substitution display, etc. may be properly combined to configure the warning.

The progress state screen 400 of the pixel map shown in FIG. 47 is displayed on the image information display part 4 when it is judged that there is no the leakage of the incident light (step L8). The progress bar 410 is displayed on the progress state screen 400, and it is displayed that the bar extends with time according to the rate of completion of the processing. The signal operation from switches is prohibited from the display of the progress state screen 400 of the pixel map to the end of the pixel mapping so as not to accept at all.

Next, the information on the CCD 15 which accumulates the charge by the exposure with the predetermined time is read from the state that both of the shutters 12 and the eyepiece shutter 17 become close, and the image (black image) taken thus is memorized on the built-in memory of the imaging circuit 24 as photographing data (step L9).

The photographing data of the CCD 15 read without exposing again in step L5 may be used though the exposure is performed in step L9 again in the twentieth embodiment. The processing time can be shortened if configures as mentioned above.

After the photographing data is read, the shutter 12 becomes in the open state (step L10). In addition, the message of which the open operation of the eyepiece shutter 17 is pushed to the photographer is output to the image information display part 4 (step L11).

And, the image defect check processing and the correction processing as mentioned above are executed concurrently with these operations (step L12). When the progress bar 410 of the progress state screen 400 is updated according to the progress degree of the processing, and processing is completed, the display of the progress state screen 400 is erased (step L13).

It is a configuration by which the CCD 15 is read, the presence of the leakage of the incident light is checked, and the close operation of the eyepiece shutter 17 is directed to the photographer in the twentieth embodiment only at necessary time. Therefore, the photographer can advance the effective pixel defect check with a little uselessness according to this instruction.

Twenty-First Embodiment

Figure 50:
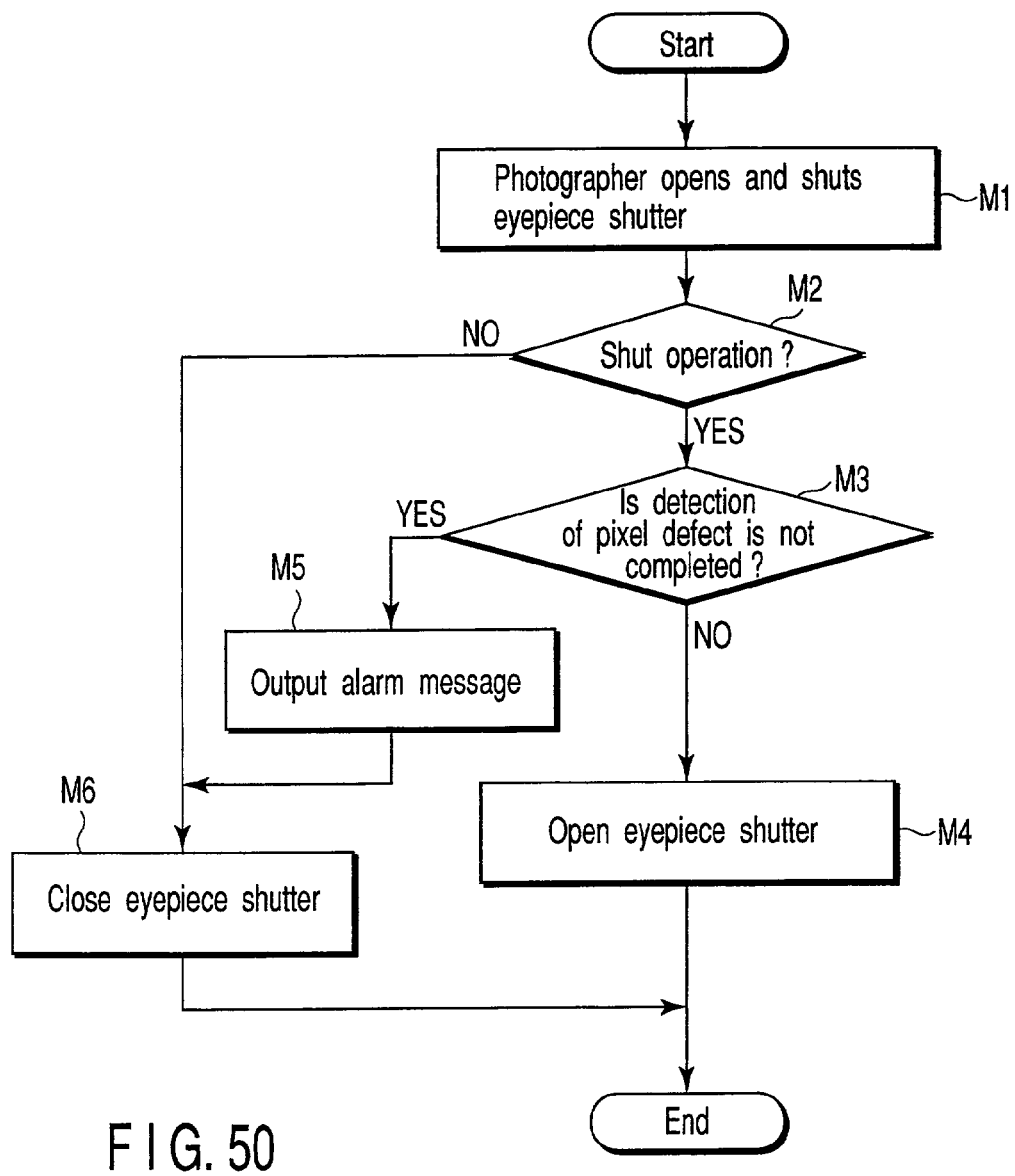
FIG. 50 is a flowchart showing the procedure of the outline of the eyepiece shutter operation in an electronic camera according to the twenty-first embodiment.

FIG. 50 is a flowchart showing the procedure of the outline of the eyepiece shutter operation according to the twenty-first embodiment of the present invention. The twenty-first embodiment is an embodiment relating to the method of preventing mis-operation of photographer.

When the photographer operates the eyepiece shutter lever 26 to open or close the eyepiece shutter 17 (step M1), the operation signal from the switch 21 is read by the system controller 100.

When the operation signal is an "open" instruction (step M2), whether the pixel defect check is operated is checked (step M3). In step M3, when the pixel defect check is not operated, the eyepiece shutter 17 is opened by operating the eyepiece shutter control part 20 (step M4).

In step M3, when the pixel defect check is operated, the eyepiece shutter 17 is maintained in the close state (step M5) by outputting the alert message to image information display part 4 (step M5), and operating the eyepiece shutter control part 20, and the influence is not exerted on the pixel defect operation.

Moreover, when the operation signal is an "close" instruction (step M2), the eyepiece shutter 17 is closed by operating the eyepiece shutter control part 20 based on the instruction (step M6).

As mentioned above, the mistake that the eyepiece shutter 17 is open caused by the mis-operation of the photographer during the defect check can be prevented by taking the manual operation of the eyepiece shutter lever 26 with the photographer into the system controller 100 once and judging the operation of open and close.

The influence of an incidence light from the viewfinder can be excluded, and the pixel defect can be checked with good operativeness according to the seventeenth embodiment to the twenty-first embodiment.

The electronic camera is chiefly explained as an example according to each embodiment as mentioned above, but it is not limited to the electronic camera. Of course, it is possible to apply also to the camera with a film for photograph.

The following features can be extracted according to the above-mentioned each embodiment. The following features may be applied to independently and is properly applied with combining them.

The camera according to the embodiment of the present invention enables the shutter to cut the reverse-incident light from the eyepiece to be set up without obstructing the miniaturization of the main body of the camera. To provide such a camera, the mechanism to cut the reverse-incident light from the eyepiece is made small-scale as much as possible.

The camera according to the first aspect of the present invention is characterized by comprising: an eyepiece lens configured to observe the incident light divided by the beam splitter with a viewfinder; a relay lens provided between the beam splitter and the eyepiece lens; and a shutter provided in a vicinity of the relay lens and configured to cut a reverse-incident light from the eyepiece lens.

In the first aspect, the shutter corresponding to the conventional eyepiece shutter is provided in the vicinity of the relay lens that the light flux becomes narrowest on the optical path of the incident light. As a result, it becomes possible to set up the shutter to cut the reverse-incident light from the eyepiece without obstructing the miniaturization of the main body of the camera.

The camera according to the second aspect of the present invention is characterized by comprising: a beam splitter configured to divide an incident light from a subject through a photographing lens; an eyepiece lens configured to observe the incident light divided by the beam splitter with a viewfinder; a relay lens provided between the beam splitter and the eyepiece lens and having a plurality of lenses; and a shutter provided between the plurality of lenses of the relay lens and configured to cut a reverse-incident light from the eyepiece lens.

In the second aspect, the shutter corresponding to the conventional eyepiece shutter is provided between two or more lens groups which configure the relay lens that the light flux becomes narrowest on the optical path of the incident light. As a result, it becomes possible to miniaturize the shutter to cut the reverse-incident light from the eyepiece further compared with the camera according to the first aspect.

In the camera according to the first aspect and the second aspect as mentioned above, preferable manners are as follows. Each manner may be applied independently and may be applied with properly combining them.

(1) The relay lens and the shutter are arranged adjacent to and along a direction of an optical axis of the incident light.

(2) The relay lens and the shutter are configured integrally.

(3) At least one or more image formation surfaces is formed between the beam splitter and the eyepiece lens.

The camera according to the embodiment of the present invention enables the dust from the eyepiece shutter to be prevented from adhering to the focusing board effectively. To provide such a camera, in the camera according to the first aspect, the dust generated by the eyepiece shutter can be effectively prevented from adhering to the focusing board only by as simple a configuration as possible.

The camera according to the third aspect of the present invention is characterized by comprising: a beam splitter configured to divide an incident light from a subject through a photographing lens; an eyepiece lens configured to observe the incident light divided by the beam splitter with a viewfinder; a relay lens provided between the beam splitter and the eyepiece lens; a focusing board provided between the beam splitter and the relay lens and configured to form an image of a subject image for focusing; a shutter provided between the beam splitter and the relay lens and configured to cut a reverse-incident light from the eyepiece lens; and an optical member provided between the focusing board and the shutter and configured to prevent a dust from the shutter from adhering to the focusing board.

In the third aspect, the dust generated by the wear etc. of the eyepiece shutter adheres to the optical member provided between the eyepiece shutter and the focusing board. With this configuration, it becomes possible to effectively prevent the dust from the shutter from adhering to the focusing board in the third aspect. The dust adheres to the focusing board in the conventional art. The optical member is arranged at the position apart from in a predetermined distance from the focusing board. Therefore, the dust adhering to the optical member is never almost identified in view from the viewfinder.

In the camera according to the third aspect as mentioned above, preferable manners are as follows. Each manner may be applied independently and may be applied with properly combining them.

(1) The shutter is provided between the relay lens and the optical member. With this configuration, the shutter is provided in a vicinity of the relay lens.

(2) The relay lens and the shutter are arranged adjacent to and along a direction of an optical axis of the incident light.

(3) The optical member includes one of a cover glass, an optical filter and a condenser lens. With this configuration, the optical filter includes one of a low-pass filter and a deflecting plate.

(4) An image display part configured to confirm the subject image is further provided, then the viewfinder is arranged in an upper vicinity of a main body of the camera to check the subject image visually from the back side of the main body of the camera, and the image display part is arranged under the viewfinder. With this configuration, the viewfinder and the image display part are arranged adjacent to and along up and down direction of a back surface of the camera.

The camera according to the embodiment of the present invention enables great reduction in costs and the miniaturization to be achieved. The liquid crystal device which configures the eyepiece shutter is used also for other usages (for instance, focusing board and display device) to provide such a camera.

The camera according to the fourth aspect of the present invention is characterized by comprising: a beam splitter configured to divide an incident light from a subject through a photographing lens; an eyepiece lens configured to observe the incident light divided by the beam splitter with a viewfinder; and a liquid crystal device provided between the beam splitter and the eyepiece lens, and the liquid crystal device has a function as a focusing board to form an image of a subject image for focusing, a function as a shutter to cut a reverse-incident light from the eyepiece lens, and a function as a display part on which display segments in a viewfinder are displayed.

In the fourth aspect, so-called the eyepiece shutter is configured with the liquid crystal device, and, in addition, the liquid crystal device which forms the display segment in the viewfinder and the liquid crystal surface of the liquid crystal device is used for the liquid crystal device as a focusing board for the image formation of the subject image of focusing. Therefore, it becomes possible to achieve great reduction in costs and the miniaturization by the reduction in the number of members.

The camera according to the fifth aspect of the present invention is characterized by comprising: a beam splitter configured to divide an incident light from a subject through a photographing lens; an eyepiece lens configured to observe the incident light divided by the beam splitter with a viewfinder; a focusing board provided between the beam splitter and the relay lens and configured to form an image of a subject image for focusing; a liquid crystal device provided in a vicinity of the focusing board, and the liquid crystal device has a function as a shutter to cut a reverse-incident light from the eyepiece lens, and a function as a display part on which display segments in a viewfinder are displayed.

In the fifth aspect, so-called the eyepiece shutter is configured of the liquid crystal device, and, in addition, the liquid crystal device is used as a liquid crystal device which forms the display segment in the viewfinder. Therefore, it becomes possible to achieve great reduction in costs and the miniaturization by the reduction in the number of members as well as the camera according to the fourth aspect.

In the camera according to the fourth aspect and the fifth aspect as mentioned above, preferable manners are as follows. Each manner may be applied independently and may be applied with properly combining them.

(1) The display segments function as a part of the shutter.

(2) A relay lens provided between the beam splitter and the eyepiece lens is further provided, and the focusing board is arranged substantially at a position of an image formation surface between the relay lens and the beam splitter.

(3) The display segments are dispersively arranged at substantially equal distance from an optical axis of the incident light from the subject.

The camera according to the sixth aspect of the present invention is characterized by comprising: a beam splitter configured to divide an incident light from a subject through a photographing lens; an eyepiece lens configured to observe the incident light divided by the beam splitter with a viewfinder; a relay lens provided between the beam splitter and the eyepiece lens; and a liquid crystal device provided between the relay lens and the eyepiece lens, and the liquid crystal device has a function as a focusing board to form an image of a subject image for focusing, a function as a shutter to cut a reverse-incident light from the eyepiece lens, and a function as a display part on which display segments in a viewfinder are displayed.

In general, it is known the field curvature is occurred on the second image formation surface. Therefore, even when the liquid crystal device which configures so-called the eyepiece shutter arranged on the second image formation surface is used as the liquid crystal device which forms the display segment in the viewfinder without any consideration, it is impossible to perform an excellent display for the user. Then, in the camera according to the sixth aspect, the display segments are dispersively arranged in a substantially equal distance from the optical axis of the incident light. As a result, an excellent display is enabled. And, the liquid crystal device which configures the eyepiece shutter is used as a liquid crystal device which forms the display segment in the viewfinder. As a result, it becomes possible to achieve the great reduction in costs and the miniaturization by the reduction in the number of members.

In the camera according to the sixth aspect as mentioned above, preferable manners are as follows. Each manner may be applied independently and may be applied with properly combining them.

(1) The display segments function as a part of the shutter.

(2) The liquid crystal device is arranged substantially on a second image formation surface between the relay lens and the eyepiece lens.

(3) The display segments are dispersively arranged at substantially equal distance from an optical axis of the incident light from the subject.

The camera according to the embodiment of the present invention enables to perform an appropriate driving control of the imaging shutter to control the light amount of the incident light to the imaging device and the shutter to cut the reverse-incident light from the eyepiece. To provide such a camera, the eyepiece shutter is closed during the period from before starting to expose the imaging device to after completing the image data reading. As a result, it becomes possible to display the usual through image by the LCD and remove the reverse-incident light at photographing without the focal plane shutter having the start curtain and the end curtain only with the lens shutter.

The camera according to the seventh aspect of the present invention is characterized by comprising: a beam splitter configured to divide an incident light from a subject through a photographing lens; an eyepiece lens configured to observe a first incident light divided by the beam splitter with a viewfinder; a first shutter provided between the beam splitter and the eyepiece lens and configured to cut a reverse-incident light from the eyepiece lens; imaging means for receiving a second incident light divided by the beam splitter and imaging a subject image; a second shutter configured to control a light amount of the second incident light to the imaging means; and a controller configured to start an exposure processing by the imaging means after closing the first shutter at photographing based on a predetermined operation, terminating the exposure processing by closing the second shutter, and open the first and second shutters after a read processing of a image data after the exposure processing.

In the seventh aspect, the shutter arranged in front of the imaging device is usually opened, and closed from at end of exposure to at end of data read. As a result, it becomes possible to observe the subject image taken with the imaging device with the LCD at anytime. In addition, so-called the eyepiece shutter is in the close state from before start of the exposure of the imaging device to after end of the image data read. As a result, it becomes possible to remove the unnecessary reverse-incident light. Moreover, it is sufficient to comprise the end curtain even if the focal plane shutter is adopted. Therefore, the camera can be miniaturized. If the lens shutter is adopted, the miniaturization of the camera can be promoted further.

The camera according to the eighth aspect of the present invention is characterized by comprising: a beam splitter configured to divide an incident light from a subject through a photographing lens; an eyepiece lens configured to observe a first incident light divided by the beam splitter with a viewfinder; a first shutter provided between the beam splitter and the eyepiece lens and configured to cut a reverse-incident light from the eyepiece lens; imaging means for receiving a second incident light divided by the beam splitter and imaging a subject image; a second shutter configured to control a light amount of the second incident light to the imaging means; light amount measurement means for controlling an exposure; and a controller configured to perform a light amount measurement by the light amount measurement means and to start an exposure processing by the imaging means after closing the first shutter at photographing based on a predetermined operation, terminate an exposure processing by closing the second shutter, and open the first and second shutters after a read processing of the image data after the exposure processing.

The eyepiece shutter is closed to determine the exposure condition before light-amount measurement in the eighth aspect. As a result, it becomes possible to completely remove the influence of the reverse-incident light at light amount measurement.

In the camera according to the seventh aspect and the eighth aspect as mentioned above, preferable manners are as follows. Each manner may be applied independently and may be applied with properly combining them.

(1) The light amount measurement means performs a light amount measurement using an image data read out in the read processing.

(2) The light amount measurement means includes a light amount measurement device provided between the beam splitter and the first shutter.

(3) Display means for displaying the subject image imaged by the imaging means during entire period except for a period when the second shutter is closed, is further provided.

(4) A relay lens provided between the beam splitter and the eyepiece lens is further provided, and the first shutter is provided in a vicinity of the relay lens.

(5) the relay lens and the first shutter are arranged adjacent to and along a direction of an optical axis of the incident light.

The camera according to the embodiment of the present invention, which comprises the rapid sequence function, enables the driving control of the eyepiece shutter to minimize the both of the disappearance of the subject image in the viewfinder and the influence of the reverse-incident light from the eyepiece.

The camera, which has a rapid sequence function to take two or more images continuously, according to the ninth aspect of the present invention is characterized by comprising: a beam splitter configured to divide an incident light from a subject through a photographing lens; an eyepiece lens configured to observe the incident light divided by the beam splitter with a viewfinder; a shutter provided between the beam splitter and the eyepiece lens, and configured to cut a reverse-incident light from the eyepiece lens; a rapid sequence speed setting means for setting a rapid sequence speed of the rapid sequence function; and a controller configured to fix the shutter to open during the rapid sequence operation if the rapid sequence speed set by the rapid sequence speed setting means is faster than a predetermined boundary rapid sequence speed, and open and close the shutter for each photographing if the rapid sequence speed set by the rapid sequence speed setting means is equal to or slower than a predetermined boundary rapid sequence speed, at an execution of the photographing using the rapid sequence function. With this configuration, it is desirable that a boundary rapid sequence speed setting means for setting a boundary rapid sequence speed is further provided.

In the ninth aspect, an appropriate following shutter controls are achieved. The eyepiece shutter is opened and closed for each exposure at a low speed rapid sequence and the reverse-incident light from the viewfinder is cut completely. On the other hand, the eyepiece shutter is opened fixedly at a high-speed rapid sequence and the disappearance of the subject image in the viewfinder is lost.

The camera, which has a rapid sequence function to take two or more images continuously, according to the tenth aspect of the present invention is characterized by comprising: a beam splitter configured to divide an incident light from a subject through a photographing lens; an eyepiece lens configured to observe the incident light divided by the beam splitter with a viewfinder; a shutter provided between the beam splitter and the eyepiece lens, and configured to cut a reverse-incident light from the eyepiece lens; a rapid sequence speed setting means for setting a rapid sequence speed of the rapid sequence function; and a controller configured to fix the shutter to close during the rapid sequence operation if the rapid sequence speed set by the rapid sequence speed setting means is faster than a predetermined boundary rapid sequence speed, and open and close the shutter for each photographing if the rapid sequence speed set by the rapid sequence speed setting means is equal to or slower than a predetermined boundary rapid sequence speed, at an execution of the photographing using the rapid sequence function. With this configuration, it is desirable that a boundary rapid sequence speed setting means for setting a boundary rapid sequence speed is further provided.

In the tenth aspect, it is considered that the subject image in the viewfinder disappears substantially at the high-speed driving of the eyepiece shutter. That is, the eyepiece shutter is closed fixedly at high-speed rapid sequence. As a result, it is achieved to remove the influence of the reverse-incident light from the viewfinder at the high-speed rapid sequence completely.

The camera according to the tenth embodiment of the present invention enables to perform an appropriate driving control of the eyepiece shutter. To provide such a camera, to shift the eyepiece shutter from the close state to the open state regardless to the state of the eyepiece shutter (even in a case of being in an open state), when the power supply of the camera is turned on, the actuator is forcibly operated.

The camera according to the eleventh aspect of the present invention is characterized by comprising: a beam splitter configured to divide an incident light from a subject through a photographing lens; an eyepiece lens configured to observe the incident light divided by the beam splitter with a viewfinder; a shutter provided between the beam splitter and the eyepiece lens, and configured to cut a reverse-incident light from the eyepiece lens; an actuator configured to open the shutter; and a controller configured to drive the actuator to open the shutter when a main power supply is turned on. With this configuration, it is desirable that the actuator is used only to move the shutter from a close state to an open state, and is not used to maintain the shutter in the close state or the open state.

The camera according to the twelfth aspect of the present invention is characterized by comprising: a beam splitter configured to divide an incident light from a subject through a photographing lens; an eyepiece lens configured to observe the incident light divided by the beam splitter with a viewfinder; a shutter provided between the beam splitter and the eyepiece lens, and configured to cut a reverse-incident light from the eyepiece lens; an actuator configured to open and close the shutter; and a controller configured to drive the actuator to open the shutter when a main power supply is turned on. With this configuration, it is desirable that the actuator is used only to move the shutter from a close state to an open state or from an open state to a close state, and is not used to maintain the shutter in the close state or the open state.

In the eleventh aspect and the twelfth aspect, the eyepiece shutter is put into the open state corresponding to a power supply on even if the eyepiece shutter is displaced in the close state by the impact applied to the main body of the camera in the power off state. Therefore, it becomes possible to start the photographing operation immediately, and a valuable shutter chance is prevented from being missed surely if looking at the viewfinder.

Moreover, actuator is not used to maintain the above-mentioned shutter in a close state or an open state. As a result, the battery life is not negatively affected.

The camera according to the embodiment of the present invention is configured that the eyepiece shutter is driven with electrical-mechanical conversion actuator and is enables controlling the driving of the eyepiece shutter by the actuator appropriately. To provide such a camera, when the power supply of the camera is turned off, the actuator is forcibly operated to shift the eyepiece shutter from the open state to the close state regardless of the state of the eyepiece shutter (even in case of being in the close state).

The camera according to the thirteenth aspect of the present invention is characterized by comprising: a beam splitter configured to divide an incident light from a subject through a photographing lens; an eyepiece lens configured to observe the incident light divided by the beam splitter with a viewfinder; a shutter provided between the beam splitter and the eyepiece lens, and configured to cut a reverse-incident light from the eyepiece lens; an actuator configured to close the shutter; and a controller configured to drive the actuator to close the shutter when a main power supply is cut off. With this configuration, it is desirable that the actuator is used only to move the shutter from an open state to a close state, and is not used to maintain the shutter in the close state or the open state.

The camera according to the fourteenth aspect of the present invention is characterized by comprising: a beam splitter configured to divide an incident light from a subject through a photographing lens; an eyepiece lens configured to observe the incident light divided by the beam splitter with a viewfinder; a shutter provided between the beam splitter and the eyepiece lens, and configured to cut a reverse-incident light from the eyepiece lens; an actuator configured to open and close the shutter; and a controller configured to drive the actuator to close the shutter when a main power supply is cut off. With this configuration, it is desirable that the actuator is used only to move the shutter from a close state to an open state or from an open state to a close state, and is not used to maintain the shutter in the close state or the open state.

The camera according to the fifteenth aspect of the present invention is characterized by comprising: a beam splitter configured to divide an incident light from a subject through a photographing lens; an eyepiece lens configured to observe the incident light divided by the beam splitter with a viewfinder; a shutter provided between the beam splitter and the eyepiece lens, and configured to cut a reverse-incident light from the eyepiece lens; an actuator configured to open and close the shutter; and a controller configured to drive the actuator to close the shutter when a main power supply is cut off and to open the shutter when the main power supply is turned on.

In the thirteenth aspect to the fifteenth aspect, it is configured that the eyepiece shutter is driven with electrical-mechanical conversion actuator. As a result, it becomes possible to surely make the eyepiece shutter in the close state when the camera is non-used. Therefore, the fear to cause damage for the mechanism in the camera by the reverse-incident light from the viewfinder is removed.

Moreover, actuator is not used to maintain the above-mentioned shutter in a close state or an open state.

As a result, the battery life is not negatively affected.

The camera according to the embodiment of the present invention enables to perform the driving control of the eyepiece shutter timely and appropriately.

The camera according to the sixteenth aspect of the present invention is characterized by comprising: a beam splitter configured to divide an incident light from a subject through a photographing lens; an eyepiece lens configured to observe a first incident light divided by the beam splitter with a viewfinder; a shutter provided between the beam splitter and the eyepiece lens and configured to cut a reverse-incident light from the eyepiece lens; shutter driving means for driving the shutter; imaging means for receiving a second incident light divided by the beam splitter and creating an image data of a subject image; white balance adjustment means for adjusting a color temperature of a picture data obtained by the imaging means; switch means for directing the acquisition of an adjustment data generated from the picture data obtained by the imaging means, and the adjustment data being a reference of the color temperature adjustment by the white balance adjustment means; and a controller configured to operate the shutter driving means to cut the reverse-incident light by driving the shutter drive the shutter before the adjustment data is acquired and open the shutter after the adjustment data is acquired when the direction of the acquisition of the adjustment data is directed by the switch means. With this configuration, it is desirable that the switch means is provided on an outer surface of a camera case.

When the adjustment data which becomes the reference of the color temperature adjustment is acquired, the eyepiece shutter is automatically closed in the sixteenth aspect. Therefore, it becomes possible to prevent the reverse-incident light from the viewfinder from being exerted on the adjustment data from influencing, and to perform the more precise color temperature adjustment.

The color temperature at the flash forced luminescence becomes the color temperature of the flash light. Therefore, a precise color temperature adjustment is unnecessary. On the other hand, when the eyepiece shutter is closed, the subject image disappears from the view in the viewfinder. Therefore, the disappearance of the subject image is made to give the priority to be lost from the precision of the color temperature adjustment for this case.

The camera according to the seventeenth aspect of the present invention is characterized by comprising: a beam splitter configured to divide an incident light from a subject through a photographing lens; an eyepiece lens configured to observe a first incident light divided by the beam splitter with a viewfinder; a shutter provided between the beam splitter and the eyepiece lens and configured to cut a reverse-incident light from the eyepiece lens; shutter driving means for driving the shutter; imaging means for receiving a second incident light divided by the beam splitter and creating an image data of a subject image; light amount measurement means for measuring a light amount of the incident light from the incident light from the subject by the photographing lens; switch means for directing an acquisition of a light amount measurement data obtained by the light amount measurement means; and a controller configured to operate the shutter driving means to cut the reverse-incident light by driving the shutter before the adjustment data is acquired and open the shutter after the adjustment data is acquired when the direction of the acquisition of the adjustment data is directed by the switch means.

When the light amount measurement data for exposure adjustment is acquired for instance, the eyepiece shutter is automatically closed in the seventeenth aspect. Therefore, it becomes possible to prevent the reverse-incident light from the viewfinder from being exerted on the light amount measurement data from influencing, and to perform the more precise exposure adjustment.

In the sixteenth aspect and the seventeenth aspect, it is preferable that the above-mentioned switch means is provided on the outer surface of the camera case.

The camera according to the embodiment of the present invention enables to reduce the open and close operations of the eyepiece shutter as much as possible by closing the eyepiece shutter only when it is necessary whether is a photographing environment that the reverse-incident light from the viewfinder becomes a problem, and to prevent the picture quality degradation by the reverse-incident light from the viewfinder efficiently.

The camera according to the eighteenth aspect of the present invention is characterized by comprising: an imaging lens for forming an image of a subject image; light receiving means for receiving the subject image formed by the imaging lens; an iris provided on an optical path of the imaging lens and having a variable aperture; an iris controller configured to control a size of an aperture of the iris based on a brightness of the subject; a viewfinder configured to observe the subject image; an optical member provided between the iris and the light receiving means and configured to lead the subject image input through the imaging lens to the viewfinder; an eyepiece shutter configured to be movable at a shielding position and a non-shielding position for an eyepiece window of the viewfinder; and an eyepiece shutter controller configured to set the eyepiece shutter at the shielding position or the non-shielding position based on the aperture of the iris.

In the camera according to the eighteenth aspect as mentioned above, preferable manners are as follows. Each manner may be applied independently and may be applied with properly combining them.

(1) The eyepiece shutter controller sets the eyepiece shutter at the shielding position when the aperture of the iris is smaller than that of the predetermined reference value, and sets the eyepiece shutter at the non-shielding position when the aperture of the iris is larger than the reference value.

(2) Detection means for detecting a strength of the reverse-incident light from the viewfinder is further provided, and the eyepiece shutter controller sets the eyepiece shutter at the shielding position or the non-shielding position based on both of a strength of the reverse-incident light detected by the detection means and the aperture of the iris.

(3) A control of a setting of the eyepiece shutter by the eyepiece shutter controller is performed by synchronizing with a release operation of the electronic camera.

The camera according to the nineteenth aspect of the present invention is characterized by comprising: an imaging lens for forming an image of a subject image; a light receiving means for receiving the subject image formed by the imaging lens; a mechanical shutter provided on an optical path of the imaging lens and configured to be movable between a shielding position and a non-shielding position; means for controlling an amount of an exposure determined with the mechanical shutter based on a brightness of subject; a viewfinder configured to observe the subject image; an optical member provided between the mechanical shutter and the light receiving means and configured to lead the subject image input through the imaging lens to the viewfinder; an eyepiece shutter configured to be movable at the shielding position and the non-shielding position for an eyepiece window of the viewfinder; and an eyepiece shutter controller configured to set the eyepiece shutter at the shielding position or the non-shielding position based on the exposure determined by the mechanical shutter.

In the camera according to the nineteenth aspect as mentioned above, preferable manners are as follows. Each manner may be applied independently and may be applied with properly combining them.

(1) The eyepiece shutter controller sets the eyepiece shutter at the shielding position when the exposure determined with the mechanical shutter is smaller than that of the predetermined reference value, and sets the eyepiece shutter at the non-shielding position when the exposure determined with the mechanical shutter is larger than the reference value.

(2) Detection means for detecting a strength of the reverse-incident light from the viewfinder is further provided, and the eyepiece shutter controller sets the eyepiece shutter at the shielding position or the non-shielding position based on a strength of the reverse-incident light detected by the detection means and the exposure determined by the mechanical shutter.

(3) A control of a setting of the eyepiece shutter by the eyepiece shutter controller is performed by synchronizing with the release operation of the electronic camera.

In the eighteenth aspect and the nineteenth aspect, the control of setting the eyepiece shutter at the shielding position or the non-shielding position is performed based on the input light amount from subject when photographing, that is, the exposure determined with a aperture of the iris and the mechanical shutter. Thus, the open and close of the eyepiece shutter can be controlled according to whether a present photographing environment is a photographing environment that the reverse-incident light from the viewfinder becomes a problem. Therefore, only when it is necessary, the eyepiece shutter can be closed. Therefore, it becomes possible to efficiently prevent the picture quality decrease by the reverse-incident light from the viewfinder without ruining operativeness.

Moreover, the open and close of the eyepiece shutter is controlled in consideration of not only the input light amount from subject but also a relative relation to strength of the reverse-incident light at photographing. As a result, it becomes possible to control more properly to close the eyepiece shutter only when the influence by the reverse-incident light is caused.

The camera according to the embodiment of the present invention is a high-efficient camera in which the picture quality degradation because of a target pixel defect increase is not occurred without causing the mis-detection of the defect by the reverse-incident light from the viewfinder aperture at the time of passing.

The camera according to the twentieth aspect of the present invention is characterized by comprising: an imaging device for forming an image of a subject image; an imaging optical system configured to input the subject image to the imaging device; imaging shielding means for cutting an incident light from the imaging optical system to the imaging device; optical viewfinder means for confirming the subject image by separating a part of the incident light to the imaging device; reverse-incident light shielding means for shielding the incident light from the optical viewfinder means to the imaging device; set state detection means for detecting a set state of the reverse-incident light shielding means; defect data detection means for detecting a pixel defect address of the imaging device by analyzing an output of the imaging device obtained in a state that the incident light to the imaging device by the imaging optical system is cut by the imaging shielding means; defect compensation means for performing a compensation processing by a vicinity pixel data to an output from the imaging device based on the defect data detected by the defect data detection means; and a controller configured to prohibit a detection of the defect address by the defect data detection means when the set state of the reverse-incident light shielding means detected by the set state detection means is not in a light-shielded state.

In the camera according to the twentieth aspect as mentioned above, preferable manners are as follows. Each manner may be applied independently and may be applied with properly combining them.

(1) When the set state of the reverse-incident light shielding means is switched in a state of the non-shielding, the defect data detection means detects the defect address.

(2) Storage means for registering the pixel defect address of the imaging device as a defect data; and defect data management means for updating the defect data registered in the storage means based on the defect data newly detected by the defect data detection means are further provided.

(3) The defect data management means additionally registers a pixel defect address which is not overlapped with the pixel defect address of the registered defect data of the pixel defect addresses among the new detected defect data newly detected for the registered defect data already registered.

(4) The defect data management means additionally registers the defect data which is not overlapped with the pixel defect address of the initial registered defect data of the pixel defect addresses of the new detected defect data newly detected to the initial registered defect data registered when the factory is shipped.

The output of the imaging device obtained with the incident light to the imaging device shielded is analyzed according to the twentieth aspect. That is, the reverse-incident light shielding means to cut the incident light from the viewfinder aperture to the imaging device and the set state detection means to detect setting the reverse-incident light shielding means are provided, and, when the set state of the reverse-incident light shielding means is not in the state of the shielding, the detection of the defect address by the defect data detection means is prohibited. Therefore, the mis-detection can be prevented from being caused by the reverse-incident light from the viewfinder aperture when the pixel defect is detected. As a result, it becomes possible to provide the efficient electronic camera where the picture quality degradation because of a target pixel defect increase with time is not occurred.

Moreover, the storage means to register the pixel defect address as defect data and the defect data management means to update the defect data registered in the storage means based on the defect data newly detected are provided. As a result, the defect data registered in the storage means has the pixel defect at the time of passing of causing by the influence of cosmic rays and a natural radioactivity in addition to the pixel defect in the early shipping the factory. Therefore, the picture quality degradation because of the pixel defect increase with time can be prevented by performing the compensation processing by the vicinity pixel data based on the defect data registered in the storage means.

The camera according to the twenty-first aspect of the present invention is characterized by comprising: an imaging device; an imaging optical system configured to input the subject image by the imaging device; optical viewfinder means for observing the subject image input by the imaging optical system; reverse-incident light shielding means for shielding the incident light from the optical viewfinder means to the imaging device; defect data detection means for executing the detection of the pixel defect data of the imaging device by analyzing an output of the imaging device; defect correction means for performing correction of an output of the imaging device based on the pixel defect data detected by the defect data detection means; and a controller configured to execute the detection of the defect data after cutting the reverse-incident light shielding means by driving it when the reverse-incident light shielding means is open at the defect data detection by the defect data detection means.

In the twenty-first aspect, the reverse-incident light shielding means to shield the incident light from the optical viewfinder means to the imaging device is provided. Here, after the reverse-incident light shielding means is shut, the defect data is detected when the reverse-incident light shielding means is open when the defect data is detected. The configuration of detecting the defect data thereafter is shut as in this by the close driving of the reverse-incident light shielding means is adopted. As a result, preventing the mis-detection by the reverse-incident light from the optical viewfinder means becomes possible. Therefore, correct defect detection can be automatically performed without depending on a surrounding environment.

In the camera according to the twenty-first aspect as mentioned above, preferable manners are as follows. Each manner may be applied independently and may be applied with properly combining them.

(1) Imaging shielding means for shielding the incident light from the imaging optical system to the imaging device is further provided, and the defect data detection means includes the dark output information analysis means for analyzing the output of the imaging device obtained with the incident light to the imaging device caused by the imaging optical system shielded by the imaging shielding means.

The defect data is detected with the reverse-incident light shielding means is closed and the incident light to the imaging device is cut when the dark output information on the imaging device is acquired. As a result, it becomes possible to check a so-called white defect pixel with good accuracy. The defect compensation in which the pixel registered as a pixel defect address is supplemented by neighboring non-registration pixel information can be used as the defect compensation.

(2) The pixel defect data is a pixel defect address information which shows a pixel defect address, and the defect compensation means includes a defect compensation means which supplements a pixel registered as the pixel defect address according to neighboring non-registration pixel information.

(3) Storage means for storing a pixel defect address information of the imaging device; and defect data management means for updating the pixel defect address information stored in the storage means based on the pixel defect data newly detected by the defect data detection means are further provided. It becomes possible to deal with a pixel defect increase with time, and to prevent the picture quality degradation.

(4) Set state detection means for detecting a set state of the reverse-incident light shielding means is further provided, and the controller judges the set state of open or close of the reverse-incident light shielding means based on the detection result by the set state detection means.

(5) The controller prohibits the detection of the defect data by the defect data detection means, when it is recognized that the reverse-incident light shielding means does not shut to the controller though it is execution of the close driving of the reverse-incident light shielding means based on the detection result by the set state detection means.

(6) The controller makes alarm when it is recognized that the reverse-incident light shielding means does not shut to the controller though it is execution of the close driving of the reverse-incident light shielding means based on the detection result by the set state detection means.

(7) The controller includes the means for record this as abnormal career information, when it is recognized that the reverse-incident light shielding means does not close though it is execution of the close driving of the reverse-incident light shielding means based on the detection result by the set state detection means.

It becomes possible to remove the occurrence of something wrong even when it is not normally performed the close driving due to the breakdown of driving system etc., and improving reliability.

The camera according to the embodiment of the present invention can exclude the influence of the incidence light from the viewfinder, and can check the pixel defect with good operativeness.

The camera according to the twenty-second aspect of the present invention is characterized by comprising: an imaging optical system; an viewfinder optical system comprising a viewfinder to observe subject based on a part of a incident light to the imaging optical system; pixel defect check means for checking a pixel defect of the imaging device arranged on an image formation surface of the imaging optical system; display means for displaying information relating to the pixel defect check; shielding means which can open or close an optical path in the viewfinder optical system by manual to prevent a reverse-incident light from the viewfinder; and display output means for outputting an alarm pushed to close an optical path by the shielding means to the display means before start of checking the pixel defect.

The camera according to the twenty-third aspect of the present invention is characterized by comprising: an imaging optical system; an viewfinder optical system comprising viewfinder to observe a subject image based on a part of an incident light to the imaging optical system; pixel defect check means for checking the pixel defect of the imaging device arranged on an image formation surface of the imaging optical system; display means for displaying information relating to the pixel defect check; shielding means which can open or close an optical path in the viewfinder optical system by manual to prevent the reverse-incident light from the viewfinder; judgment means for judging the open or close state of the shielding means before start of checking the pixel defect; and display output means for outputting an alarm pushed to close the optical path by the shielding means before start of checking the pixel defect to the display means, when it is judged that it is in the open state by the judgment means.

The camera which comprises: an imaging optical system; an viewfinder optical system comprising a viewfinder to observe a subject image based on a part of an incident light to the imaging optical system; pixel defect check means for checking a pixel defect of the imaging device arranged on an image formation surface of the imaging optical system; and display means for displaying an information relating to a pixel defect check, according to the twenty-fourth aspect of the present invention is characterized by comprising: shielding means which can open or close an optical path in the viewfinder optical system manually, for preventing a reverse-incident light from the viewfinder; judgment means for judging a presence of the reverse-incident light from an image data of the imaging device before start of checking the pixel defect; and display output means for outputting an alarm pushed to close the optical path by the shielding means to the display means before start of checking the pixel defect when it is judged that there is the reverse-incident light by the judgment means.

In the twenty-second aspect to the twenty-fourth aspect, it is preferable to further comprise open limitation means for keeping the shielding means in a close state, when the manual operation by which the shielding means is in an open state while checking the pixel defect is performed.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A camera comprising:
   a beam splitter configured to divide an incident light from a subject through a photographing lens;
   a focusing board which is arranged at a position where the incident light divided by the beam splitter forms an image and which enables viewing of a focusing state by observing the image;
   an eyepiece lens configured to enable a user to observe the image which is divided by the beam splitter and formed on the focusing board with a viewfinder, as a subject image;
   a relay lens which is provided between the focusing board and the eyepiece lens at a position where a diameter of light flux is narrowest in an optical path from the beam splitter to the eyepiece lens, and which reverses the subject image; and
   a shutter which is provided in a vicinity of the relay lens approximately at the position where the diameter of light flux is narrowest in the optical path from the beam splitter to the eyepiece lens, closer to the relay lens than to the eyepiece lens, and which cuts reverse-incident light from the eyepiece lens.

2. The camera according to claim 1, wherein the relay lens and the shutter are arranged adjacent to and along a direction of an optical axis of the incident light.

3. A camera comprising:
   a beam splitter configured to divide an incident light from a subject through a photographing lens;
   a focusing board which is arranged at a position where the incident light divided by the beam splitter forms an image and which enables viewing of a focusing state by observing the image;
   an eyepiece lens configured to enable a user to observe the image which is divided by the beam splitter and formed on the focusing board with a viewfinder, as a subject image;
   a relay lens which is provided between the focusing board and the eyepiece lens at a position where a diameter of light flux is narrowest in an optical path from the beam splitter to the eyepiece lens, and which reverses the subject image, said relay lens comprising a plurality of lenses; and
   a shutter which is provided between the plurality of lenses of the relay lens approximately at the position where the diameter of light flux is narrowest in the optical path from the beam splitter to the eyepiece lens, and which cuts reverse-incident light from the eyepiece lens.

4. The camera according to claim 1, wherein the relay lens and the shutter are configured integrally.

5. The camera according to claim 1, wherein at least one image formation surface is formed between the beam splitter and the eyepiece lens.

* * * * *